(12) United States Patent
Cole

(10) Patent No.: US 11,845,868 B2
(45) Date of Patent: Dec. 19, 2023

(54) WEAK COVALENT CROSSLINKS IN THERMOSET MATERIALS FOR INCREASED TOUGHNESS

(71) Applicant: Align Technology, Inc., San Jose, CA (US)

(72) Inventor: Michael Christopher Cole, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/200,617

(22) Filed: Mar. 12, 2021

(65) Prior Publication Data

US 2022/0002573 A1 Jan. 6, 2022

Related U.S. Application Data

(60) Provisional application No. 62/989,307, filed on Mar. 13, 2020, provisional application No. 62/989,314, filed on Mar. 13, 2020.

(51) Int. Cl.
*C09D 133/06* (2006.01)
*B33Y 70/00* (2020.01)
(Continued)

(52) U.S. Cl.
CPC ............ *C09D 133/062* (2013.01); *A61C 7/08* (2013.01); *A61C 7/10* (2013.01); *B33Y 70/00* (2014.12);
(Continued)

(58) Field of Classification Search
CPC .. C08F 2/28; C08F 220/1804; C08F 2800/20; C08F 2810/20; C09D 4/00; C09D 133/062
See application file for complete search history.

(56) References Cited

U.S. PATENT DOCUMENTS 5,820,368 A 10/1998 Wolk
5,975,893 A 11/1999 Chishti et al.
(Continued)

FOREIGN PATENT DOCUMENTS

AU 2005260146 A1 * 1/2007 ............... C08F 2/38
BR 102019017050 A2 * 2/2021
(Continued)

OTHER PUBLICATIONS

Celestine et al. Fracture-induced activation in mechanophore-linked, rubber toughened PMMA, Polymer, vol. 55, Issue 16, 2014, pp. 4164-4171. (Year: 2014).*
(Continued)

*Primary Examiner* — Sanza L. McClendon
(74) *Attorney, Agent, or Firm* — Seed IP Law Group LLP

(57) ABSTRACT

This disclosure provides polymeric materials comprising weak crosslinking covalent bonds and/or weak crosslinking units comprising a weak covalent bond. Weak covalent bonds can be used in place of hydrogen bonds present in traditional polymeric materials (e.g., polyurethanes). Advantageously, the toughness can be controlled by varying the strength of weak covalent bonds and/or by varying the number of weak covalent crosslinks. Crosslinked materials applying the weak covalent crosslinking bonds can be used to create tough materials able to resist stress relaxation. Further, the present disclosure provides polymer chains and polymeric materials comprising inchain loops (also referred to herein as rings). The inchain loops comprise weak bonds and/or weak bridges comprising at least one weak bond. This disclosure also provides compositions comprising the polymer chains, materials comprising the polymer chains, monomer units that can react to form inchain loop-comprising polymer chains, resins comprising the monomer units, and related materials, appliances, and uses.

33 Claims, 19 Drawing Sheets

Polymer chain
Connector
Weak bridge
A plurality of bonds, each having a bond dissociation energy greater than the weak bond
Weak bond

(51) Int. Cl.
*C08F 220/18* (2006.01)
*A61C 7/08* (2006.01)
*A61C 7/10* (2006.01)
*C09D 4/00* (2006.01)

(52) U.S. Cl.
CPC .......... *C08F 220/1804* (2020.02); *C09D 4/00* (2013.01); *C08F 2800/20* (2013.01); *C08F 2810/20* (2013.01)

(56) References Cited

U.S. PATENT DOCUMENTS

| | | |
|---|---|---|
| 6,183,248 B1 | 2/2001 | Chishti et al. |
| 6,309,215 B1 | 10/2001 | Phan et al. |
| 6,386,864 B1 | 5/2002 | Kuo |
| 6,450,807 B1 | 9/2002 | Chishti et al. |
| 6,454,565 B2 | 9/2002 | Phan et al. |
| 6,471,511 B1 | 10/2002 | Chishti et al. |
| 6,524,101 B1 | 2/2003 | Phan et al. |
| 6,572,372 B1 | 6/2003 | Phan et al. |
| 6,607,382 B1 | 8/2003 | Kuo et al. |
| 6,705,863 B2 | 3/2004 | Phan et al. |
| 6,749,414 B1 | 6/2004 | Hanson et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,544,721 B2 * | 6/2009 | Gaud ................. C08F 222/1025 522/182 |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,892,474 B2 | 2/2011 | Shkolnik et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,751,980 B2 * | 9/2017 | Morizur ................. C08K 5/42 |
| 9,758,597 B2 * | 9/2017 | Bowman ................. C08F 2/48 |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,162,264 B2 | 12/2018 | McLeod et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,066,574 B2 * | 7/2021 | Li ........................ C08G 18/227 |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,750 B2 | 2/2023 | Kopelman et al. |
| 11,576,752 B2 | 2/2023 | Morton et al. |
| 11,589,955 B2 | 2/2023 | Medvinskaya et al. |
| 11,596,502 B2 | 3/2023 | Webber et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 2002/0192617 A1 | 12/2002 | Phan et al. |

(56) References Cited

U.S. PATENT DOCUMENTS

| | | |
|---|---|---|
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0061974 A1 | 3/2014 | Tyler |
| 2014/0067334 A1 | 3/2014 | Kuo |
| 2014/0265034 A1 | 9/2014 | Dudley |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2016/0193014 A1 | 7/2016 | Morton et al. |
| 2017/0007359 A1 | 1/2017 | Kopelman et al. |
| 2017/0135793 A1 | 5/2017 | Webber et al. |
| 2018/0360567 A1 | 12/2018 | Xue et al. |
| 2019/0000592 A1 | 1/2019 | Cam et al. |
| 2019/0000593 A1 | 1/2019 | Cam et al. |
| 2019/0046297 A1 | 2/2019 | Kopelman et al. |
| 2019/0099129 A1 | 4/2019 | Kopelman et al. |
| 2019/0125497 A1 | 5/2019 | Derakhshan et al. |
| 2019/0262101 A1 | 8/2019 | Shanjani et al. |
| 2019/0298494 A1 | 10/2019 | Webber et al. |
| 2020/0000553 A1 | 1/2020 | Makarenkova et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2021/0147672 A1 | 5/2021 | Cole et al. |

FOREIGN PATENT DOCUMENTS

| | | | | |
|---|---|---|---|---|
| CN | 108047104 A | * | 5/2018 | ............ C07C 319/22 |
| CN | 108641065 A | * | 10/2018 | ............ C08G 59/063 |
| CN | 110128655 A | | 8/2019 | |
| CN | 106596649 B | * | 12/2020 | ............ G01N 27/04 |
| CN | 113156765 A | * | 7/2021 | ............ G03F 7/0002 |
| EP | 277413 A | * | 8/1988 | ............ A61K 6/0085 |
| EP | 3106488 A1 | * | 12/2016 | |
| JP | 60248728 A | * | 12/1985 | |
| JP | 2010031192 A | * | 2/2010 | |
| JP | 2011237755 A | * | 11/2011 | |
| TW | I272451 B | * | 7/2005 | |
| WO | WO-2015075094 A1 | | 5/2015 | |
| WO | WO-2015127981 A1 | * | 9/2015 | ............ C08G 18/00 |
| WO | WO-2016078838 A1 | | 5/2016 | |
| WO | WO-2018032022 A1 | | 2/2018 | |
| WO | WO-2019023009 A1 | | 1/2019 | |
| WO | WO-2020003133 A1 | | 1/2020 | |
| WO | WO-2021077216 A1 | * | 4/2021 | |

OTHER PUBLICATIONS

Hemmer et al. High strain-rate response of spiropyran mechanophores in PMMA. Journal of Polymer Science Part B: Polymer Physics, vol. 52, Issue 20, Oct. 2014, pp. 1309-1373 (Year: 2014).*

Chen et al, Novel Design of Multi-Mechanoresponsive and Mechanically Strong Hydrogels. Advanced Mater. 2017, 29, 1606900 (Year: 2017).*

Meng Li et al. Smart polyolefins feeling the force: Color changeable poly(ethylene-vinyl acetate) and poly(ethylene-octene) in response to mechanical force. Polymer, vol. 112, Mar. 10, 2017, pp. 219-227. (Year: 2017).*

Qiu et al. Color-Switchable Polar Polymeric Materials. ACS Appl. Mater. Interfaces 2019, 11, 32, 29268-29275 (Year: 2019).*

Young et al. Revealing the Dependence of Molecular-Level Force Transfer and Distribution on Polymer Cross-Link Density via Mechanophores. ACS Macro Lett. 2019, 8, 8, 882-887. (Year: 2019).*

G. Kister et al. Mechanophore-linked hydroxyl-terminated polybutadiene for the remote detection and quantification of mechanical stress. Dyes and Pigments, vol. 162, Mar. 2019, pp. 309-314 (Year: 2019).*

Basch H., "Bond Dissociation Energies in Organometallic Compounds", Inorganica Chimica Acta, Nov. 1996, vol. 252(1-2), pp. 265-279.

Kitagawa T., et al., "Structural Dependence of Heterolytic Bond Dissociation Energy of carbon-carbon σ Bonds in Hydrocarbons", Journal of Physical Organic Chemistry, vol. 11(3), Dec. 1998, pp. 157-170.

Luo Y., "Handbook of Bond Dissociation Energies in Organic Compounds" CRC Press, 2002, 362 pages.

Marcin et al., "Nanohydrogel With N, N'bis (Acryloyl) cystine Crosslinker for High Drug Loading," International Journal of Pharmaceutics, Elsevier, Mar. 18, 2017, pp. 336-342, XP085102102, ISSN: 0378-5173.

McMillen D.F., et al., "Hydrocarbon Bond Dissociation Energies", Annual Review of Physical Chemistry, 1982, vol. 33(1), pp. 493-532.

Tumbleston J.R., et al., "Continuous Liquid Interface Production of 3D Objects," Science, 2015, vol. 347(6228), pp. 1349-1352.

Yilgor et al., "Hydrogen Bonding and Polyurethane Morphology. I. Quantum Mechanical Calculations of Hydrogen Bond Energies and Vibrational Spectroscopy of Model Compounds," Polymer, Elsevier Science Publishers, Nov. 1, 2002, vol. 43(24), pp. 6551-6559, ISSN: 0032-3861, XP004383542.

Zhong et al., "Dually Cross-linked Single Network Poly(Acrylic Acid) Hydrogels With Superior Mechanical Properties and Water Absorbency," Soft Matter, Jan. 1, 2016, vol. 12(24), pp. 5420-5428, XP055810940, ISSN: 1744-683X.

* cited by examiner

| Bond | Bond Energy (kJ/mol) | Bond | Bond Energy (kJ/mol) |
|---|---|---|---|
| H—H | 436 | O—O | 140 |
| H—C | 415 | O=O | 498 |
| H—N | 390 | O—F | 160 |
| H—O | 464 | O—Si | 370 |
| H—F | 569 | O—P | 350 |
| H—Si | 395 | O—Cl | 205 |
| H—P | 320 | O—I | 200 |
| H—S | 340 | F—F | 160 |
| H—Cl | 432 | F—Si | 540 |
| H—Br | 370 | F—P | 489 |
| H—I | 295 | F—S | 285 |
| C—C | 345 | F—Cl | 255 |
| C=C | 611 | F—Br | 235 |
| C≡C | 837 | Si—Si | 230 |
| C—N | 290 | Si—P | 215 |
| C=N | 615 | Si—S | 225 |
| C≡N | 891 | Si—Cl | 359 |
| C—O | 350 | Si—Br | 290 |
| C=O | 741 | Si—I | 215 |
| C≡O | 1080 | P—P | 215 |
| C—F | 439 | P—S | 230 |
| C—Si | 360 | P—Cl | 330 |
| C—P | 265 | P—Br | 270 |
| C—S | 260 | P—I | 215 |
| C—Cl | 330 | S—S | 215 |
| C—Br | 275 | S—Cl | 250 |
| C—I | 240 | S—Br | 215 |
| N—N | 160 | Cl—Cl | 243 |
| N=N | 418 | Cl—Br | 220 |
| N≡N | 946 | Cl—I | 210 |
| N—O | 200 | Br—Br | 190 |
| N—F | 270 | Br—I | 180 |
| N—P | 210 | I—I | 150 |
| N—Cl | 200 | | |
| N—Br | 245 | | |

FIG. 5

— Polymer chain

○ First weak bond

● Second weak bond

RG Reactive Group

WEAK COVALENT CROSSLINKS IN THERMOSET MATERIALS FOR INCREASED TOUGHNESS

CROSS-REFERENCE

This application claims the benefit of U.S. Provisional Patent Application No. 62/989,307 filed on Mar. 13, 2020, and U.S. Provisional Patent Application No. 62/989,314 filed on Mar. 13, 2020, the entire contents of each of which are incorporated herein by reference.

BACKGROUND OF THE INVENTION

Polyurethanes have been incorporated into many devices and materials. Tough polyurethanes have high levels of hydrogen bonding, which is a weak dynamic bond that increases toughness of the materials. These weak hydrogen bonds accumulate along the polyurethane chain and raise the toughness of the material.

The presence of weak hydrogen bonds in polyurethanes render the materials susceptible to reduced property performance in the presence of water. Materials with high levels of hydrogen bonding tend to absorb water, which can act as a plasticizer to the polymer network, decreasing the ability of the polymer to resist long-term creep or stress. Water also decreases toughness of the polymer materials due to the influence of water on the dynamic hydrogen bonds, making the hydrogen bonds more dynamic and weaker. Tough polymeric materials exposed to aqueous environments (e.g., polyurethane orthodontic appliances exposed to a mouth) can suffer from water interference with these hydrogen bonds.

SUMMARY OF THE INVENTION

Provided herein are polymeric materials comprising weak covalent crosslinking units. Such polymeric materials can increase toughness of materials without being substantially affected by the presence of water, and have applications for use including in direct fabrication of appliances (e.g., orthodontic appliances). Also provided herein are objects manufactured using the polymeric materials, resins for forming the polymeric materials and objects made therefrom, and methods of forming and using the polymeric materials.

In various aspects, the present disclosure provides a polymeric material comprising a first polymer chain; a second polymer chain; and a weak crosslinking unit attached at a first end of the weak crosslinking unit to the first polymer chain and attached at a second end of the weak crosslinking unit to the second polymer chain, the weak crosslinking unit comprising a weak crosslinking bond positioned between the first end and the second end, wherein the weak crosslinking bond has a bond dissociation energy from 50 kJ/mol to 325 kJ/mol. In some aspects, the weak crosslinking unit is the weak crosslinking bond. In some aspects, the polymeric material comprises a plurality of weak crosslinking units. In some aspects, the plurality of weak crosslinking units are attached at a first end to the first polymer chain and attached at a second end to the second polymer chain.

In various aspects, the present disclosure provides a polymeric material comprising a first polymer chain; a second polymer chain; and a weak crosslinking bond attached at a first end to the first polymer chain and attached at a second end to the second polymer chain, wherein the weak crosslinking bond has a bond dissociation energy from 50 kJ/mol to 325 kJ/mol. In some aspects, the polymeric material comprises a plurality of weak crosslinking bonds. In some aspects, the plurality of weak crosslinking bonds are attached at a first end to the first polymer chain and attached at a second end to the second polymer chain.

In various aspects, the present disclosure provides a polymeric material comprising: a first polymer chain; a second polymer chain; and an activatable unit attached at a first end to the first polymer chain and attached at a second end to the second polymer chain, wherein the activatable unit converts to a weak crosslinking unit when activated by a catalyst, the weak crosslinking unit being attached at a first end to the first polymer chain and attached at a second end to the second polymer chain, the weak crosslinking unit comprising a weak crosslinking bond positioned between the first end and the second end, the weak crosslinking bond having a bond dissociation energy from 50 kJ/mol to 325 kJ/mol. In some aspects, the weak crosslinking unit is the weak crosslinking bond. In certain aspects, the polymeric material further comprises the catalyst.

In some aspects, the bond dissociation energy of the weak crosslinking bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some aspects, the first polymer chain, the second polymer chain, or each of the first polymer chain and the second polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In certain aspects, the polymeric material comprises a ratio of the longest length of the weak crosslinking unit to the longest length of the first polymer chain, wherein the ratio is less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some aspects, the polymeric material comprises a ratio of the longest length of the weak crosslinking unit to the longest length of the first polymer chain, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500. In some aspects, the polymeric material comprises a ratio of the longest length of the weak crosslinking unit to the longest length of the second polymer chain, wherein the ratio is less than or equal to 1:10, less than or equal to 1:20, less than or equal to 1:30, less than or equal to 1:40, less than or equal to 1:50, less than or equal to 1:75, less than or equal to 1:100, or less than or equal to 1:200, less than or equal to 1:300, less than or equal to 1:400, or less than or equal to 1:500. In some aspects, the polymeric material comprises a ratio of the longest length of the weak crosslinking unit to the longest length of the second polymer chain, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500.

In some aspects, the polymeric material further comprises a strong crosslinking unit, wherein the strong crosslinking unit is attached at a first end to the first polymer chain, the strong crosslinking unit is attached at a second end to the second polymer chain, and the strong crosslinking unit comprises one or more bonds forming a chain connecting to the first end and the second end, each of the one or more bonds having a bond dissociation energy greater than or equal to 275 kJ/mol. In certain aspects, the polymeric material comprises a ratio of the number of weak crosslinking units to the number of strong crosslinking units, wherein the ratio is from 1:50 to 5:1, from 1:40 to 2:1, from 1:30 to 1:1, from 1:25 to 1:1, from 1:20 to 1:1, from 1:15 to 1:1, from 1:10 to 1:1, from 1:5 to 1:1, from 1:30 to 1:5, from 1:25 to 1:5, from 1:20 to 1:5, from 1:20 to 1:10, or from 1:10 to 1:5. In certain aspects, the ratio is from 1:20 to 1:5. In some aspects, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the weak crosslinking unit. In some aspects, the polymeric material comprises a ratio of a total number of bonds of the weak crosslinking unit to a total number of bonds of the first polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10. In certain aspects, the ratio of the total number of bonds of the weak crosslinking unit to the total number of bonds of the first polymer chain is from 1:1000 to 1:100, from 1:900 to 1:150, from 1:800 to 1:200, or from 1:750 to 1:250.

In some aspects, the polymeric material comprises a ratio of a total number of bonds of the weak crosslinking unit to a total number of bonds of the second polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10. In some aspects, the ratio of the total number of bonds of the weak crosslinking unit to the total number of bonds of the first polymer chain is from 1:1000 to 1:100, from 1:900 to 1:150, from 1:800 to 1:200, or from 1:750 to 1:250. In some aspects, the weak crosslinking bond is a dynamic covalent bond.

In some aspects, the weak crosslinking bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof. In certain aspects, the weak crosslinking bond is a nonpolar covalent bond or a polar covalent bond. In some aspects, the polymeric material comprises less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units. In some aspects, the bond dissociation energy of the weak crosslinking bond is measured as a bond dissociation energy or a bond breaking energy.

In some aspects, the polymeric material is hydrophobic. In some aspects, the polymeric material comprises less than 10 wt %, less than 5 wt %, less than 1 wt %, or less than 0.5 wt % water after being placed in an aqueous environment for 24 hours at 37° C. In some aspects, the polymeric material comprises a plurality of first polymer chains having a first polymer chain average chain length, and a plurality of weak crosslinking units having a weak crosslinking unit average chain length, wherein the weak crosslinking unit average chain length is less than the first polymer chain average chain length. In some aspects, the polymeric material has a ratio of the weak crosslinking unit average chain length to the first polymer chain average chain length, and wherein the ratio is from 1:1.1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:1.1, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some aspects, the polymeric material comprises a plurality of second polymer chains having a second polymer chain average chain length; and a plurality of weak crosslinking units having a weak crosslinking unit average chain length, wherein the weak crosslinking unit average chain length is less than the second polymer chain average chain length.

In some aspects, the first polymer chain, the second polymer chain, or each of the first polymer chain and the second polymer chain comprises a plurality of monomers, each joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some aspects, the first polymer chain is attached to the weak crosslinking unit with a covalent bond. In certain aspects, the second polymer chain is attached to the weak crosslinking unit with a covalent bond. In some aspects, at least 1%, at least 2%, at least 3%, at least 4%, at least 5%, at least 10%, at least 20%, at least 30%, at least 40%, or at least 50% of the weak crosslinking bonds are dynamic covalent bonds. In some aspects, the weak crosslinking bond has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene. In some aspects, the polymeric material comprises a number the weak crosslinking units to a number of strong crosslinking units, wherein the number ratio is greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, or greater than or equal to 50:1.

In some aspects, the polymeric material comprises a number ratio of weak crosslinking units to strong crosslinking units, wherein the number ratio is from 1:100 to 1:1, from 1:50 to 1:1, from 1:20 to 1:1, from 1:10 to 1:1, from 1:50 to 50:1, from 1:40 to 40:1, from 1:30 to 30:1, from 1:20 to 20:1, from 1:10 to 10:1, from 1:1 to 1:100, from 1:5 to 1:100, from 1:10 to 1:100, from 1:20 to 1:100, from 1:50 to 1:100, greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, greater than or equal to 50:1, or greater than or equal to 1:100.

In some aspects, the polymeric material is characterized by one or more of: a tensile modulus greater than or equal to 100 MPa after being placed in an aqueous environment for 24 hours at 37° C.; a tensile strength at yield greater than or equal to 5 MPa after being placed in an aqueous environment for 24 hours at 37° C.; a storage modulus greater than or equal to 300 MPa after being placed in an aqueous environment for 24 hours at 37° C.; a flexural stress of greater than or equal to 1.5 MPa remaining after 24 hours after being placed in an aqueous environment for 24 hours at 37° C.; a hardness from 60 Shore A to 85 Shore D after being placed in an aqueous environment for 24 hours at 37° C.; and an elongation at break greater than or equal to 15% after being placed in an aqueous environment for 24 hours at 37° C. In some aspects, the polymeric material is characterized by a flexural stress remaining greater than 5% at 24 hours testing in a wet environment at 37° C. In some aspects, the polymeric material is characterized by a stress remaining after 24 hours testing in a wet environment at 37° C. of 5% to 45% of the initial load, or a stress remaining of 20% to 45% of the initial load. In some aspects, the polymeric material is characterized by a tensile modulus after 24 hours testing in a wet environment at 37° C. from 100 MPa to 3000 MPa, from 100 MPa to 2500 MPa, from 100 MPa to 2000 MPa, from 500 MPa to 3000 MPa, from 500 MPa to 2500 MPa, from 500 MPa to 2000 MPa, from 750 MPa to 3000 MPa, from 750 MPa to 2500 MPa, or from 750 MPa to 2000 MPa. In some aspects, the polymeric material is characterized by an elongation at break after 24 hours testing in a wet environment at 37° C. greater than 10%, an elongation at break greater than 20%, an elongation at break greater than 30%, an elongation at break of 5% to 250%, an elongation at break of 20% to 250%, or an elongation at break value between 40% and 250%. In some aspects, the polymeric material is characterized by a storage modulus after 24 hours testing in a wet environment at 37° C. of 0.1 MPa to 4000 MPa, a storage modulus of 300 MPa to 3000 MPa, or a storage modulus of 750 MPa to 3000 MPa. In some aspects, the polymeric material is characterized by a stress remaining after 24 hours testing in a wet environment at 37° C. of 0.01 MPa to 15 MPa, or a stress remaining of 2 MPa to 15 MPa. In some aspects, greater than 70% of visible light passes through the polymeric material. In some aspects, the polymeric material is biocompatible, bioinert, or a combination thereof.

In some aspects, the polymeric material has a ratio of the weak crosslinking unit average chain length to the second polymer chain average chain length, and wherein the ratio is from 1:1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some aspects, the second polymer chain average chain length is greater than the weak crosslinking unit average chain length.

In various aspects, the present disclosure provides an orthodontic appliance comprising the polymeric material disclosed herein. In some aspects, the orthodontic appliance is an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the orthodontic appliance is an aligner.

In various aspects, the present disclosure provides a printable resin comprising: a plurality of monomers, optionally wherein the plurality of monomers are comprised in an oligomer having an average chain length from 1 kDa to 20 kDa; a weak crosslinking unit comprising a first end and a second end, the weak crosslinking unit comprising a weak crosslinking bond positioned between the first end and the second end; and an initiator, wherein the weak crosslinking bond has a weak bond dissociation energy from 50 kJ/mol to 325 kJ/mol.

In various aspects, the present disclosure provides a printable resin comprising: a plurality of monomers, optionally wherein the plurality of monomers are comprised in an oligomer having an average chain length from 1 kDa to 20 kDa; an activatable unit; and an initiator, wherein the activatable unit converts to a weak crosslinking unit when activated by a catalyst and comprising a weak crosslinking bond positioned between a first end of the weak crosslinking unit and a second end of the weak crosslinking unit, the weak crosslinking bond having a bond dissociation energy from 50 kJ/mol to 325 kJ/mol. In some aspects, the printable resin further comprises the catalyst.

In various aspects, the present disclosure provides a printable resin comprising: a plurality of monomers, the plurality of monomers comprising: a first monomer comprising a first weak bond forming unit; and a second monomer comprising a second weak bond forming unit; and an initiator wherein: the first weak bond forming unit and the second weak bond forming unit combine thereby forming a weak crosslinking unit comprising a first end and a second end, and a weak crosslinking bond positioned between the first monomer and the second monomer; the weak crosslinking bond has a weak bond dissociation energy from 50 kJ/mol to 325 kJ/mol; and optionally wherein at least some of the plurality of monomers are comprised in an oligomer having an average chain length from 1 kDa to 20 kDa.

In some aspects, the weak crosslinking unit is the weak crosslinking bond. In some aspects, the printable resin comprises the oligomer having an average chain length from 1 kDa to 20 kDa, the oligomer comprising at least some of the plurality of monomers. In some aspects, the printable resin comprises a plurality of unreacted monomers and at least one oligomer having a chain length from 1 kDa to 20 kDa. In some aspects, the initiator is a photoinitiator, a thermal initiator, or a combination thereof. In some aspects, the first end of the weak crosslinking unit comprises a first end reactive functional group. In some aspects, the first end reactive functional group is selected from the group consisting of an acrylate, a methacrylate, a thiol, an epoxide, an allyl ether, a hydroxyl, an amine, a derivative thereof, and a combination thereof. In some aspects, the second end of the weak crosslinking unit comprises a second end reactive functional group. In some aspects, the second end reactive functional group is selected from the group consisting of an acrylate, a methacrylate, a thiol, an epoxide, an allyl ether, a hydroxyl, an amine, a derivative thereof, and a combination thereof. In some aspects, the first end reactive functional group and the second end reactive functional group are the same. In some aspects, the first end reactive functional group and the second end reactive functional group are different functional groups.

In some aspects, the bond dissociation energy of the weak crosslinking bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some aspects, the weak crosslinking bond has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene. In some aspects, the oligomer comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some aspects, the printable resin comprises a ratio of the longest length of the weak crosslinking unit to the longest length of the oligomer, wherein the ratio is less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some aspects, the printable resin comprises a ratio of the longest length of the weak crosslinking unit to the longest length of the oligomer, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500.

In some aspects, the printable resin further comprises a strong crosslinking unit, wherein the strong crosslinking unit comprises a first end and a second end, and the strong crosslinking unit comprises one or more bonds forming a chain connecting to the first end and the second end, each of the one or more bonds having a bond dissociation energy greater than or equal to 300 kJ/mol. In some aspects, the plurality of monomers further comprise: a third monomer comprising a first strong bond forming unit; and a fourth monomer comprising a second strong bond forming unit, wherein the first strong bond forming unit and the second strong bond forming unit combine thereby forming a strong crosslinking unit positioned between the third monomer and the fourth monomer, the strong crosslinking unit comprising one or more bonds, and the one or more bonds each having a bond dissociation energy greater than or equal to 300 kJ/mol. In some aspects, the first end of the strong crosslinking unit comprises a first end reactive functional group, the second end of the strong crosslinking unit comprises a second end reactive functional group, or a combination thereof.

In some aspects, the printable resin comprises from 0.1 wt % to 50 wt %, from 1 wt % to 30 wt %, from 2 wt % to 10 wt %, less than 10 wt %, less than 5 wt %, less than 1 wt %, less than 0.5 wt %, or less than 0.1 wt % of the weak crosslinking unit. In some aspects, the weak crosslinking bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof. In some aspects, the weak crosslinking bond is a nonpolar covalent bond or a polar covalent bond. In some aspects, the printable resin comprises less than 10 wt % hydrogen bonding units. In some aspects, the bond dissociation energy of the weak crosslinking bond is measured as a bond dissociation energy or a bond breaking energy.

In some aspects, the printable resin further comprises a plurality of oligomers having an oligomer average chain length; and a plurality of weak crosslinking units having a weak crosslinking unit average chain length, wherein the weak crosslinking unit average chain length is less than the oligomer average chain length. In some aspects, the resin has a ratio of the weak crosslinking unit average chain length to the oligomer average chain length, and wherein the ratio is from 1:1.1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500.

In some aspects, the oligomer comprises a plurality of monomers, each joined with a backbone covalent bond having a bond dissociation energy greater than or equal to 300 kJ/mol. In some aspects, the printable resin further comprises a reactive diluent, a crosslinking modifier, a light blocker, a solvent, a glass transition temperature modifier, a thermal initiator, or a combination thereof. In some aspects, the printable resin further comprises at least one of a polymerization catalyst, an inhibitor, a plasticizer, a surface energy modifier, a pigment, a dye, a filler, a crystallization seed, a crystallization catalyst, a biological agent, a catalyst for selectively breaking bonds, or any combination thereof.

In some aspects, the weak crosslinking unit comprises a polymerizable group. In some aspects, the polymerizable group is selected from the group consisting of a vinyl group, an allyl group, an allyl ether, an acrylate group, a methacrylate group, an acrylamide group, an epoxy group, an oxetanyl group, a thiol group, a hydroxyl, an amine, a derivative thereof, and a combination thereof. In some aspects, the oligomer comprises a polymerizable group. In some aspects, the polymerizable group of the oligomer is selected from the group consisting of a vinyl group, an allyl group, an allyl ether, an acrylate group, a methacrylate group, an acrylamide group, an epoxy group, an oxetanyl group, a thiol group, a hydroxyl, an amine, a derivative thereof, and a combination thereof.

In some aspects, the printable resin has a viscosity from 0.5 PaS to 20 PaS at a printable temperature. In some aspects, the printable temperature is from 70° C. to 110° C. In some aspects, the printable temperature is 90° C. In some aspects, the resin is capable of being 3D printed.

In various aspects, the present disclosure provides a polymeric material, the method comprising: providing the resin disclosed herein; and curing the resin with a light source, thereby forming the polymeric material. In some aspects, the method further comprises providing the catalyst forming the weak crosslinking bond. In some aspects, the polymeric material is the polymeric material disclosed herein. In some aspects, the method further comprises fabricating an object with the polymeric material.

In some aspects, the fabricating comprises printing with a 3D printer. In some aspects, the fabricating comprises hot lithography. In some aspects, the fabricating comprises digital light projection. In some aspects, the object is an orthodontic appliance. In some aspects, the orthodontic appliance is an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the object is the orthodontic appliance as disclosed herein. In some aspects, the object is an aligner.

In various aspects, the present disclosure provides a polymeric material produced by the method described herein. In some aspects, a stress applied to the polymeric material breaks the weak crosslinking bond prior to breaking a covalent bond of the first polymer chain or the second polymer chain.

In various aspects, the present disclosure provides a method of repositioning a patient's teeth, the method comprising: applying the orthodontic appliance described herein to at least one of the patient's teeth; and moving at least one of the patient's teeth toward an intermediate arrangement or a final tooth arrangement.

In various aspects, the present disclosure provides a method of repositioning a patient's teeth, the method comprising: generating a treatment plan for a patient, the plan comprising a plurality of intermediate tooth arrangements for moving teeth along a treatment path from an initial arrangement toward a final arrangement; producing a 3D printed orthodontic appliance comprising a plurality of weak crosslinking units comprising a weak crosslinking bond; and moving on-track, with the orthodontic appliance, at least one of the patient's teeth toward an intermediate arrangement or a final tooth arrangement, wherein the weak crosslinking bond has a bond dissociation energy from 50 kJ/mol to 325 kJ/mol.

In some aspects, the method further comprises tracking progression of the patient's teeth along the treatment path after administration of the orthodontic appliance, the tracking comprising comparing a current arrangement of the patient's teeth to a planned arrangement of the teeth. In some aspects, greater than 60% of the patient's teeth are on track with the treatment plan after 2 weeks of treatment. In some aspects, the orthodontic appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth. In some aspects, the method further comprises achieving on-track the movement of the at least one of the patient's teeth to the intermediate arrangement or the final tooth arrangement. In some aspects, the producing comprises direct fabrication, and optionally wherein the direct fabrication comprises cross-linking the printable resin disclosed herein. In some aspects, the 3D printed orthodontic appliance is the orthodontic appliance described herein.

Provided herein are polymeric materials comprising rings, the rings comprising weak bonds. Such polymeric materials can have controllable elongation to tensile strain without compromising polymer backbones, increasing survival to stress relaxation. Such polymeric materials can also increase toughness of the materials without being substantially affected by the presence of water, and have applications for use including in direct fabrication of appliances (e.g., orthodontic appliances). Also provided herein are polymer chains comprising the rings, objects manufactured using the polymeric materials and/or chains, resins for forming the polymeric materials and/or chains and objects made therefrom, and methods of forming and using the polymeric materials and/or chains.

In various aspects, the present disclosure provides a composition comprising: a polymer chain comprising: a ring comprising three or more ring members; a first bond positioned between a first set of two ring members and having a bond dissociation energy less than 325 kJ/mol; and a second bond positioned between a second set of two ring members and having a bond dissociation energy greater than 325 kJ/mol.

In various aspects, the present disclosure provides a composition comprising: a polymer chain comprising: a ring comprising three or more ring members; a first bond positioned between a first set of two ring members, wherein upon catalyst activation, the first bond is convertible to a bond having a bond dissociation energy less than 325 kJ/mol; and a second bond positioned between a second set of two ring members and having a bond dissociation energy greater than 325 kJ/mol.

In some aspects, the first bond has a bond dissociation energy from 50 kJ/mol to 325 kJ/mol. In some aspects, the ring comprises a plurality of bonds between sets of two ring members, each having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the first bond. In certain aspects, the ring comprises a substituted or unsubstituted cycloalkane, a substituted or unsubstituted heterocyclic ring, a substituted or unsubstituted inorganic ring, a derivative thereof, or a combination thereof. In some aspects, the first bond is a covalent bond, a double hydrogen bond, a plurality of hydrogen bonds, an ionic bridge, or a combination thereof. In various aspects, the ring comprises a weak bridge, the weak bridge comprising the first bond.

In some aspects, the polymer chain comprises a first portion and a second portion, the first portion of the polymer chain is attached to the ring at a first connector, and the second portion of the polymer chain is attached to the ring at a second connector. In some aspects, the first bond is positioned between the first connector and the second connector, and wherein the second bond is positioned between the first connector and the second connector.

In some aspects, the bond dissociation energy of the first bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In certain aspects, the polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the first bond.

In some aspects, the polymer chain comprises a plurality of rings, each of the plurality of rings comprising: three or more ring members; a first bond positioned between a first set of two ring members and having a bond dissociation energy less than 325 kJ/mol; and a second bond positioned between a second set of two ring members and having a bond dissociation energy greater than 325 kJ/mol. In some aspects, the polymer chain comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the ring. In certain aspects, the polymer chain comprises a ratio of a total number of bonds of the ring to a total number of bonds of the polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10.

In some aspects, the ring comprises 3, 4, 5, 6, 7, 8, 9, 10, 11, 12, 13, 14, 15, 16, 17, 18, 19, 20, or greater than 20 ring members. In certain aspects, the ring comprises greater than 10, greater than 15, greater than 20, greater than 25, greater than 30, greater than 35, greater than 40, greater than 45, or greater than 50 ring members.

In some aspects, the first bond is a dynamic covalent bond. In certain aspects, the first bond is a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof. In some aspects, the first bond is a nonpolar covalent bond or a polar covalent bond. In some aspects, the bond dissociation energy of the first bond is measured as a bond dissociation energy or a bond breaking energy.

In some aspects, the polymer chain is hydrophobic. In certain aspects, the first bond has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene.

In various aspects, the present disclosure provides a polymeric material comprising the composition described herein. In various aspects, the present disclosure provides a polymeric material comprising: a ring comprising three or more ring members; a first bond positioned between a first set of two ring members and having a bond dissociation energy less than 325 kJ/mol; and a second bond positioned between a second set of two ring members and having a bond dissociation energy greater than 325 kJ/mol.

In various aspects, the present disclosure provides a polymeric material comprising: a ring comprising three or more ring members; a first bond positioned between a first set of two ring members, wherein upon catalyst activation, the first bond is convertible to a bond having a bond dissociation energy less than 325 kJ/mol; and a second bond positioned between a second set of two ring members and having a bond dissociation energy greater than 325 kJ/mol.

In some aspects, the polymeric material further comprises catalyst. In some aspects, the polymeric material comprises less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units. In some aspects, the polymeric material comprises less than 10 wt %, less than 5 wt %, less than 1 wt %, or less than 0.5 wt % water after being placed in an aqueous environment for 24 hours at 37° C.

In some aspects, the polymeric material is hydrophobic. In some aspects, the polymeric material comprises a plurality rings, each of the rings comprising: three or more ring members; a first bond positioned between a first set of two ring members and having a bond dissociation energy less than 325 kJ/mol; and a second bond positioned between a second set of two ring members and having a bond dissociation energy greater than 325 kJ/mol. In some aspects, the polymeric material comprises greater than 0.1 wt %, greater than 0.5 wt %, greater than 1 wt %, greater than 2 wt %, greater than 3 wt %, greater than 4 wt %, greater than 5 wt %, greater than 6 wt %, greater than 7 wt %, greater than 8 wt %, greater than 9 wt %, greater than 10 wt %, greater than 15 wt %, greater than 20 wt %, greater than 25 wt %, greater than 30 wt %, greater than 35 wt %, greater than 40 wt %, greater than 45 wt %, greater than 50 wt %, greater than 60 wt %, or greater than 70 wt % of the ring or rings.

In some aspects, the polymeric material is characterized by one or more of: a tensile modulus greater than or equal to 100 MPa after being placed in an aqueous environment for 24 hours at 37° C.; a tensile strength at yield greater than or equal to 5 MPa after being placed in an aqueous environment for 24 hours at 37° C.; a storage modulus greater than or equal to 300 MPa after being placed in an aqueous environment for 24 hours at 37° C.; a flexural stress of greater than or equal to 1.5 MPa remaining after 24 hours after being placed in an aqueous environment for 24 hours at 37° C.; a hardness from 60 Shore A to 85 Shore D after being placed in an aqueous environment for 24 hours at 37° C.; and an elongation at break greater than or equal to 15% after being placed in an aqueous environment for 24 hours at 37° C.

In some aspects, the polymeric material is characterized by a flexural stress remaining greater than 5% at 24 hours testing in a wet environment at 37° C. In some aspects, the polymeric material is characterized by a stress remaining after 24 hours testing in a wet environment at 37° C. of 5% to 45% of the initial load, or a stress remaining of 20% to 45% of the initial load. In some aspects, the polymeric material is characterized by a tensile modulus after 24 hours testing in a wet environment at 37° C. from 100 MPa to 3000 MPa, from 100 MPa to 2500 MPa, from 100 MPa to 2000 MPa, from 500 MPa to 3000 MPa, from 500 MPa to 2500 MPa, from 500 MPa to 2000 MPa, from 750 MPa to 3000 MPa, from 750 MPa to 2500 MPa, or from 750 MPa to 2000 MPa. In some aspects, the polymeric material is characterized by an elongation at break after 24 hours testing in a wet environment at 37° C. greater than 10%, an elongation at break greater than 20%, an elongation at break greater than 30%, an elongation at break of 5% to 250%, an elongation at break of 20% to 250%, or an elongation at break value between 40% and 250%. In some aspects, the polymeric material is characterized by a storage modulus after 24 hours testing in a wet environment at 37° C. of 0.1 MPa to 4000 MPa, a storage modulus of 300 MPa to 3000 MPa, or a storage modulus of 750 MPa to 3000 MPa. In some aspects, the polymeric material is characterized by a stress remaining after 24 hours testing in a wet environment at 37° C. of 0.01 MPa to 15 MPa, or a stress remaining of 2 MPa to 15 MPa. In some aspects, greater than 70% of visible light passes through the polymeric material. In some aspects, the polymeric material is biocompatible, bioinert, or a combination thereof.

In various aspects, the present disclosure provides an orthodontic appliance comprising the polymeric material described herein. In various aspects, the present disclosure provides an orthodontic appliance comprising the composition described herein. In some aspects, the orthodontic appliance is an aligner, expander or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the orthodontic appliance is an aligner.

In various aspects, the present disclosure provides a resin comprising: a plurality of monomers, optionally wherein the plurality of monomers are comprised in an oligomer having an average chain length from 1 kDa to 30 kDa; and a ring monomer comprising: three or more ring members; a first bond positioned between a first set of two ring members and having a bond dissociation energy less than 325 kJ/mol; a second bond positioned between a second set of two ring members and having a bond dissociation energy greater than 325 kJ/mol; a first connector attached to the ring comprising a first reactive group; and a second connector attached to the ring comprising a second reactive group.

In various aspects, the present disclosure provides a resin comprising: a plurality of monomers, optionally wherein the plurality of monomers are comprised in an oligomer having an average chain length from 1 kDa to 30 kDa; a ring monomer comprising: three or more ring members; a first bond positioned between a first set of two ring members, wherein upon catalyst activation, the first bond is convertible to a bond having a bond dissociation energy less than 325 kJ/mol; a second bond positioned between a second set of two ring members and having a bond dissociation energy greater than 325 kJ/mol; a first connector attached to the ring comprising a first reactive group; and a second connector attached to the ring comprising a second reactive group.

In some aspects, the resin further comprises the catalyst. In some aspects, the resin further comprises an initiator. In some aspects, the first connector and the second connector are each covalently attached to the ring. In some aspects, the first connector and the second connector are each positioned external to the ring. In some aspects, the resin comprises the oligomer having an average chain length from 1 kDa to 30 kDa, the oligomer comprising at least some of the plurality of monomers.

In some aspects, the initiator is a photoinitiator, a thermal initiator, or a combination thereof. In some aspects, the first reactive group, the second reactive group, or a combination thereof comprises an acrylate, a methacrylate, a thiol, an epoxide, an allyl ether, a hydroxyl, an amine, a derivative thereof, and a combination thereof. In some aspects, the bond dissociation energy of the first bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some aspects, the oligomer comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the first bond. In some aspects, the ring comprises a plurality of bonds between sets of two ring members, each having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the first bond. In some aspects, the first bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof. In some aspects, the first bond is a nonpolar covalent bond or a polar covalent bond.

In some aspects, the resin comprises less than 10 wt % hydrogen bonding units. In some aspects, the resin further comprises a reactive diluent, a crosslinking modifier, a light blocker, a solvent, a glass transition temperature modifier, a thermal initiator, or a combination thereof. In some aspects, the resin further comprises at least one of a polymerization catalyst, an inhibitor, a plasticizer, a surface energy modifier, a pigment, a dye, a filler, a crystallization seed, a crystallization catalyst, a biological agent, a catalyst for selectively breaking bonds, or any combination thereof.

In some aspects, the oligomer comprises a polymerizable group. In some aspects, the polymerizable group of the oligomer is selected from the group consisting of a vinyl group, an allyl group, an allyl ether, an acrylate group, a methacrylate group, an acrylamide group, an epoxy group, an oxetanyl group, a thiol group, a hydroxyl, an amine, a derivative thereof, and a combination thereof. In some aspects, the resin has a viscosity from 0.5 PaS to 20 PaS at a printable temperature. In some aspects, the printable temperature is from 70° C. to 110° C. In some aspects, the printable temperature is 90° C. In some aspects, the resin is capable of being 3D printed.

In various aspects, the present disclosure provides a method of forming a polymeric material, the method comprising: providing a resin disclosed herein; and curing the resin with a light source, thereby forming the polymeric material. In some aspects, the method further comprises providing the catalyst forming the weak bond. In some aspects, the polymeric material is a polymeric material disclosed herein. In some aspects, the polymeric material comprises a composition described herein.

In some aspects, the method further comprises fabricating an object with the polymeric material and/or the composition. In some aspects, the fabricating comprises printing with a 3D printer. In some aspects, the fabricating comprises hot lithography. In some aspects, the fabricating comprises digital light projection.

In some aspects, the object is an orthodontic appliance. In some aspects, the orthodontic appliance is an aligner, expander, or spacer. In some aspects, the orthodontic appliance comprises a plurality of tooth receiving cavities configured to reposition teeth from a first configuration toward a second configuration. In some aspects, the orthodontic appliance is one of a plurality of orthodontic appliances configured to reposition the teeth from an initial configuration toward a target configuration. In some aspects, the orthodontic appliance is one of a plurality of orthodontic appliances configured to reposition the teeth from an initial configuration toward a target configuration according to a treatment plan. In some aspects, the object is an orthodontic appliance described herein. In some aspects, the object is an aligner.

In various aspects, the present disclosure provides a polymeric material produced by a method described herein. In some aspects, a stress applied to the polymeric material or composition breaks the first bond prior to breaking the second bond.

In various aspects, the present disclosure provides a method of repositioning a patient's teeth, the method comprising: applying an orthodontic appliance disclosed herein to at least one of the patient's teeth; and moving at least one of the patient's teeth toward an intermediate arrangement or a final tooth arrangement.

In various aspects, the present disclosure provides a method of repositioning a patient's teeth, the method comprising: generating a treatment plan for a patient, the plan comprising a plurality of intermediate tooth arrangements for moving teeth along a treatment path from an initial arrangement toward a final arrangement; producing a 3D printed orthodontic appliance comprising: a ring comprising three or more ring members; a first bond positioned between a first set of two ring members and having a bond dissociation energy less than 325 kJ/mol; and a second bond positioned between a second set of two ring members and having a bond dissociation energy greater than 325 kJ/mol; and moving on-track, with the orthodontic appliance, at least one of the patient's teeth toward an intermediate arrangement or a final tooth arrangement.

In various aspects, the present disclosure provides a method of repositioning a patient's teeth, the method comprising: generating a treatment plan for a patient, the plan comprising a plurality of intermediate tooth arrangements for moving teeth along a treatment path from an initial arrangement toward a final arrangement; producing an orthodontic appliance described herein; and moving on-track, with the orthodontic appliance, at least one of the patient's teeth toward an intermediate arrangement or a final tooth arrangement, wherein the first bond has a bond dissociation energy from 50 kJ/mol to 325 kJ/mol.

In some aspects, the method further comprises tracking progression of the patient's teeth along the treatment path after administration of the orthodontic appliance, the tracking comprising comparing a current arrangement of the patient's teeth to a planned arrangement of the teeth. In some aspects, greater than 60% of the patient's teeth are on track with the treatment plan after 2 weeks of treatment. In some aspects, the orthodontic appliance has a retained repositioning force to the at least one of the patient's teeth after 2 days that is at least 10%, at least 20%, at least 30%, at least 40%, at least 50%, at least 60%, or at least 70% of repositioning force initially provided to the at least one of the patient's teeth. In some aspects, the method further achieving on-track the movement of the at least one of the patient's teeth to the intermediate arrangement or the final tooth arrangement.

In some aspects, the producing comprises direct fabrication, and optionally wherein the direct fabrication comprises cross-linking the printable resin described herein. In some aspects, the 3D printed orthodontic appliance is the orthodontic appliance described herein.

In various aspects, the present disclosure provides a composition comprising: a ring monomer comprising: three or more ring members; a first bond positioned between a first set of two ring members and having a bond dissociation energy less than 325 kJ/mol; a second bond positioned between a second set of two ring members and having a bond dissociation energy greater than 325 kJ/mol; a first connector attached to the ring comprising a first reactive group; and a second connector attached to the ring comprising a second reactive group.

In various aspects, the present disclosure provides a composition comprising: a ring monomer comprising: three or more ring members; a first bond positioned between a first set of two ring members, wherein upon catalyst activation, the first bond is convertible to a bond having a bond dissociation energy less than 325 kJ/mol; a second bond positioned between a second set of two ring members and having a bond dissociation energy greater than 325 kJ/mol; a first connector attached to the ring comprising a first reactive group; and a second connector attached to the ring comprising a second reactive group.

In some aspects, the composition further comprises the catalyst. In some aspects, the composition further comprises an initiator. In some aspects, the first connector and the second connector are each covalently attached to the ring. In some aspects, the first connector and the second connector are each positioned external to the ring. In some aspects, the first reactive group, the second reactive group, or a combination thereof comprises an acrylate, a methacrylate, a thiol, an epoxide, an allyl ether, a hydroxyl, an amine, a derivative thereof, and a combination thereof. In some aspects, the bond dissociation energy of the first bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some aspects, the ring comprises a plurality of bonds between sets of two ring members, each having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the first bond. In some aspects, the first bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof. In some aspects, the first bond is a nonpolar covalent bond or a polar covalent bond. In some aspects, the composition comprises less than 10 wt % hydrogen bonding units. In some aspects, the composition is capable of being 3D printed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

FIG. 5 shows exemplary bond dissociation energies.

FIG. 14A illustrates a cyclopropane ring comprising a weak bond.

FIG. 14B illustrates a spiropyran comprising a weak bond. FIG. 14C illustrates a cyclohexane ring comprising a weak bond. FIG. 14D illustrates a ring monomer comprising an ionic bridge as a weak bond. FIG. 14E illustrates a ring monomer comprising weak carbon-sulfur bonds in a weak bridge. FIG. 14F illustrates a ring monomer comprising a weak bridge comprising double hydrogen bonds as a weak bond.

FIG. 15A shows a loop monomer comprising a plurality of rings comprising weak bonds. FIG. 15B shows a loop monomer comprising a plurality of weak bonds positioned on the ring. FIG. 15C shows a loop monomer comprising two rings sharing a weak bond.

DETAILED DESCRIPTION OF THE INVENTION

A. Weak Covalent Crosslinks

Figure 1A:
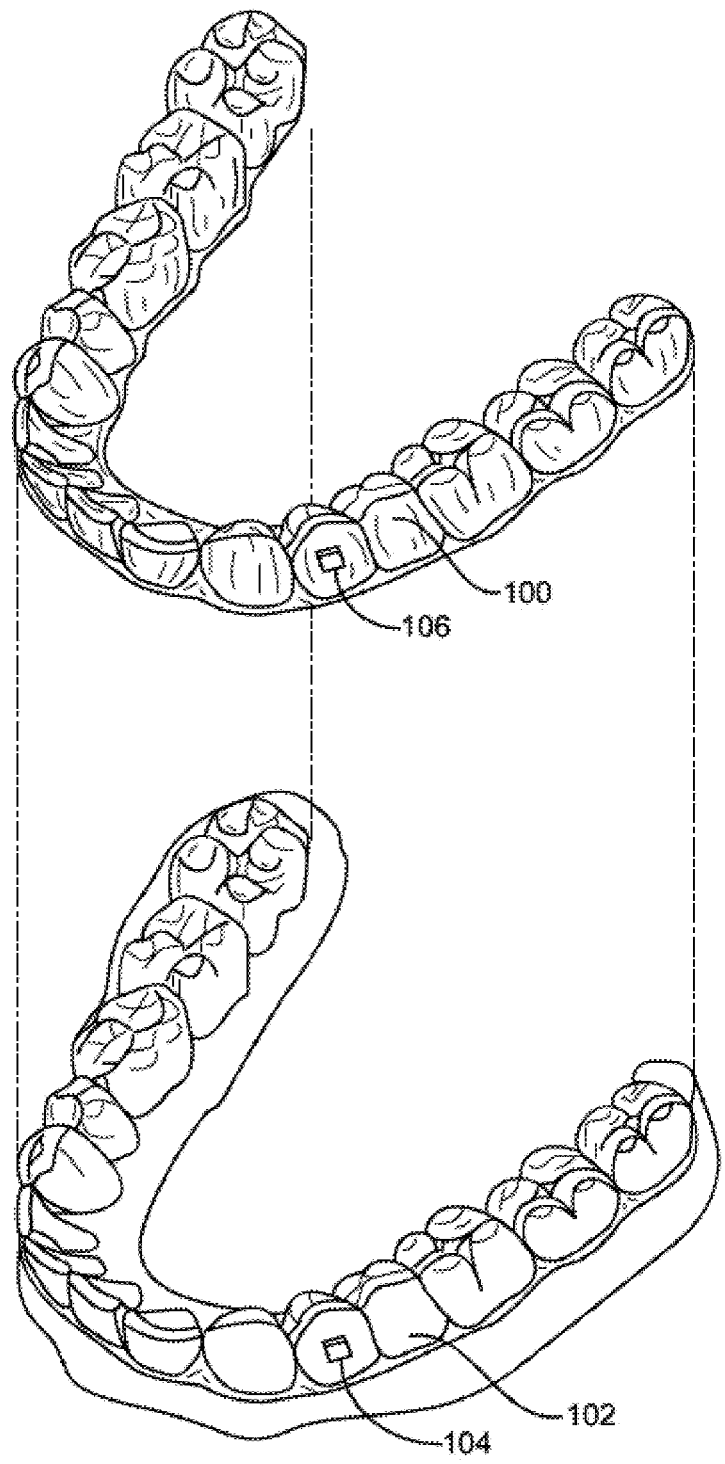
FIG. 1A illustrates a tooth repositioning appliance, in accordance with embodiments.

This disclosure provides polymeric materials comprising weak crosslinking covalent bonds and/or weak crosslinking units comprising a weak covalent bond. Weak covalent bonds are used in place of hydrogen bonds present in traditional polymeric materials (e.g., polyurethanes). Advantageously, the toughness can be controlled by varying the strength of weak covalent bonds and/or by varying the number of weak covalent crosslinks. Crosslinked materials applying the weak covalent crosslinking bonds can be used to create tough materials able to resist stress relaxation.

It has been found that polymeric materials formed from polymers with high levels of hydrogen bonding (e.g., polyurethanes) can suffer from exposure to an aqueous environment. The hydrogen bonding units tend to absorb water, acting as a plasticizer and decreasing the polymer's ability to resist creep or stress. The hydrogen bonds are dynamic bonds, and in the presence of water they are made more dynamic and weaker, thus decreasing the toughness of material in the presence of water. Materials that use hydrogen bonding made for use in wet environments (e.g., orthodontic appliances such as aligners, which are placed in a mouth) therefore suffer from exposure to an aqueous environment. By applying weak covalent crosslinks for use in forming the polymeric materials disclosed herein, products can be created for use in wet or aqueous environments that have increased durability and/or have improved functionality in comparison to standard polyurethanes. As such, the materials disclosed herein are tough and are less susceptible to decreased toughness in the presence of water.

The present polymeric materials can mimic the positive effects caused by the accumulation of hydrogen bonds along the polymer chain (e.g., toughness) without the negative consequences of relying on hydrogen bonds. These polymeric materials remain tough, even in the presence of water. In some embodiments, the polymeric materials described herein are hydrophobic tough materials comprising weak covalent crosslinking bonds; optionally wherein the weak covalent crosslinking bonds are dynamic bonds. A polymeric material incorporating weak covalent bonds (which can also be dynamic) enjoys benefits, such as selective stress focusing. As a non-limiting example, a polymer stressed (e.g., by tensile stress) will focus the stress onto the weak crosslinks; if the bond strengths of the crosslink are weaker than the bond strengths of the polymer backbone, then the crosslink will break, protecting the integrity of the polymer chain. In this manner, breaks in the crosslinks prevent main chain fracture, which in turn prevents crack formation and allows the polymer to be strained further resulting in a tough material. When dynamic weak covalent bonds are used, the material can reform these bonds following the applied stress.

It has also been observed that the resins to form the polymeric materials disclosed herein have low viscosity in comparison to polymeric resins having high levels of hydrogen bonding. Monomers having high levels of hydrogen bonding groups impart increased viscosity to a resin, which in turn can slow down printing speed when using, e.g., direct fabrication to generate a product. By using the resins disclosed herein, printing speed can be increased, leading to decreased time for producing a directly fabricated product.

High viscosity printable resins for formation of tough appliances traditionally require specialized equipment, such as high-temperature 3D printers for use in hot lithography. Customized 3D printers (e.g., high-temperature 3D printers) can be expensive, and the products formed therefrom require rigorous post-processing steps. Low-viscosity resins described herein are suitable for use in conventional printers using conventional post-processing. This can facilitate use of the resins for production of materials that might otherwise require the use of expensive and customized equipment.

I. Polymeric Materials i. Weak Crosslinking Units.

This disclosure provides polymeric materials comprising weak crosslinking units connecting polymer chains. In some embodiments, the weak crosslinking units comprise a first end, a second end, and a weak covalent bond positioned between the first end and the second end. In some embodiments, the weak crosslinking unit is a weak covalent bond. Weak covalent bonds are weaker than covalent bonds of the polymer backbone. A non-limiting example of a polymer backbone is polyacrylate, the carbon-carbon bonds of which tend to have bond dissociation energy from 340 kJ/mol to 360 kJ/mol. In preferred embodiments, the weak covalent bonds are thermally stable at room temperature and/or at human body temperatures (e.g., human mouth temperature). Weak covalent bonds and weak crosslinking units comprising weak covalent bonds described herein crosslink polymers (e.g., polyacrylates)

The hydrogen bonds of traditional polymeric materials (e.g., polyurethane) have a bond strength ("bond dissociation energy") typically in the range from 8 to 30 kJ/mol. Hydrogen bonds are dynamic (i.e., they can be broken and reformed) at room temperature. In some embodiments, the weak covalent bonds described further herein have a bond dissociation energy from 10 to 340 kJ/mol, and preferably from 60 to 200 kJ/mol. In some embodiments, the weak covalent bonds described further herein are dynamic bonds.

As used herein, the terms "bond strength" and "bond dissociation energy" refer to bond dissociation energy. Other tools are available for measuring bond strength, including using heterolytic bond breaking energy or molecular modeling to estimate bond dissociation energies. Exemplary bond dissociation energies are shown in FIG. 5.

In some embodiments, the bond dissociation energy of the weak covalent crosslinking bond ("weak crosslinking bond" or "weak covalent bond") is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, or less than or equal to 150 kJ/mol. In some embodiments, the bond dissociation energy of the weak crosslinking bond is from 50 kJ/mol to 325 kJ/mol, from 50 kJ/mol to 300 kJ/mol, from 55 kJ/mol to 250 kJ/mol, or from 60 kJ/mol to 200 kJ/mol. In certain embodiments, the weak covalent crosslinking bond has a thermal decomposition temperature less than 350° C. In some embodiments, the weak crosslinking bond has a thermal decomposition temperature lower than a thermal decomposition of the first polymer chain and/or a thermal decomposition temperature of the second polymer chain.

In some embodiments, the weak crosslinking bond is a dynamic covalent bond. In some embodiments, the weak crosslinking unit comprises a dynamic covalent bond.

In some embodiments, the weak crosslinking bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof.

In some embodiments, the weak crosslinking bond is attached to one or more stabilizing molecular structures. In some embodiments, the weak crosslinking bond is attached to 1, 2, 3, or more stabilizing molecular structures. In certain embodiments, each side of the weak crosslinking bond is attached to at least one stabilizing molecular structure. Stabilizing molecular structures stabilize a radical or ion formed after a bond breaks. See: McMillen et al., Hydrocarbon Bond Dissociation Energies, *Ann. Rev. Phys. Chem.*, 1982, 33:493-532, incorporated herein by reference. A weak crosslinking bond can be, for example, a carbon-carbon bond positioned between two stabilizing molecular structures. As a non-limiting example, the carbon-carbon bond of 1,1,2,2-tetraphenyl ethane has a bond dissociation energy of 247.3±8.4 kJ/mol while the carbon-carbon bond of ethane has a bond dissociation energy of 377.4±0.8 kJ/mol. See: Luo, Yu-Ran "Handbook of Bond Dissociation Energies in Organic Compounds" CRC Press, 2002, incorporated herein by reference. In some embodiments, the weak crosslinking bond is a carbon-carbon bond. In certain embodiments, the weak crosslinking bond is a carbon-carbon bond wherein one or both carbon atoms are attached to one, two, or more stabilizing molecular structures. In some embodiments, the weak crosslinking bond is a carbon-carbon bond wherein both carbon atoms each are attached to at least one stabilizing molecular structure. In some embodiments, the stabilizing structure is an aromatic ring. In certain embodiments, the stabilizing structure comprises a benzene, a naphthalene, an anthracene, a pyridine, a quinoline, an isoquinoline, a pyrazine, a quinoxaline, an acridine, a pyrimidine, a quinazoline, a pyridazine, a cinnoline, a phthalazine, a 1,2,3-triazine, a 1,2,4-triazine, a s-triazine, furan, a pyrrole, a thiophene, an imidazole, a pyrazole, an oxazole, an isoxazole, or a thiazole.

In some embodiments, the weak crosslinking bond is a nonpolar covalent bond or a polar covalent bond. In certain embodiments, the weak crosslinking bond is an ionic bond. In some embodiments, the weak crosslinking bond is an organometallic bond. Example organometallic bonds have bond dissociation energies as described by Basch "Bond dissociation energies in organometallic compounds" *Inorganica Chima Acta* 252 (1996) 265-279, incorporated herein by reference. In some embodiments, the weak crosslinking bond is a heterolytic bond. Example heterolytic bonds have bond dissociation energies as described by Kitagawa et al., "Structural dependence of heterolytic bond dissociation energy of G carbon-carbon bonds in hydrocarbons" *Journal of Physical Organic Chemistry*, 11 (1998), 157-170, incorporated herein by reference.

In some embodiments, the weak crosslinking bond has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene.

In certain embodiments, the bond dissociation energy of the weak crosslinking bond is measured as a bond dissociation energy or a bond breaking energy.

ii. Compositions of Polymeric Materials

Figure 6:
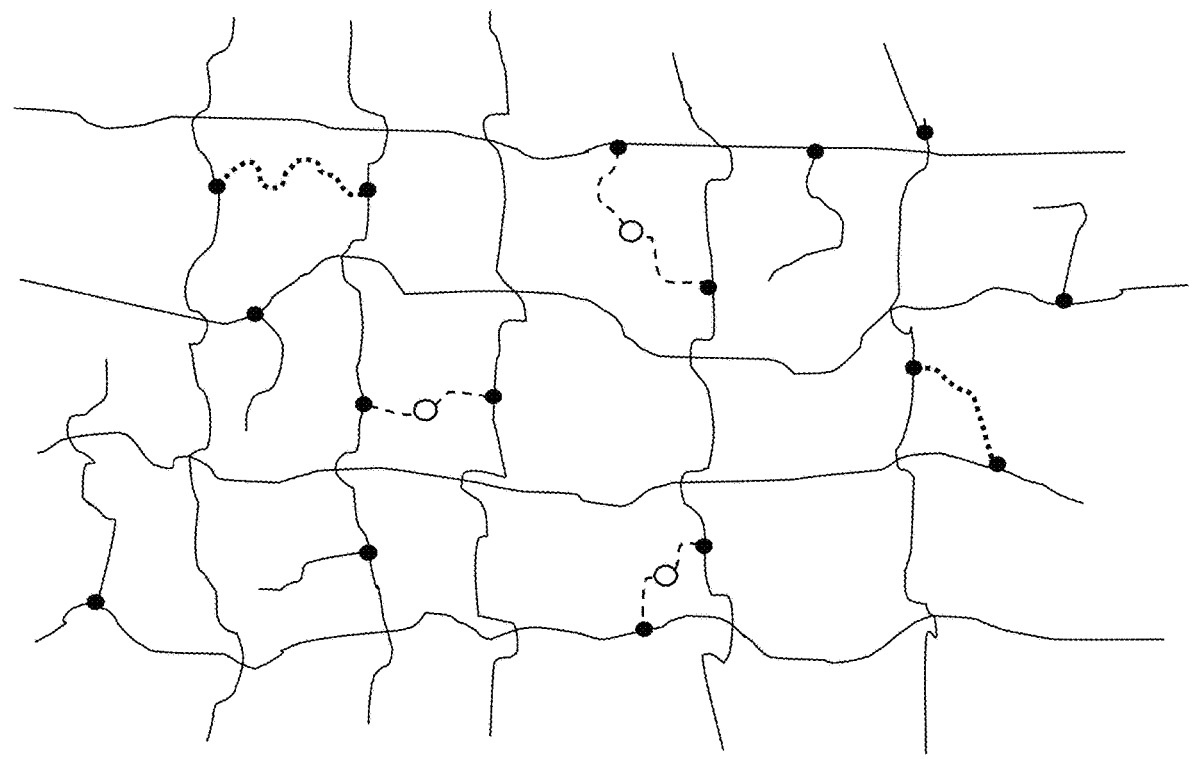
FIG. 6 illustrates a 2-dimensional representation of a structure of a crosslinked network comprising weak crosslinking units and strong crosslinking units.

In some embodiments, this disclosure provides a polymeric material comprising:
  a first polymer chain;
  a second polymer chain; and
  a weak crosslinking unit attached at a first end of the weak crosslinking unit the first polymer chain and attached at a second end of the weak crosslinking unit to the second polymer chain, the weak crosslinking unit comprising a weak crosslinking bond positioned between the first end and the second end. In some embodiments, the weak crosslinking bond has a bond dissociation energy from 50 kJ/mol to 325 kJ/mol. In certain embodiments, the weak crosslinking unit is the weak crosslinking bond. FIG. 6 shows a representation of a crosslinked polymeric material comprising weak crosslinking units attached at a first end to a first polymer chain and attached at a second end to a second polymer chain, comprising a weak bond positioned between the first end and the second end.

In some embodiments, the polymeric material comprises a plurality of weak crosslinking units. In certain embodiments, the polymeric material comprises a plurality of weak crosslinking units so disposed as to crosslink between the first polymer chain and the second polymer chain. In some embodiments, the plurality of weak crosslinking units are dispersed throughout the polymeric material. In some embodiments, a plurality of weak crosslinking units are attached at a first end to the first polymer chain and are attached at a second end to the second polymer chain.

In some embodiments, this disclosure provides a polymeric material comprising:
  a first polymer chain;
  a second polymer chain; and
  a weak crosslinking bond attached at a first end to the first polymer chain and attached at a second end to the second polymer chain. In some embodiments, the weak crosslinking bond has a bond dissociation energy from 50 kJ/mol to 325 kJ/mol. In some embodiments, the polymeric material comprises a plurality of weak crosslinking bonds. In certain embodiments, the plurality of weak crosslinking bonds are attached at a first end to the first polymer chain and attached at a second end to the second polymer chain.

In certain embodiments, this disclosure provides a polymeric material comprising:
  a first polymer chain;
  a second polymer chain; and
  an activatable unit attached at a first end to the first polymer chain and attached at a second end to the second polymer chain. The activatable unit is a unit that can be converted to comprise a weak crosslinking bond. For example, the activatable unit can be a unit absent a weak crosslinking bond, and following activation said unit comprises a weak crosslinking bond. In some embodiments, the activatable unit converts to a weak crosslinking unit (i.e., is activated) when activated by a catalyst, a reagent, and/or a reactant. In some embodiments, the resulting weak crosslinking unit is attached at a first end to the first polymer chain and attached at a second end to the second polymer chain, the weak crosslinking unit comprising a weak crosslinking bond positioned between the first end and the second end. In some embodiments, the weak crosslinking bond has a bond dissociation energy from 50 kJ/mol to 325 kJ/mol. In certain embodiments, the weak crosslinking unit is the weak crosslinking bond.

In some embodiments, a catalyst acts upon the polymeric material to create weak covalent crosslinking bonds and/or weak crosslinking units comprising weak covalent bonds. As a non-limiting example, a polymeric material can be made consisting of relatively strong bonds (i.e., absent weak covalent bonds), but following the addition of a catalyst, weak covalent bonds are present. As a non-limiting example, a polymeric material can comprise crosslinking units/bonds comprising an ester, which is an extremely stable bond; following addition of water and a mild acid (i.e., in this case, the water is a reagent and the acid is a catalyst) the ester is cleaved more efficiently when placed under stress (i.e., hydrolyzed); thus the ester becomes a weak link in the presence of water and acid. Disulfide bonds and esters have a bond strength that can be lowered in the presence of metal ions and/or Lewis acids and/or by changes in pH. In some embodiments, the weak covalent crosslinking bond comprises a disulfide or ester and the catalyst comprises a metal ion, a Lewis acid, a change in pH, or any combination thereof. In this manner, polymeric materials can be formed absent weak covalent bonds, but following addition of a catalyst said polymeric materials comprise a weak covalent bond. In some embodiments, the catalyst selectively lowers the bond dissociation energy of crosslinking bonds and/or weak crosslinking units, thereby forming weak crosslinking bonds and/or weak crosslinking units comprising weak crosslinking bonds, respectively, in the presence of said catalyst.

In some embodiments, the catalyst selectively reorganizes bonds. As a non-limiting example, a polymeric material comprising disulfide crosslinking bonds (i.e., dynamic covalent bonds) can be activated upon by a photoinitiator (i.e., the catalyst) while under stress. The radicals from the photoinitiator can break disulfide bonds, which then reorganize and reform new disulfide bonds. In this manner, stress is released from the system by releasing stress from the disulfide bonds only. This allows for selective bond breaking, retaining strength in the polymeric material by preventing bond breakage to the polymer backbones. In some embodiments, the catalyst disclosed herein rearranges weak crosslinking covalent bonds. An additional non-limiting example is the addition of in-chain peroxides in combination with aromatic disulfides, which creates a fast reorganization of a crosslinked network. In this non-limiting example, when the in-chain peroxide bond cleaves (the concentration of the peroxide being relatively low relative to the disulfide bond concentration), the peroxyl free radical catalyzes disulfide cleavage reactions. Thus, in this non-limiting example, the breaking of one weak covalent bond (peroxide bond) causes the breaking of multiple bonds (e.g., disulfide bonds). In this non-limiting example, the cleaved disulfide bonds can reform stable covalent bonds when stress is removed or when all free radicals are removed, reacted, or trapped.

In some embodiments, the catalyst selectively lowers the bond dissociation energy of crosslinking bonds and/or weak crosslinking units, thereby forming weak crosslinking bonds and/or weak crosslinking units comprising weak crosslinking bonds, respectively, in the presence of said catalyst.

In some embodiments, the polymeric material further comprises the catalyst. In some embodiments, the polymeric material is formed from a resin comprising the catalyst. In some embodiments, the resin comprising the catalyst comprises an in-chain catalyst. A non-limiting example of an in-chain catalyst is an in-chain peroxide, as described above. The in-chain peroxide can, for example, cleave in the presence of disulfide bonds, catalyzing disulfide cleavage reactions which can reform stable covalent bonds when stress is removed or when all free radicals are removed, reacted, or trapped.

In some embodiments, the first polymer chain, the second polymer chain, or each of the first polymer chain and the second polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some embodiments, the first polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some embodiments, the second polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond.

In some embodiments, the first polymer chain, the second polymer chain, or each of the first polymer chain and the second polymer chain comprises a backbone wherein all covalent bonds in the backbone have a bond dissociation energy greater than 280 kJ/mol or a bond dissociation energy greater than 300 kJ/mol.

In some embodiments, the polymeric material comprises a ratio of the longest length of the weak crosslinking unit to the longest length of the first polymer chain, wherein the ratio is less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some embodiments, the polymeric material comprises a ratio of the longest length of the weak crosslinking unit to the longest length of the first polymer chain, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500.

In certain embodiments, the polymeric material comprises a ratio of the longest length of the weak crosslinking unit to the longest length of the second polymer chain, wherein the ratio is less than or equal to 1:10, less than or equal to 1:20, less than or equal to 1:30, less than or equal to 1:40, less than or equal to 1:50, less than or equal to 1:75, less than or equal to 1:100, or less than or equal to 1:200, less than or equal to 1:300, less than or equal to 1:400, or less than or equal to 1:500. In certain embodiments, the polymeric material comprises a ratio of the longest length of the weak crosslinking unit to the longest length of the second polymer chain, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500.

In some embodiments, the polymeric material further comprises a strong crosslinking unit. Polymeric materials comprising both strong and weak crosslinking units can have advantageous properties of increased strength while retaining weak covalent bonds that can selectively break upon application of stress. In some embodiments, the strong crosslinking unit is attached at a first end to the first polymer chain, the strong crosslinking unit is attached at a second end to the second polymer chain, and the strong crosslinking unit comprises one or more bonds forming a chain connecting to the first end and the second end. In certain embodiments, each of the one or more bonds have a bond dissociation energy greater than or equal to 275 kJ/mol. In some embodiments, each of the one or more bonds have a bond dissociation energy greater than or equal to 300 kJ/mol.

In certain embodiments, the polymeric material comprises a ratio of the number of strong crosslinking units to the number of weak crosslinking units, wherein the ratio is from 1:50 to 5:1, from 1:40 to 2:1, from 1:30 to 1:1, from 1:25 to 1:1, from 1:20 to 1:1, from 1:15 to 1:1, from 1:10 to 1:1, from 1:5 to 1:1, from 1:30 to 1:5, from 1:25 to 1:5, from 1:20 to 1:5, from 1:20 to 1:10, or from 1:10 to 1:5. In some embodiments, the ratio is from 1:20 to 1:5. In some preferred embodiments, the ratio is from 1:20 to 1:10. In some preferred embodiments, the ratio is about 1:10. In some embodiments, the ratio is less than 1:50. In some embodiments, the ratio is greater than 1:1, greater than 2:1, greater than 3:1, greater than 4:1, or greater than 5:1. In certain aspects, additional ratios of the number of strong crosslinking units to the number of weak crosslinking units can be envisioned. In general, the ratio of the number of strong crosslinking units to the number of weak crosslinking units will depend on the particular formulation and the particular properties desired and can be selected by one of ordinary skill in the art to fit a particular use.

In some embodiments, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the weak crosslinking unit. In some embodiments, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the weak crosslinking bond. In some preferred embodiments, the polymeric material comprises greater than 0.1 wt % of the weak crosslinking bond. In some preferred embodiments, the polymeric material comprises greater than 50 wt % of the weak crosslinking bond. The weight percentage of weak crosslinking units and/or weak crosslinking bonds can preferably be calculated or measured by weight percentage of weak crosslinking groups. As a non-limiting example, the S—S of a disulfide bond acts as a weak crosslinking unit; accordingly, a polymeric material having less than 1 wt % of the crosslinking S—S units has less than 1 wt % weak crosslinking units.

In some embodiments, the polymeric material comprises a ratio of a total number of bonds of the weak crosslinking unit to a total number of bonds of the first polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10. In some embodiments, the ratio of the total number of bonds of the weak crosslinking unit to the total number of bonds of the first polymer chain is from 1:1000 to 1:100, from 1:900 to 1:150, from 1:800 to 1:200, or from 1:750 to 1:250.

In some embodiments, the polymeric material comprises a ratio of a total number of bonds of the weak crosslinking unit to a total number of bonds of the second polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10. In certain embodiments, the ratio of the total number of bonds of the weak crosslinking unit to the total number of bonds of the first polymer chain is from 1:1000 to 1:100, from 1:900 to 1:150, from 1:800 to 1:200, or from 1:750 to 1:250.

Some polymeric materials traditionally used to make appliances (e.g., orthodontic appliances) comprise high levels of hydrogen bonding units (e.g., urethanes, ureas, amides, hydroxyls, amines, carbonyl-based acids, phosphorus-based acids, sulfur-based acids, poly(ethylene glycol) ethers, or derivatives thereof). In some embodiments, the polymeric materials disclosed herein comprise less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units. The percentage of hydrogen bonding units can preferably be calculated or measured by weight percentage of hydrogen bonding groups. As a non-limiting example, the NHCO of an amide bond acts as both hydrogen donor and hydrogen acceptor; accordingly, a polymeric material having less than 10 wt % of the NHCO unit (and no other type of hydrogen bonding units) has less than 10 wt % hydrogen bonding units. Alternatively, the value of wt % hydrogen bonding units can be determined by performing titration to obtain the number of hydrogen bonding groups. In preferred embodiments, the polymeric material comprises less than 5 wt % hydrogen bonding units. In more preferred embodiments, the polymeric material comprises less than 2 wt % hydrogen bonding units. In some more preferred embodiments, the polymeric material comprises essentially no hydrogen bonding units. Low amounts of hydrogen bonding units in a polymeric material can result in said polymeric material having relatively low levels of water absorption, because such absorption is facilitated by the presence of hydrogen bonding units. Advantageously, resins having reduced hydrogen bonding groups tend to have lower viscosity than the same basic polymer having hydrogen bonding groups, which can improve utility with, as a non-limiting example, stereolithographic 3D printers.

Polymeric materials described herein have low levels of water absorption. Such low levels of water absorption is favorable for polymeric materials described herein. Water absorption can occur when a polymeric material is exposed to a wet environment (e.g., a patient's mouth using an orthodontic appliance formed from a polymeric material). Traditional polymeric materials having high levels of hydrogen bonds facilitate water uptake due to the attraction of water to hydrogen bonding groups; water molecules are also attracted to polar atoms. In some embodiments, polymeric materials disclosed herein have weak covalent bonds that have low or no polar atoms, minimizing water uptake. In certain embodiments, the polymeric materials comprise polar atoms in the weak covalent bonds, but said bonds have minimal to no disruption by water, maintaining the integrity of the polymeric material. Properties of the polymeric material can degrade when water absorption reaches a threshold value, typically greater than 22 wt %. It is preferred herein that the polymeric materials have low levels of water uptake. In some embodiments, the polymeric material comprises a water uptake of less than 25 wt %, less than 20 wt %, less than 15 wt %, less than 10 wt %, less than 5 wt %, less than 4 wt %, less than 3 wt %, less than 2 wt %, less than 1 wt %, less than 0.5 wt %, less than 0.25 wt %, or less than 0.1 wt %. In preferred embodiments, the water uptake is measured after 24 hours in a wet environment at 37° C. In some embodiments, the water uptake is measured using a sample no greater than 1 mm thick. In certain embodiments, the water uptake is measured using a sample that is 1 mm thick. In some embodiments, a polymeric material is hydrophobic.

In some embodiments, the polymeric material comprises a plurality of first polymer chains having a first polymer chain average chain length and a plurality of weak crosslinking units having a weak crosslinking unit average chain length, wherein the weak crosslinking unit average chain length is less than the first polymer chain average chain length. In certain embodiments, the polymeric material has a ratio of the weak crosslinking unit average chain length to the first polymer chain average chain length, and wherein the ratio is from 1:1.1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:1.1, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500.

In some embodiments, the polymeric material comprises a plurality of second polymer chains having a second polymer chain average chain length and a plurality of weak crosslinking units having a weak crosslinking unit average chain length, wherein the weak crosslinking unit average chain length is less than the second polymer chain average chain length.

In certain embodiments, the first polymer chain, the second polymer chain, or each of the first polymer chain and the second polymer chain comprises a plurality of monomers, each joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond.

In some embodiments, the first polymer chain comprises a plurality of monomers, each joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some embodiments, the first polymer chain essentially consists of a plurality of monomers joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond.

In some embodiments, the second polymer chain comprises a plurality of monomers, each joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond. In some embodiments, the second polymer chain essentially consists of a plurality of monomers joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond.

In some embodiments, the first polymer chain is attached to the weak crosslinking unit with a covalent bond. In some embodiments, the second polymer chain is attached to the weak crosslinking unit with a covalent bond. In some embodiments, each of the first polymer chain and the second polymer chain is attached to the weak crosslinking unit with a covalent bond.

In some embodiments, the weak crosslinking bond is a dynamic covalent bond. In certain embodiments of the polymeric material, at least 1%, at least 2%, at least 3%, at least 4%, at least 5%, at least 10%, at least 20%, at least 30%, at least 40%, or at least 50% of the weak crosslinking bonds are dynamic covalent bonds. In some embodiments, the dynamic covalent bond is a radical dynamic covalent bond (i.e., a weak covalent bond that breaks to form radicals that can combine with other radicals to reform or form a new bond).

In certain embodiments, the polymeric material comprises a number ratio of a number of strong crosslinking units to a number of weak crosslinking units, wherein the number ratio is greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, or greater than or equal to 50:1. In some embodiments, the polymeric material comprises a number the strong crosslinking units to a number of weak crosslinking bonds, wherein the number ratio is greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, or greater than or equal to 50:1

In some embodiments, the polymeric material comprises a number ratio of strong crosslinking units to weak crosslinking units, wherein the number ratio is from 1:100 to 1:1, from 1:50 to 1:1, from 1:20 to 1:1, from 1:10 to 1:1, from 1:50 to 50:1, from 1:40 to 40:1, from 1:30 to 30:1, from 1:20 to 20:1, from 1:10 to 10:1, from 1:1 to 1:100, from 1:5 to 1:100, from 1:10 to 1:100, from 1:20 to 1:100, from 1:50 to 1:100, greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, greater than or equal to 50:1, or greater than or equal to 1:100. In some embodiments, the polymeric material comprises a number ratio of strong crosslinking units to weak crosslinking bonds, wherein the number ratio is from 1:100 to 1:1, from 1:50 to 1:1, from 1:20 to 1:1, from 1:10 to 1:1, from 1:50 to 50:1, from 1:40 to 40:1, from 1:30 to 30:1, from 1:20 to 20:1, from 1:10 to 10:1, from 1:1 to 1:100, from 1:5 to 1:100, from 1:10 to 1:100, from 1:20 to 1:100, from 1:50 to 1:100, greater than or equal to 1:100, greater than or equal to 1:50, greater than or equal to 1:20, greater than or equal to 1:10, greater than or equal to 1:5, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 20:1, greater than or equal to 50:1, or greater than or equal to 1:100.

In certain embodiments, the polymeric material has a ratio of the weak crosslinking unit average chain length to the second polymer chain average chain length, and wherein the ratio is from 1:1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In certain embodiments, the second polymer chain average chain length is greater than the weak crosslinking unit average chain length.

Polymeric materials having weak crosslinking units and/or weak crosslinking covalent bonds have bonds in said polymeric materials that are weaker than the backbone of the polymeric material, so when the material is manipulated (e.g., pulled), the weak crosslinking unit cleaves prior to cleavage of the polymer backbone, thus relieving stress and preserving strength of the polymer backbone. Main chain breakage in polymeric materials leads to rapid fracture, so incorporation of weak covalent bonds and/or weak covalent crosslinking units comprising weak covalent bonds prevent breaks. In some embodiments, a stress applied to the polymeric material breaks the weak crosslinking bond prior to breaking a covalent bond of the first polymer chain or the second polymer chain. Another non-limiting example of an advantage of the weak covalent crosslink is how it affects the property of elongation to break. For instance, if a polymer with an average chain length of 15,000 is stressed (e.g., pulled in tension) and does not have crosslinks, it can have a high elongation to break, assuming the chains can reorganize during the strain. In contrast, the same polymer having crosslinks that are the same or close to the same strength as the polymer backbone will have a lower elongation to break (depending on the amount of crosslinking—i.e., more crosslinking leads to lower elongation to break). The materials described herein tend to have elongations to break that are between the no crosslinked example and the strongly crosslinked example. In certain embodiments, the weak covalent crosslinked material has a higher elongation to break than the sample with no crosslinks. An additional property that is influenced by the presence of weak crosslinks includes strength at yield (i.e., the addition of weak covalent crosslinks will decrease strength at yield compared to strongly crosslinked materials when both are in the same molar amount). In some embodiments, increasing the concentration of the weak covalent crosslinks increases the strength at yield, but potentially retains elongation at break values.

In some embodiments, the weak covalent crosslinks can be used in organic, inorganic, or hybrid systems. In certain embodiments, the polymers comprise an organic polymer, an inorganic polymer, or a hybrid polymer. In some preferred embodiments, the organic polymer is selected from the group consisting of polyethylenes, polypropylenes, polybutylenes, polyisoprenes, polyacrylates, polymethacrylates, thioether-containing polymers, polyethers, polyesters, copolymers thereof, mixtures thereof, a combination thereof, and a derivative thereof. In some embodiments, the organic polymer comprises a hydrogen-bonded system (for example, a urethane and polyamide), as well as a mixture or copolymer with the organic polymers described herein. In some preferred embodiments, the inorganic polymer is selected from the group consisting of polysilanes, polysiloxanes, polyphosphazenes, copolymers thereof, mixtures thereof, a combination thereof, and a derivative thereof. Hybrid polymers (e.g., organic-inorganic polymers) can comprise any of the organic polymers and any of the inorganic polymers, copolymers thereof, mixtures thereof, and derivatives thereof.

B. Inchain Looped Polymers

This disclosure provides polymer chains and polymeric materials comprising inchain loops (also referred to herein as rings), the inchain loops comprising weak bonds and/or weak bridges comprising at least one weak bond. In some embodiments, this disclosure provides a composition comprising a polymer chain, the polymer chain comprising a ring comprising three or more ring members; a first bond between a first set of two ring members and having a bond dissociation energy less than 325 kJ/mol (i.e., a weak bond); and a second bond positioned between a second set of two ring members having a bond dissociation energy greater than 325 kJ/mol. The rings comprise three or more atoms connected in series and the weak bond positioned between two atoms of the three or more atoms. In some embodiments, the weak bond (i.e., the first bond) comprises a weak covalent bond. The weak bonds are also referred to herein as first bonds. Weak covalent bonds are used in place of hydrogen bonds present in traditional polymeric materials (e.g., polyurethanes). Advantageously, elongation to tensile strain and/or elongation to tensile break can be controlled by varying the ring size of the ring (i.e., the number of atoms connected in series in the cyclic structure of the loop). The toughness of the material can be controlled by varying the strength of weak bonds and/or by varying the number of monomers comprising the rings described herein. In some embodiments, the polymer chain is a crosslinking unit disposed between additional polymer chain(s). In certain embodiments, the ring monomer is a crosslinking unit disposed between two polymer chains. Crosslinked materials applying the rings comprising weak bonds can be used to create tough materials able to elongate with less susceptibility of polymer chain breakage. The ring can be flexible or stiff. Typically, the longer the ring, the more elongation is programmed into the material. It has been found that polymeric materials formed from polymers with high levels of hydrogen bonding (e.g., polyurethanes) can suffer from exposure to an aqueous environment. The hydrogen bonding units tend to absorb water, acting as a plasticizer and decreasing the polymer's ability to resist creep or stress. The hydrogen bonds are dynamic bonds, and in the presence of water they are made more dynamic and weaker, thus decreasing the toughness of material in the presence of water. Materials that use hydrogen bonding made for use in wet environments (e.g., orthodontic appliances such as aligners, which are placed in a mouth) therefore suffer from exposure to an aqueous environment. By applying weak bonds (e.g., weak covalent bonds) for use in forming the polymeric materials disclosed herein, products can be created for use in wet or aqueous environments that have increased durability, elasticity, and/or have improved functionality in comparison to standard polyurethanes having high levels of hydrogen bonding. As such, the materials disclosed herein are tough, are less susceptible to decreased toughness in the presence of water, and have improved elongation characteristics without breaking polymer backbones.

I. Polymer Chains

Figure 11:
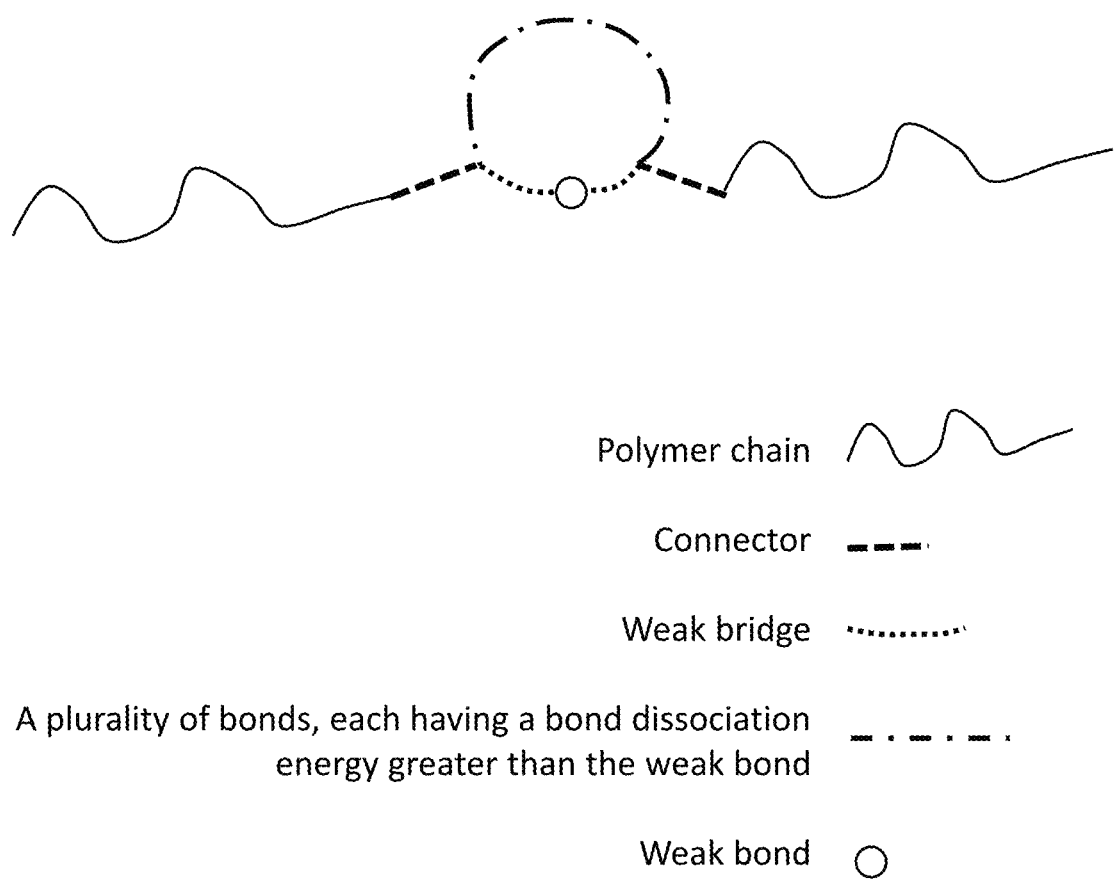
FIG. 11 illustrates a 2-dimensional representation of a polymer comprising a ring, the ring comprising a weak bridge comprising a weak bond.

This disclosure provides polymer chains comprising rings (also referred to herein as ring monomers, loop units, loop monomers, and loops). In some embodiments, the ring is positioned in the polymer chain (i.e., is an inchain loop). FIG. 11 shows an example polymer chain comprising a ring disclosed herein. The ring comprises at least three ring members (i.e., having a ring size of 3 or more atoms). The ring is connected to the polymeric chain by a first connector and a second connector. The ring comprises a weak bond and/or a weak bridge comprising the weak bond, wherein the weak bond and/or the weak bridge is positioned in the ring between two atoms of the three or more atoms (i.e., the weak bond is positioned between a set of two ring members). In some embodiments, the weak bridge is positioned between the first connector and the second connector. In some embodiments the weak bond is a weak covalent bond. The ring also comprises at least one bond (i.e., a second bond) positioned between sets of two ring members, the at least one bond having a bond dissociation energy greater than 325 kJ/mol. In some embodiments, the ring comprises a plurality of bonds between sets of two ring members, each having a bond dissociation energy greater than the bond dissociation energy of the weak bond. In some embodiments, the plurality of bonds each has a bond dissociation energy greater than 325 kJ/mol. In certain embodiments, the plurality of bonds are positioned between the first connector and the second connector. In some embodiments, a series of the plurality of bonds are positioned between the first connector and the second connector, such that the series of bonds do not comprise the weak bond. The connector (also referred to herein as an inchain connector) connects the polymer to the second bond and/or the plurality of bonds and/or the bridge and/or the weak bond. In some embodiments, the connector is flexible. In some embodiments, the connector is stiff. In some embodiments, the first bond (i.e., the weak bond) has a bond dissociation energy less than 325 kJ/mol. In some embodiments, the ring is positioned between two polymer chains as a crosslinking unit.

Figure 12:
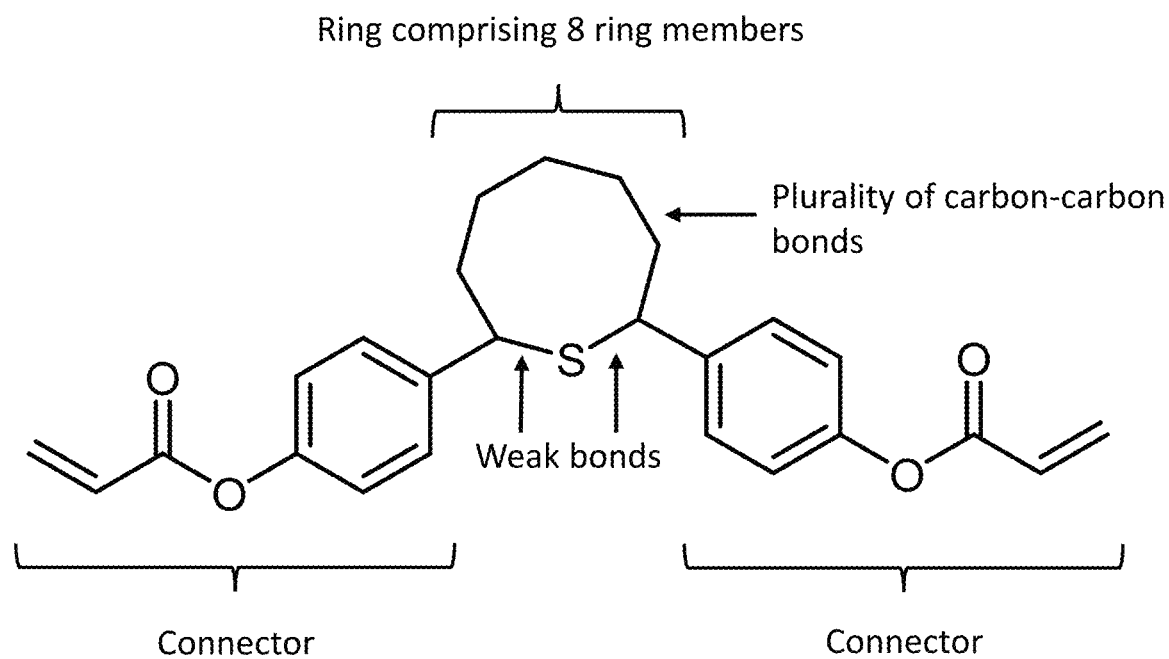
FIG. 12 illustrates an example ring monomer comprising a weak bond.
Figure 13A:
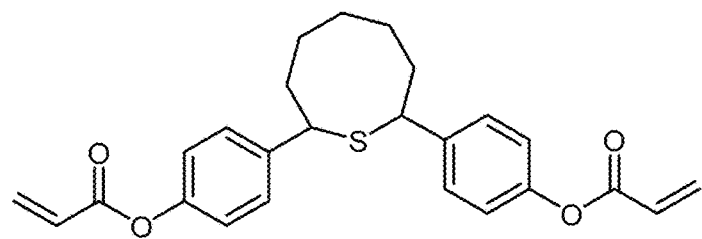
FIG. 13A illustrates an example ring monomer comprising a weak bond.
Figure 13B:
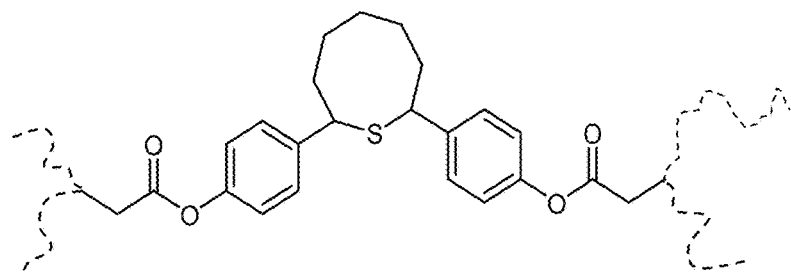
FIG. 13B illustrates the exemplary ring monomer incorporated into a polymer chain.
Figure 13C:
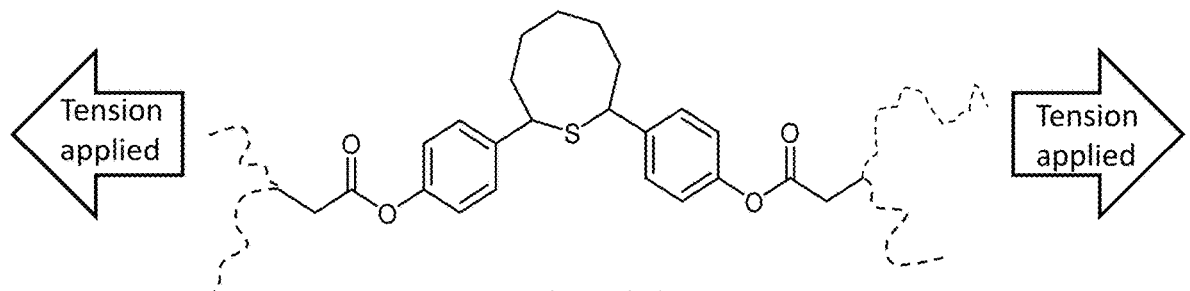
FIG. 13C illustrates tension applied to the polymer chain comprising the ring monomer.
Figure 13D:
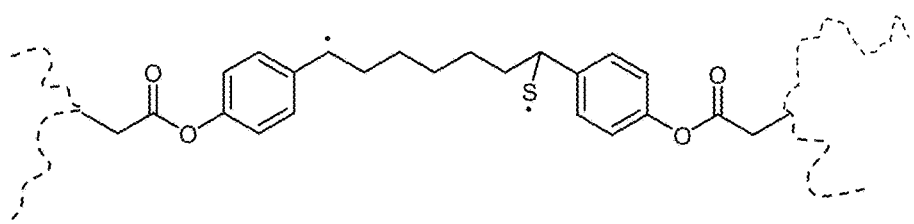
FIG. 13D illustrates the dissociation of the weak bond following application of tension.

With respect to FIG. 12 another non-limiting example of a ring monomer is provided. In the embodiment of FIG. 12, the ring is a thiocane ring having 8 ring members (i.e., a ring size of 8 atoms). The ring comprises 7 carbon atoms in series between the first connector and the second connector (i.e., a plurality of bonds between sets of two ring members, each having a bond dissociation energy greater than the bond dissociation energy of the weak bond(s)). The ring further comprises a weak bridge comprising two weak carbon-sulfur bonds. The connectors comprise acrylate functional groups.

With respect to FIG. 13, the non-limiting example of the ring monomer of FIG. 12 is shown for incorporation and use in a polymer chain. FIG. 13A shows the non-limiting example of the ring monomer from FIG. 12, which can be incorporated into a polymer chain as a crosslink (FIG. 13B). As shown in FIG. 13C, tension applied to the polymer chain can induce strain to the ring. As shown in FIG. 13D, the applied tension can selectively cleave a weak bond of the ring at the weak bridge while the plurality of carbon-carbon bonds of the ring and polymer chain remain intact, generating radicals at the respective carbon and sulfur, and thus providing improved elongation and stress relaxation characteristics while maintaining the integrity of the polymeric material.

This disclosure provides compositions comprising a polymer chain, the polymer chain comprising a ring comprising three or more ring members, a first bond (i.e., a weak bond) positioned between a first set of two ring members and having a bond dissociation energy less than 325 kJ/mol, and a second bond positioned between a second set of two ring members having a bond dissociation energy greater than the bond dissociation energy of the first bond. In some embodiments, the second bond has a bond dissociation energy greater than 325 kJ/mol. In some embodiments, the ring comprises a weak bridge, the weak bridge comprising the first bond. In some embodiments, the ring comprises a substituted or unsubstituted cycloalkane, a substituted or unsubstituted heterocyclic ring, a substituted or unsubstituted inorganic ring, a derivative thereof, or a combination thereof. In some embodiments, the ring size of the ring is 3, 4, 5, 6, 7, 8, 9, 10, 11, 12, 13, 14, 15, 16, 17, 18, 19, 20, or greater than 20 atoms (i.e., ring members). In some embodiments, the ring size is greater than 10, greater than 15, greater than 20, greater than 25, greater than 30, greater than 35, greater than 40, greater than 45, or greater than 50 atoms. In some embodiments, the ring comprises 3, 4, 5, 6, 7, 8, 9, 10, 11, 12, 13, 14, 15, 16, 17, 18, 19, 20, or greater than 20 ring members connected in series. In some embodiments, the ring comprises greater than 10, greater than 15, greater than 20, greater than 25, greater than 30, greater than 35, greater than 40, greater than 45, or greater than 50 ring members connected in series. In some embodiments, the ring comprises greater than 6, greater than 7, greater than 8, greater than 9, or greater than 10 ring members. In some embodiments, the ring comprises from 10 to 20 ring members.

In some embodiments, the ring comprises a weak bridge (i.e., a series of bonds comprising the weak bond) and a strong bridge (i.e., a series of bonds absent the weak bridge), each of which is positioned between the first and the second connectors. As a non-limiting example, FIG. 12 shows a monomer comprising a weak bridge (the carbon-sulfur-carbon positioned between the first and second connectors) as well as a strong bridge (the 7 carbons connected in series positioned between the first and second connectors, and absent the weak bridge). In some embodiments, the weak bridge has the same number of atoms and/or the same number of bonds connected in series between the first and second connectors as the strong bridge. In some embodiments, the weak bridge has a smaller number of atoms and/or a smaller number of bonds connected in series between the first and second connectors than the strong bridge. In some embodiments, the weak bridge has 1, 2, 3, 4, 5, 6, 7, 8, 9, 10, 11, 12, 13, 14, 15, or more than 15, fewer bonds and/or atoms connected in series between the first and second connectors than the strong bridge. Turning as a non-limiting example to FIG. 12, the illustrated monomer has 2 bonds in the weak bridge connected in series between the first and second connector, the strong bridge has 6 bonds connected in series between the first and second connector, thus the weak bridge has 4 fewer bonds connected in series between the first and second connectors than the strong bridge. In some embodiments, each of the atoms are all approximately similar size and/or each of the bonds are all approximately similar in size. In some embodiments, the strong bridge comprises greater than 4 bonds and/or atoms connected in series between the first connector and the second connector than the weak bridge. In some embodiments, the strong bridge comprises greater than 5, greater than 6, greater than 7, greater than 8, greater than 9, or greater than 10 bonds and/or atoms connected in series between the first connector and the second connector than the weak bridge. In some embodiments, the expected or calculated linear length of the strong bridge is equal to the respective expected or calculated linear length of the weak bridge. In some embodiments, the expected or calculated linear length of the strong bridge is greater than the respective expected or calculated linear length of the weak bridge. In some embodiments, there is a ratio of the expected or calculated linear length of the weak bridge to the respective expected or calculated linear length of the strong bridge, wherein the ratio is less than or equal to 1:1, less than or equal to 1:2, less than or equal to 1:3, less than or equal to 1:4, less than or equal to 1:5, less than or equal to 1:6, less than or equal to 1:7, less than or equal to 1:8, less than or equal to 1:9, or less than or equal to 1:10.

In some embodiments, the polymer chain comprises a plurality of the rings disclosed herein. In certain embodiments, the polymer chain comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the ring(s) and/or ring monomer(s). In some embodiments, the polymer chain comprises greater than 10 wt %, greater than 20 wt %, greater than 30 wt %, greater than 40 wt %, greater than 50 wt %, greater than 60 wt %, greater than 70 wt % of the ring(s) and/or ring monomer(s). In some embodiments, the polymer chain comprises a ratio of a total number of bonds of ring(s) to a total number of bonds of the polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10.

In some embodiments, the polymer chain comprises a first portion and a second portion, the first portion of the polymer chain is attached to the ring at a first connector, and the second portion of the polymer chain is attached to the ring at a second connector. In certain embodiments, the weak bond is positioned between the first connector and the second connector, and the ring comprises a plurality of bonds between sets of two ring members, each having a bond dissociation energy greater than the weak bond. In certain embodiments, the plurality of bonds are connected in series and are disposed between the first connector and the second connector, and the weak bond is not within the series of the plurality of bonds (i.e., a strong bridge). In some embodiments, the ring monomer is attached to a terminal end of the first portion of the polymer chain and/or the ring monomer is attached to a terminal end of the second portion of the polymer chain. In some embodiments, the ring monomer is attached to the backbone of the first portion of the polymer chain and/or the ring monomer is attached to the backbone of the second portion of the polymer chain.

In some embodiments, the bond dissociation energy of the weak bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, or less than or equal to 150 kJ/mol. In some embodiments, the bond dissociation energy of the weak bond is from 50 kJ/mol to 325 kJ/mol, from 50 kJ/mol to 300 kJ/mol, from 55 kJ/mol to 250 kJ/mol, or from 60 kJ/mol to 200 kJ/mol. In some embodiments, the weak bond has a bond dissociation energy from 50 kJ/mol to 325 kJ/mol. In certain embodiments, the weak bond has a thermal decomposition temperature less than 350° C. In some embodiments, the weak bond has a thermal decomposition temperature lower than a thermal decomposition of the polymer chain. In some embodiments, the weak bond has a thermal decomposition temperature lower than a thermal decomposition of the plurality of bonds of the ring absent the weak bond.

In some embodiments, the weak bond is a dynamic covalent bond. In some embodiments, the weak bridge comprises a dynamic covalent bond.

In some embodiments, the weak bond is selected from the group consisting of a sulfur-sulfur bond, an oxygen-oxygen bond, a nitrogen-nitrogen bond, a silicone-sulfur bond, a silicone-silicone bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, and a combination thereof.

In some embodiments, the ring comprises a plurality of bonds (e.g., covalent bonds) between sets of two ring members, each having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond. As a non-limiting example, FIG. 12 shows a ring comprising 6 carbon-carbon bonds (i.e., the plurality of bonds between sets of two ring members) having a relatively high dissociation energy compared to the two weak carbon-sulfur bonds.

Figure 14A:
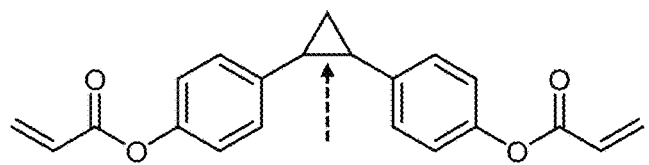
FIGS. 14A-14F show exemplary ring monomers comprising weak bonds, the weak bonds indicated by dashed arrows.
Figure 14B:
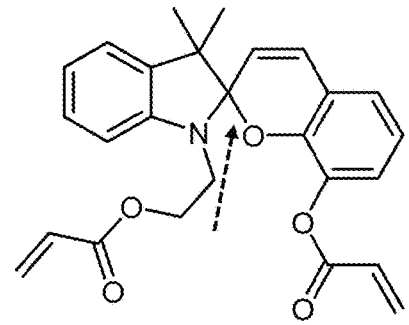
Figure 14C:
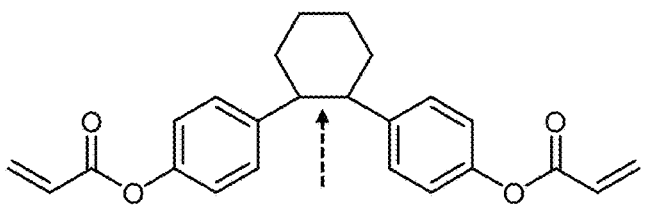

In some embodiments, the weak bond is attached to one or more stabilizing molecular structures. In certain embodiments, the stabilizing molecular structure is positioned at a connector. In some embodiments, the weak bond is attached to 1, 2, 3, or more stabilizing molecular structures. In certain embodiments, each side of the weak bond is attached to at least one stabilizing molecular structure. Stabilizing molecular structures stabilize a radical or ion formed after a bond breaks. See: McMillen et al., Hydrocarbon Bond Dissociation Energies, Ann. Rev. Phys. Chem., 1982, 33:493-532, incorporated herein by reference. A weak bond can be, for example, a carbon-carbon bond positioned between two stabilizing molecular structures. As a non-limiting example, the carbon-carbon bond of 1,1,2,2-tetraphenyl ethane has a bond dissociation energy of 247.3±8.4 kJ/mol while the carbon-carbon bond of ethane has a bond dissociation energy of 377.4±0.8 kJ/mol. See: Luo, Yu-Ran "Handbook of Bond Dissociation Energies in Organic Compounds" CRC Press, 2002, incorporated herein by reference. In some embodiments, the weak bond is a carbon-carbon bond. As non-limiting examples, each of FIG. 14A and FIG. 14C depict a carbon-carbon bond as a weak bond positioned between stabilizing benzyl rings. In certain embodiments, the weak bond is a carbon-carbon bond wherein one or both carbon atoms are attached to one, two, or more stabilizing molecular structures. In some embodiments, the weak bond is a carbon-carbon bond wherein both carbon atoms each are attached to at least one stabilizing molecular structure. In some embodiments, the stabilizing structure is an aromatic ring. In certain embodiments, the stabilizing structure comprises a benzene, a naphthalene, an anthracene, a pyridine, a quinoline, an isoquinoline, a pyrazine, a quinoxaline, an acridine, a pyrimidine, a quinazoline, a pyridazine, a cinnoline, a phthalazine, a 1,2,3-triazine, a 1,2,4-triazine, a s-triazine, furan, a pyrrole, a thiophene, an imidazole, a pyrazole, an oxazole, an isoxazole, or a thiazole.

Figure 14D:
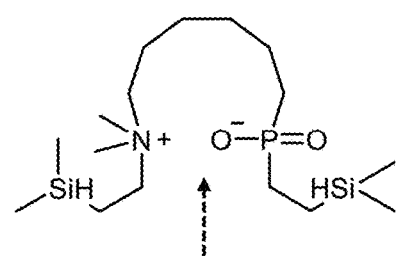
Figure 14E:
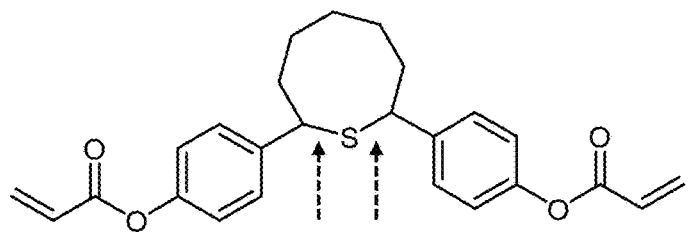
Figure 14F:
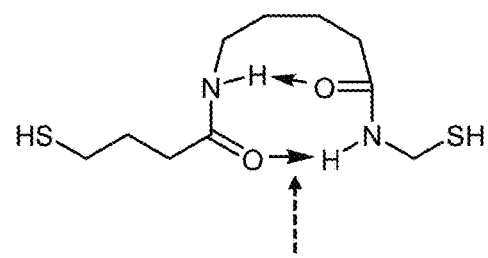

In some embodiments, the weak bond is a nonpolar covalent bond or a polar covalent bond. In some embodiments, the weak bond is a plurality of hydrogen bonds (as shown in, e.g., FIG. 14F). In certain embodiments, the weak bond is an ionic bond (as shown in, e.g., FIG. 14D). In some embodiments, the weak bond is an organometallic bond. Example organometallic bonds have bond dissociation energies as described by Basch "Bond dissociation energies in organometallic compounds" *Inorganica Chima Acta* 252 (1996) 265-279, incorporated herein by reference. In some embodiments, the weak bond is a heterolytic bond (as shown in, e.g., FIG. 14B and FIG. 14E). Example heterolytic bonds have bond dissociation energies as described by Kitagawa et al., "Structural dependence of heterolytic bond dissociation energy of G carbon-carbon bonds in hydrocarbons" *Journal of Physical Organic Chemistry*, 11 (1998), 157-170, incorporated herein by reference.

In some embodiments, the weak bond (i.e., the first bond) has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene.

In some embodiments, the polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond.

In certain embodiments, the bond dissociation energy of the weak bond is measured as a bond dissociation energy or a bond breaking energy.

In some embodiments, the ring comprises a first connector, a second connector, and a weak bond positioned between the first connector and the second connector (as shown in, e.g., FIG. 11 and FIG. 12). In some embodiments, the weak bond is a weak covalent bond. Weak covalent bonds are weaker than covalent bonds of the polymer backbone. A non-limiting example of a polymer backbone is polyacrylate, the carbon-carbon bonds of which tend to have bond dissociation energy from 340 kJ/mol to 360 kJ/mol. In some embodiments, the weak bonds are thermally stable at room temperature and/or at human body temperatures (e.g., human mouth temperature). In some embodiments, rings comprising weak bonds or weak bridges comprising weak bonds described herein are positioned within a polymer chain (e.g., a polyacrylate chain).

In some embodiments, the polymer chain is hydrophobic.

In some embodiments, the polymer chain comprises a ring comprising 3 or more ring members and a first bond (i.e., an activatable unit) positioned between a first set of two ring members, wherein upon catalyst activation, the first bond is convertible to a weak bond disclosed herein. The resulting weak bond is positioned between two atoms of the three or more atoms of the ring. For example, the activatable unit can be a unit absent a weak bond, and following activation said unit comprises a weak bond. In some embodiments, the activatable unit converts to a weak bond (i.e., is activated) when activated by an activating agent (e.g., a catalyst), a reagent, and/or a reactant, thereby forming ring monomers comprising a weak bond disclosed herein. In some embodiments, the weak bond has a bond dissociation energy less than 325 kJ/mol. Some non-limiting examples of activating agents include light energy (e.g., as non-limiting examples, ultraviolet, 2-photon absorption, visible light, x-ray, infrared, and gamma rays), catalysts (e.g., as non-limiting examples, tin derivatives, bismuth derivatives, zinc derivatives, titanium derivatives, palladium, platinum, amines, Brønsted-Lowry bases, Lewis bases, metal halide salts, organic salts, Lewis acids, protic acids, and iodonium salts), additional energy sources (e.g., as non-limiting examples, heat, sounds (i.e., sonic energy), and electric), and reagents that react with the bond (e.g., as non-limiting examples, radicals, ions, water, alcohols, amines, nucleophiles, electrophiles, oxidants, reductants, hydrogentating agents, acylating agents, chelating agents, electron donors, and electron acceptors), or combinations thereof. In some embodiments, two or more activating agents are used.

In certain embodiments, the polymer chain comprises an organic polymer, an inorganic polymer, or a hybrid polymer. In some embodiments, the organic polymer is selected from the group consisting of polyethylenes, polypropylenes, polybutylenes, polyisoprenes, polyacrylates, polymethacrylates, thioether-containing polymers, polyethers, polyesters, polyurethanes, polyamides, polyepoxides, copolymers thereof, mixtures thereof, a combination thereof, and a derivative thereof. In some embodiments, the organic polymer comprises a hydrogen-bonded system (for example, a urethane and polyamide), as well as a mixture or copolymer with the organic polymers described herein. In some embodiments, the inorganic polymer is selected from the group consisting of polysilanes, polysiloxanes, polyphosphazenes, copolymers thereof, mixtures thereof, a combination thereof, and a derivative thereof. Hybrid polymers (e.g., organic-inorganic polymers) can comprise any of the organic polymers and any of the inorganic polymers, copolymers thereof, mixtures thereof, and derivatives thereof. In some embodiments, the polymer chain consists essentially of the ring monomer and the organic polymer, the inorganic polymer, the hybrid polymer, or any combination thereof.

II. Polymeric Materials i. Ring Monomers

This disclosure provides polymeric materials comprising the polymer chains disclosed herein. This disclosure provides polymeric materials comprising: a ring comprising three or more ring members; a first bond positioned between a first set of two ring members and having a bond dissociation energy less than 325 kJ/mol (i.e., a weak bond); and a second bond positioned between a second set of two ring members having a bond dissociation energy greater than the weak bond. In some embodiments, the second bond has a bond dissociation energy greater than 325 kJ/mol.

In some embodiments, the polymeric material comprises: a ring comprising three or more ring members; a first bond positioned between a first set of two ring members, wherein upon catalyst activation, the first bond is convertible to a bond having a bond dissociation energy less than 325 kJ/mol (also referred to herein as an activatable unit); and a second bond positioned between a second set of two ring members and having a bond dissociation energy greater than the weak bond. In some embodiments, the second bond has a bond dissociation energy greater than 325 kJ/mol. The resulting weak bond is positioned between two members of the three or more members of the ring. In certain embodiments, the polymeric material further comprises the catalyst.

In some embodiments, the polymeric material comprises a plurality of rings disclosed herein. In certain embodiments, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the ring(s) and/or ring monomers disclosed herein. In some embodiments, the polymeric material comprises a ratio of a total number of bonds of rings to a total number of bonds of the polymer backbones of the polymeric material, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10.

In some embodiments, the polymeric material comprises greater than 0.1 wt %, greater than 0.5 wt %, greater than 1 wt %, greater than 2 wt %, greater than 3 wt %, greater than 4 wt %, greater than 5 wt %, greater than 6 wt %, greater than 7 wt %, greater than 8 wt %, greater than 9 wt %, greater than 10 wt %, greater than 15 wt %, greater than 20 wt %, greater than 25 wt %, greater than 30 wt %, greater than 35 wt %, greater than 40 wt %, greater than 45 wt %, greater than 50 wt %, greater than 60 wt %, or greater than 70 wt % of the ring or rings.

The hydrogen bonds of traditional polymeric materials (e.g., polyurethane) have a bond strength ("bond dissociation energy") typically in the range from 8 to 30 kJ/mol. Hydrogen bonds are dynamic (i.e., they can be broken and reformed) at room temperature. In some embodiments, the weak bonds described further herein have a bond dissociation energy from 10 to 340 kJ/mol. In some embodiments, the weak bonds described herein have a bond dissociation energy from 60 to 200 kJ/mol. In some embodiments, the weak bonds described further herein are dynamic bonds. As used herein, the terms "bond strength" and "bond dissociation energy" refer to bond dissociation energy. Other tools are available for measuring bond strength, including using heterolytic bond breaking energy or molecular modeling to estimate bond dissociation energies. Exemplary bond dissociation energies are shown in FIG. 5.

In some embodiments, the bond dissociation energy of the weak bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, or less than or equal to 150 kJ/mol. In some embodiments, the bond dissociation energy of the weak bond is from 50 kJ/mol to 325 kJ/mol, from 50 kJ/mol to 300 kJ/mol, from 55 kJ/mol to 250 kJ/mol, or from 60 kJ/mol to 200 kJ/mol. In certain embodiments, the weak bond has a thermal decomposition temperature less than 350° C. In some embodiments, the weak bond has a thermal decomposition temperature lower than a thermal decomposition of the polymer chain. In some embodiments, the weak bond has a thermal decomposition temperature lower than a thermal decomposition of the polymer backbone. In some embodiments, the weak bond has a thermal decomposition temperature lower than a thermal decomposition of a plurality of bonds between sets of two ring members, each having a bond dissociation energy of 325 kJ/mol or greater.

In some embodiments, the polymeric material comprises a plurality of rings, each of the rings comprising a weak bond as disclosed herein. In some embodiments, the polymeric material comprises a plurality of ring units (i.e., loops) disposed in a polymer chain so as to be inchain loops. In certain embodiments, the polymeric material comprises a plurality of ring units so disposed as to crosslink between a first polymer chain and a second polymer chain. In some embodiments, the plurality of ring units are dispersed throughout the polymeric material. In some embodiments, a plurality of rings are each attached at a first end to the first polymer chain (e.g., with a first connector) and are attached at a second end to the second polymer chain (e.g., with a second connector).

In some embodiments, a catalyst acts upon the polymeric material to create weak bonds and/or weak bridges comprising weak bonds, wherein the weak bridges and/or weak bonds are in a ring as described herein. As a non-limiting example, a polymeric material can be made consisting of relatively strong bonds (e.g., absent weak bonds, such as weak covalent bonds), but following the addition of a catalyst, weak bonds (e.g., weak covalent bonds) are present. As a non-limiting example, a polymeric material can comprise rings comprising an ester positioned between a first connector and a second connector, which is an extremely stable bond; following addition of water and a mild acid (i.e., in this case, the water is a reagent and the acid is a catalyst) the ester is cleaved more efficiently when placed under stress (i.e., hydrolyzed); thus the ester becomes a weak bond in the presence of water and acid, thus forming a ring comprising a weak bond between the first connector and the second connector. Disulfide bonds and esters have a bond strength that can be lowered in the presence of metal ions and/or Lewis acids and/or by changes in pH. In some embodiments, the weak bond comprises a disulfide or ester and the catalyst comprises a metal ion, a Lewis acid, a change in pH, or any combination thereof. In this manner, polymeric materials can be formed absent weak bonds, but following addition of a catalyst said polymeric materials comprise a weak bond (e.g., a weak covalent bond). In some embodiments, the catalyst selectively lowers the bond dissociation energy of activatable bonds and/or weak bridges, thereby forming weak bonds and/or weak bridges comprising weak bonds, respectively, in the presence of said catalyst.

In some embodiments, the catalyst selectively reorganizes bonds. As a non-limiting example, a polymeric material comprising a ring comprising disulfide bonds (i.e., dynamic covalent bonds) can be activated upon by a photoinitiator (i.e., the catalyst) while under stress. The radicals from the photoinitiator can break disulfide bonds, which then reorganize and reform new disulfide bonds. In this manner, stress is released from the system by releasing stress from the disulfide bonds only. This allows for selective bond breaking (e.g., during elongation during application of tension), retaining strength in the polymeric material by preventing bond breakage to the polymer backbones or the plurality of bonds between sets of ring members, each having a bond dissociation energy greater than the bond dissociation energy of the weak bond. In some embodiments, the catalyst disclosed herein rearranges weak covalent bonds in the ring(s). An additional non-limiting example is the addition of in-chain peroxides in combination with rings comprising disulfides, which creates a fast reorganization of a polymer chain network. In this non-limiting example, when the in-chain peroxide bond cleaves (the concentration of the peroxide being relatively low relative to the disulfide bond concentration), the peroxyl free radical catalyzes disulfide cleavage reactions. Thus, in this non-limiting example, the breaking of one weak bond (peroxide bond) causes the breaking of multiple bonds (e.g., disulfide bonds). In this non-limiting example, the cleaved disulfide bonds can reform stable covalent bonds when stress is removed or when all free radicals are removed, reacted, or trapped.

In some embodiments, the catalyst selectively lowers the bond dissociation energy of bonds of the activatable unit and/or weak bridges comprising the activatable unit, thereby forming weak bonds and/or weak bridges comprising weak bonds, respectively, in the presence of said catalyst.

In some embodiments, the polymeric material further comprises the catalyst (also referred to herein as the activating agent). In some embodiments, the polymeric material is formed from a resin comprising the catalyst. In some embodiments, the resin comprising the catalyst comprises an in-chain catalyst. A non-limiting example of an in-chain catalyst is an in-chain peroxide, as described above. The in-chain peroxide can, for example, cleave in the presence of disulfide bonds, catalyzing disulfide cleavage reactions which can reform stable covalent bonds when stress is removed or when all free radicals are removed, reacted, or trapped. Peroxides can also be activated, for example, by heat and light. In some embodiments, the catalyst (e.g., peroxide) is freely diffusing in the system. In some embodiments, the catalyst (e.g., peroxide) is added to the polymeric material after the polymeric material comprising the loop(s) has been formed.

In some embodiments, the polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond. In some embodiments, the polymer chain comprises a first polymer chain attached to the ring and a second polymer chain attached to the ring, wherein the first polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond. In some embodiments, the second polymer chain comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond.

In some embodiments, the first polymer chain, the second polymer chain, or each of the first polymer chain and the second polymer chain comprises a backbone wherein all covalent bonds in the backbone have a bond dissociation energy greater than 280 kJ/mol or a bond dissociation energy greater than 300 kJ/mol.

In some embodiments, the polymeric material further comprises a strong crosslinking unit. Polymeric materials comprising both strong crosslinking units and rings comprising weak bonds can have advantageous properties of increased strength while retaining weak bonds that can selectively break and/or elongate upon application of stress. In certain embodiments, each of the bonds of the strong crosslinking unit have a bond dissociation energy greater than or equal to 275 kJ/mol. In some embodiments, each of the bonds of the strong crosslinking unit have a bond dissociation energy greater than or equal to 300 kJ/mol.

In some embodiments, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the ring(s) and/or ring monomer(s). In some embodiments, the polymeric material comprises from 0.1 wt % to 50 wt %, from 1 wt % to 30 wt %, from 2 wt % to 10 wt %, from 0.1 wt % to 10 wt %, less than 10 wt %, less than 5 wt %, less than 4 wt %, less than 3 wt %, less than 2 wt %, less than 1 wt %, less than 0.5 wt %, less than 0.1 wt %, or less than 0.01 wt % of the weak bridge and/or weak bond. In some embodiments, the polymeric material comprises greater than 0.1 wt % of the weak bond. In some embodiments, the polymeric material comprises greater than 50 wt % of the weak bond. The weight percentage of weak bridge and/or weak bonds can be calculated or measured by weight percentage of weak bridges and/or weak bonds. As a non-limiting example, the S—S of a disulfide bond acts as a weak bond; accordingly, a polymeric material having less than 1 wt % of S—S units in rings comprising the weak bond thus has less than 1 wt % weak bonds.

In some embodiments, the polymeric material comprises a ratio of a total number of bonds of the weak bridge and/or weak bond to a total number of bonds of the polymer chain, and the ratio is from 1:2500 to 1:10, from 1:2000 to 1:10, from 1:1500 to 1:10, from 1:1000 to 1:10, from 1:750 to 1:1, from 1:500 to 1:10, from 1:400 to 1:10, from 1:300 to 1:10, from 1:250 to 1:10, from 1:200 to 1:10, from 1:100 to 1:10, from 1:50 to 1:10, from 1:40 to 1:10, from 1:30 to 1:10, or from 1:20 to 1:10. In some embodiments, the ratio of the total number of bonds of the weak bridge and/or weak bond to the total number of bonds of the polymer chain is from 1:1000 to 1:100, from 1:900 to 1:150, from 1:800 to 1:200, or from 1:750 to 1:250.

Some polymeric materials traditionally used to make appliances (e.g., orthodontic appliances) comprise high levels of hydrogen bonding units (e.g., urethanes, ureas, amides, hydroxyls, amines, carbonyl-based acids, phosphorus-based acids, sulfur-based acids, poly(ethylene glycol) ethers, or derivatives thereof). In some embodiments, the polymeric materials disclosed herein comprise less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units. The percentage of hydrogen bonding units can be calculated or measured by weight percentage of hydrogen bonding groups. As a non-limiting example, the NHCO of an amide bond acts as both hydrogen donor and hydrogen acceptor; accordingly, a polymeric material having less than 10 wt % of the NHCO unit (and no other type of hydrogen bonding units) has less than 10 wt % hydrogen bonding units. Alternatively, in some embodiments, the value of wt % hydrogen bonding units can be determined by performing titration to obtain the number of hydrogen bonding groups. In some embodiments, the polymeric material comprises less than 5 wt % hydrogen bonding units. In some embodiments, the polymeric material comprises less than 2 wt % hydrogen bonding units. In some embodiments, the polymeric material comprises essentially no hydrogen bonding units. Low amounts of hydrogen bonding units in a polymeric material can result in said polymeric material having relatively low levels of water absorption, because such absorption is facilitated by the presence of hydrogen bonding units. Advantageously, resins having reduced hydrogen bonding groups tend to have lower viscosity than the same basic polymer having hydrogen bonding groups, which can improve utility with, as a non-limiting example, stereolithographic 3D printers.

In some embodiments, polymeric materials described herein have low levels of water absorption. Such low levels of water absorption are favorable for polymeric materials described herein, or orthodontic devices or other applications where water absorption is detrimental. Water absorption can occur when a polymeric material is exposed to a wet environment (e.g., a patient's mouth using an orthodontic appliance formed from a polymeric material). Traditional polymeric materials having high levels of hydrogen bonds facilitate water uptake due to the attraction of water to hydrogen bonding groups; water molecules are also attracted to polar atoms. In some embodiments, polymeric materials disclosed herein have weak bonds that have low or no polar atoms, minimizing water uptake. In certain embodiments, the polymeric materials comprise polar atoms in the weak covalent bonds, but said bonds have minimal to no disruption by water, maintaining the integrity of the polymeric material. Properties of the polymeric material can degrade when water absorption reaches a threshold value, typically greater than 22 wt %. It is preferred herein that the polymeric materials have low levels of water uptake. In some embodiments, the polymeric material comprises a water uptake of less than 25 wt %, less than 20 wt %, less than 15 wt %, less than 10 wt %, less than 5 wt %, less than 4 wt %, less than 3 wt %, less than 2 wt %, less than 1 wt %, less than 0.5 wt %, less than 0.25 wt %, or less than 0.1 wt %. In some embodiments, the water uptake is measured after 24 hours in a wet environment at 37° C. In some embodiments, the water uptake is measured using a sample no greater than 1 mm thick. In certain embodiments, the water uptake is measured using a sample that is 1 mm thick. In some embodiments, a polymeric material is hydrophobic.

In some embodiments, it is desirable to form a hydrophilic or hygroscopic material that remains tough even after absorption of water. As a non-limiting example, hydrogels that incorporate looped unit(s) comprising weak bond(s) as described herein would provide a tough hydrogel material. Other materials that traditionally rely on hydrogen bonding to provide toughness can benefit by the incorporation of the looped units containing weak bridges and/or weak bonds as described herein. In some instances, the absorption of water in a hydrogel stresses the crosslinked polymer matrix such that the covalent bonds breaks and the polymer tears itself apart. With the introduction of the herein described looped units with weak bridges, the hydrogel absorbs more water and is able to relieve the stress of the increased water content by breaking the weak bonds while the integrity of the polymer network is not compromised. Materials that absorb oils, solvents, water, or other compounds without losing material integrity are easy to design using the presently disclosed rings and related materials. Materials comprising the ring unit(s) can absorb greater than 10%, greater than 50%, greater than 100%, greater than 200%, greater than 300%, greater than 500%, or greater than 1000% of their initial weight in water, aqueous solutions, oils, salts, target molecules, bioactive molecules, drugs, dyes, and/or other compounds, without breaking. In some embodiments, once absorbed, the absorbed material is available as slow release device. In some embodiments, once absorbed, the absorbed material is considered sequestered.

In certain embodiments, the polymeric material comprises a polymer chain comprising a plurality of monomers, each joined with a backbone covalent bond having a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond.

In some embodiments, the ring monomer is attached to the polymer chain with a first connector comprising a covalent bond. In some embodiments, the ring monomer is attached to the polymer chain with a second connector comprising a covalent bond. In some embodiments, each of the first connector and the second connector attaches the polymer chain to the ring monomer with a covalent bond.

In some embodiments, the weak bond is a dynamic covalent bond. In certain embodiments of the polymeric material, at least 1%, at least 2%, at least 3%, at least 4%, at least 5%, at least 10%, at least 20%, at least 30%, at least 40%, or at least 50% of the weak bonds are dynamic covalent bonds. In some embodiments, the dynamic covalent bond is a radical dynamic covalent bond (i.e., a weak covalent bond that breaks to form radicals that can combine with other radicals to reform or form a new bond).

Polymeric materials having weak bonds and/or weak bridges comprising weak bonds have bonds in said polymeric materials that are weaker than the backbone of the polymeric material, so when the material is manipulated (e.g., pulled), the weak bond cleaves prior to cleavage of the polymer backbone or other bonds present in the ring (e.g., a plurality of bonds connected in series, each positioned between sets of two ring members, and each having a bond dissociation energy greater than the weak bond), thus relieving stress and preserving strength of the polymer backbone. Main chain breakage in polymeric materials leads to rapid fracture, so incorporation of rings comprising weak bonds and/or weak bridges comprising weak bonds prevent breaks. In some embodiments, a stress applied to the polymeric material breaks the weak bond prior to breaking a covalent bond of the polymer chain or the plurality of bonds connected in series (see, e.g., FIG. 8D, wherein a carbon-sulfur bond (i.e., weak bond) is broken following application of tension, while the polymer chain and plurality of bonds connected in series (i.e., the 7 carbon atoms positioned between the two aryl rings) remain intact). Another non-limiting example of an advantage of the ring monomers comprising a weak bond is how it affects the property of elongation to break. An additional property that is influenced by the presence of rings comprising weak bonds includes strength at yield (i.e., the addition of rings comprising weak bonds will decrease strength at yield compared to strongly crosslinked materials when both are in the same molar amount). In some embodiments, increasing the concentration of the rings comprising weak bonds increases the strength at yield, but potentially retains elongation at break values.

In some embodiments, the rings comprising weak bonds can be used in organic, inorganic, or hybrid systems. In certain embodiments, the polymers comprise an organic polymer, an inorganic polymer, or a hybrid polymer. In some embodiments, the organic polymer is selected from the group consisting of polyethylenes, polypropylenes, polybutylenes, polyisoprenes, polyacrylates, polymethacrylates, thioether-containing polymers, polyethers, polyesters, copolymers thereof, mixtures thereof, a combination thereof, and a derivative thereof. In some embodiments, the organic polymer comprises a hydrogen-bonded system (for example, a urethane and polyamide), as well as a mixture or copolymer with the organic polymers described herein. In some embodiments, the inorganic polymer is selected from the group consisting of polysilanes, polysiloxanes, polyphosphazenes, copolymers thereof, mixtures thereof, a combination thereof, and a derivative thereof. Hybrid polymers (e.g., organic-inorganic polymers) can comprise any of the organic polymers and any of the inorganic polymers, copolymers thereof, mixtures thereof, and derivatives thereof.

C. Properties of Polymeric Materials

The specific compositions, synthesis, formulations, and descriptions of any of the materials, devices, systems, and components thereof, of the present disclosure can be readily varied depending upon the intended application. Specifically, weak crosslinks, strong crosslinks, polymer chains and ring monomers can be used alone or in combination with any of the disclosures described herein.

Polymeric materials disclosed herein have properties that are favorable for numerous applications and for the production of various devices. As a non-limiting example, the polymeric materials described herein are useful for production of orthodontic appliances, such as aligners. Orthodontic appliances require toughness and resilience to move a patient's teeth, while maintaining durability for use. In some embodiments, the polymeric material has a high glass transition temperature, a low creep, and a low stress relaxation.

In embodiments described herein, the polymeric materials have properties that are measured following placement of the material in an aqueous environment for 24 hours at 37° C. Property values of the polymeric material can be determined, for example, by using the following methods:

- stress relaxation properties can be assessed using an RSA-G2 instrument from TA Instruments, with a 3-point bending, according to ASTM D790; stress relaxation can be measured at 30° C. and submerged in water, and reported as the remaining load after 24 hours, or as the percent (%) of initial load;
- storage modulus can be measured at 37° C. and is reported in MPa;
- $T_g$ of the cured polymeric material can be assessed using dynamic mechanical analysis (DMA) and is provided herein as the tan δ peak when run at 1 hz with a temperature ramp of 2° C. a minute;
- tensile modulus, tensile strength, elongation at yield and elongation at break can be assessed according to ISO 527-2 5B;
- tensile strength at yield, elongation at break, tensile strength, and Young's modulus can be assessed according to ASTM D1708; and
- flexural stress relaxation remaining after 24 hours in wet environment at 37° C. ("flexural stress remaining") can be assessed according to ASTM E328. Other methods can be used to characterize the materials described herein, and the above methods provide exemplary methods. For a given application, the method of material characterization that is chosen, a comparison of a polymer system with no crosslinks, with strong crosslinks of similar length and flexibility, and with weak covalent crosslinks will help determine if the property of interest is improved by the use of weak covalent crosslinks. For a given application, the method of material characterization that is chosen, a comparison of a polymer system with no ring monomers, and with ring monomers will help determine if the property of interest is improved by the use of a ring or rings comprising a weak bond. For some preferred comparisons, the material having ring monomer(s) comprising the weak bond are compared to a comparable material having ring monomer(s) comprising a substitute bond taking the place of the weak bond, wherein the substitute bond has a bond dissociation energy greater than the weak bond. In some embodiments, the substitute bond has a bond dissociation energy equal to, similar to, or greater than the bond dissociation energy the polymer chain backbone and/or polymer network. In some embodiments, the monomer(s) comprising the substitute bond are in the same concentration as the monomer(s) comprising the weak bond.

In embodiments, the polymeric material is characterized by a tensile stress-strain curve that displays a yield point after which the test specimen continues to elongate, but there is no increase in load. Such yield point behavior typically occurs "near" the glass transition temperature, where the material is between the glassy and rubbery regimes and may be characterized as having viscoelastic behavior. In embodiments, viscoelastic behavior is observed in the temperature range 20° C. to 40° C. The yield stress is determined at the yield point. In some embodiments, the yield point follows an elastic region in which the slope of the stress-strain curve is constant or nearly constant. In embodiments, the modulus is determined from the initial slope of the stress-strain curve or as the secant modulus at 1% strain (e.g. when there is no linear portion of the stress-strain curve). The elongation at yield is determined from the strain at the yield point. When the yield point occurs at a maximum in the stress, the ultimate tensile strength is less than the yield strength. For a tensile test specimen, the strain is defined by ln (l/l0), which may be approximated by (l–l0)/l0 at small strains (e.g. less than approximately 10%) and the elongation is l/l0, where l is the gauge length after some deformation has occurred and l0 is the initial gauge length. The mechanical properties can depend on the temperature at which they are measured. The test temperature may be below the expected use temperature for a dental appliance such as 35° C. to 40° C. In some embodiments, the test temperature is 23±2° C. For some applications, the test temperature is higher than 40° C. For some applications, the test temperature is lower than 23° C.

In some embodiments, the polymeric materials are characterized by one or more of: a tensile modulus greater than or equal to 100 MPa after being placed in an aqueous environment for 24 hours at 37° C.; a tensile strength at yield greater than or equal to 5 MPa after being placed in an aqueous environment for 24 hours at 37° C.; a storage modulus greater than or equal to 300 MPa after being placed in an aqueous environment for 24 hours at 37° C.; a flexural stress remaining ("stress remaining") of greater than or equal to 1.5 MPa remaining after 24 hours after being placed in an aqueous environment for 24 hours at 37° C.; a hardness from 60 Shore A to 85 Shore D after being placed in an aqueous environment for 24 hours at 37° C.; and an elongation at break greater than or equal to 15% before and/or after being placed in an aqueous environment for 24 hours at 37° C.

In some embodiments, the polymeric material is characterized by a tensile modulus after 24 hours testing in a wet environment at 37° C. from 100 MPa to 3000 MPa, from 100 MPa to 2500 MPa, from 100 MPa to 2000 MPa, from 500 MPa to 3000 MPa, from 500 MPa to 2500 MPa, from 500 MPa to 2000 MPa, from 750 MPa to 3000 MPa, from 750 MPa to 2500 MPa, or from 750 MPa to 2000 MPa. In some preferred embodiments, the polymeric material has a tensile modulus of greater than 500 MPa after 24 hours in a wet environment at 37° C. In some preferred embodiments, the polymeric material is characterized by a tensile modulus greater than or equal to 800 MPa after 24 hours in a wet environment at 37° C.

In some embodiments, the polymeric material has a tensile strength at yield from 1 MPa to 100 MPa, from 5 MPa to 85 MPa, from 10 MPa to 75 MPa, from 15 MPa to 65 MPa, from 20 MPa to 55 MPa, or from 25 MPa to 45 MPa. In preferred embodiments, the polymeric material has a tensile strength at yield from 30 MPa to 60 MPa. In some embodiments, the polymeric material is characterized by a tensile strength at yield greater than or equal to 0.1 MPa, greater than or equal to 0.5 MPa, greater than or equal to 1 MPa, greater than or equal to 10 MPa, greater than or equal to 30 MPa, greater than or equal to 40 MPa, greater than or equal to 50 MPa, greater than or equal to 60 MPa, greater than or equal to 70 MPa, greater than or equal to 80 MPa, greater than or equal to 90 MPa, or greater than or equal to 100 MPa. In preferred embodiments, the polymeric material is characterized by a tensile strength at yield greater than or equal 30 MPa.

In some embodiments, the polymeric material is characterized by a storage modulus from 0.1 MPa to 4000 MPa, from 50 MPa to 2750 MPa, from 100 MPa to 2500 MPa, from 200 MPa to 2250 MPa, from 300 MPa to 3000 MPa, from 500 MPa to 3000 MPa, from 750 MPa to 3000 MPa, or from 1000 MPa to 3000 MPa after 24 hours in a wet environment at 37° C. In preferred embodiments, the polymeric material is characterized by a storage modulus after 24 hours testing in a wet environment at 37° C. of 0.1 MPa to 4000 MPa, a storage modulus of 300 MPa to 3000 MPa, or a storage modulus of 750 MPa to 3000 MPa.

It is advantageous for polymeric materials to have a flexural stress remaining of 5% or greater after 24 hours testing in a wet environment at 37° C. In some embodiments, the flexural stress remaining is 5% or greater, 10% or greater, 15% or greater, 20% or greater, 25% or greater, 30% or greater, 35% or greater, 40% or greater, 50% or greater, 60% or greater, or 70% or greater. In some embodiments, the polymeric material is characterized by a flexural stress remaining greater than 10% at 24 hours testing in a wet environment at 37° C. In some preferred embodiments, the polymeric material is characterized by a flexural stress remaining greater than 20% at 24 hours testing in a wet environment at 37° C. In some more preferred embodiments, the polymeric material is characterized by a flexural stress remaining greater than 25% at 24 hours testing in a wet environment at 37° C. In some embodiments, the polymeric material is characterized by a flexural stress remaining from 5% to 50%, from 10% to 50%, from 15% to 50%, from 20% to 50%, from 25% to 50%, or from 30% to 50% of the initial load after 24 hours in a wet environment at 37° C. In some embodiments, the polymeric material is characterized by a flexural stress remaining from 5% to 100%, from 10% to 100%, from 15% to 100%, from 20% to 100%, from 25% to 100%, from 30% to 100%, from 40% to 100%, from 50% to 100%, from 60% to 100%, from 70% to 100%, from 80% to 100%, or from 90% to 100% of the initial load after 24 hours in a wet environment at 37° C. In some preferred embodiments, the polymeric material is characterized by a flexural stress remaining from 20% to 45% of the initial load after 24 hours in a wet environment at 37° C. In some preferred embodiments, the polymeric material is characterized by a flexural stress remaining greater than 50% of the initial load after 24 hours in a wet environment at 37° C.

In some embodiments, the polymeric material is characterized by a flexural stress remaining from 0.01 MPa to 15 MPa, from 0.05 MPa to 15 MPa, from 0.1 MPa to 15 MPa, from 0.5 MPa to 15 MPa, from 1 MPa to 15 MPa, from 2 MPa to 15 MPa, from 3 MPa to 15 MPa, from 4 MPa to 15 MPa, from 5 MPa to 15 MPa, or from 10 MPa to 15 MPa after 24 hours in a wet environment at 37° C. In some preferred embodiments, the polymeric material is characterized by a flexural stress remaining from 2 MPa to 15 MPa after 24 hours in a wet environment at 37° C. In some embodiments, the polymeric material is characterized by a flexural stress of greater than or equal to 0.1 MPa, greater than or equal to 0.5 MPa, greater than or equal to 1 MPa, greater than or equal to 1.5 MPa, greater than or equal to 2 MPa, greater than or equal to 2.5 MPa, greater than or equal to 3 MPa, greater than or equal to 4 MPa, greater than or equal to 5 MPa, greater than or equal to 6 MPa, greater than or equal to 7 MPa, greater than or equal to 8 MPa, greater than or equal to 9 MPa, greater than or equal to 10 MPa, or greater than or equal to 15 MPa remaining after 24 hours in a wet environment at 37° C. In some preferred embodiments, the polymeric material is characterized by a flexural stress of greater than or equal to 1.5 MPa remaining after 24 hours in a wet environment at 37° C.

In some embodiments, the polymeric material has a stress relaxation measurement determined by ASTM D790 with 5% deflection on a 3-point bending test. In some embodiments, the stress relaxation can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature is 37±2° C. at 100% relative humidity or a temperature of 37±2° C. in water. Stress relaxation properties may be assessed using an RSA-G2 instrument from TA Instruments, with a 3-point bending, 5% strain method. The stress relaxation is typically measured at 37° C. and 100% relative humidity and reported as the remaining load after 2 hours, as either the percent (%) of initial load or in MPa). In some embodiments, the polymeric material has a stress remaining of greater than or equal to 5% of the initial load. In some embodiments, the polymeric material is characterized by a stress remaining of 5% to 45% of the initial load. In certain aspects, the polymeric material is characterized by a stress remaining of 20% to 45% of the initial load. In certain embodiments, the polymeric material is characterized by a stress remaining of greater than or equal to 20% or greater than or equal to 35% of the initial load. In some embodiments, the stress relaxation measurement of the polymeric material has a value at 24 hours in 30° C. water that is greater than 10% of the initial stress. In some embodiments, the stress relaxation measurement of the polymeric material has a value at 24 hours in 30° C. water that is greater than 15%, greater than 20%, greater than 25%, greater than 30%, greater than 35%, greater than 40%, greater than 45%, or greater than 50% of the initial stress. In some embodiments, the polymeric material has a stress remaining greater than or equal to 0.01 MPa. In certain embodiments, the polymeric material is characterized by a stress remaining of 0.01 MPa to 15 MPa. In certain aspects, the polymeric material is characterized by a stress remaining of 2 MPa to 15 MPa.

In some embodiments, the polymeric materials characterized by a stress remaining of 5% to 85% of the initial load, such as 5% to 45%, 15% to 85%, or 20% to 45% of the initial load. In some embodiments, the polymeric material is characterized by a stress remaining of 0.01 MPa to 15 MPa, such as 2 MPa to 15 MPa. In some embodiments, the polymeric material is characterized by a stress remaining of greater than or equal to 20% of the initial load.

In certain embodiments, it is advantageous that the polymeric material have a high flexural stress remaining, forming relatively stiff materials. In some applications relating to use of hard materials (e.g., aeronautical engineering, medical implants), a polymeric material disclosed herein would be advantageous due to the availability of conventional 3D printers to form these polymeric materials having the desired characteristics. In some embodiments, the polymeric material has a flexural modulus remaining of 50 MPa or more, 60 MPa or more, 70 MPa or more, 80 MPa or more, 90 MPa or more, 100 MPa or more, 125 MPa or more, or 150 MPa or more. In some embodiments, the flexural modulus remaining is measured after 24 hours in a wet environment at a use temperature. In certain embodiments, the use temperature is 37° C.

In certain other embodiments, it is advantageous that the polymeric material have a relatively low flexural stress remaining, forming materials that are not overly-stiff. In some embodiments, the polymeric material has a flexural stress remaining of 80 MPa or less, 70 MPa or less, 60 MPa or less, 55 MPa or less, 50 MPa or less, or 45 MPa or less.

In some embodiments, the flexural stress remaining is measured after 24 hours in a wet environment at a use temperature. In some embodiments, the use temperature is 37° C. In some embodiments, the polymeric material is characterized by a stress remaining after 24 hours testing in a wet environment at 37° C. of 0.01 MPa to 15 MPa, or a stress remaining of 2 MPa to 15 MPa.

In some embodiments, a polymeric material will have a flexural stress remaining after a period of time of use. As a non-limiting example, an orthodontic appliance (e.g., an aligner) can be formed of a polymeric material having a high flexural stress, but following application of the appliance to the teeth of a patient, there can be a significant and fast decrease of flexural stress (e.g., over the course of minutes). Such decreases in flexural stress can follow an exponential curve of decrease leading towards an asymptote during the intended lifetime of the appliance (e.g., over the course of weeks for an orthodontic appliance such as an aligner). Orthodontic appliances may have an initial period of discomfort that, following a period of use, decreases corresponding with a decrease of flexural stress remaining. In some embodiments, the polymeric material has a flexural stress remaining of 90 MPa or less, 85 MPa or less, 80 MPa or less, 75 MPa or less, 70 MPa or less, 65 MPa or less, 60 MPa or less, 55 MPa or less, or 50 MPa or less after a time period of use. In preferred embodiments, the polymeric material has a flexural stress remaining of 80 MPa or less after a time period of use. In some embodiments, the time period of use is 1 minute, 5 minutes, 10 minutes, 30 minutes, 1 hour, or 24 hours. As a non-limiting example, an aligner composed of polymeric material placed onto a patient's teeth that is removed after 10 minutes and has a flexural stress of 70 MPa would have a polymeric material characterized by a flexural stress remaining of 70 MPa after a time period of use, wherein said time period is 10 minutes.

In some embodiments, the polymeric material is characterized by an elongation at break greater than 10%, an elongation at break greater than 20%, an elongation at break greater than 30%, an elongation at break of 5% to 250%, an elongation at break of 20% to 250%, or an elongation at break value between 40% and 250%. In certain embodiments, the elongation at break is measured in dry conditions (e.g., a dry environment). In some embodiments, the polymeric material is characterized by an elongation at break after 24 hours testing in a wet environment at 37° C. greater than 10%, an elongation at break greater than 20%, an elongation at break greater than 30%, an elongation at break of 5% to 250%, an elongation at break of 20% to 250%, or an elongation at break value between 40% and 250%. In some embodiments, the polymeric material is characterized by an elongation at break both in dry environment, and after 24 hours testing in a wet environment at 37° C., greater than 10%, an elongation at break greater than 20%, an elongation at break greater than 30%, an elongation at break of 5% to 250%, an elongation at break of 20% to 250%, or an elongation at break value between 40% and 250%.

In some embodiments, the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15%. In some embodiments, the polymeric material has an elongation at yield of 4% to 10% or 5% to 15%. In certain embodiments, the elongation at yield is measured in dry conditions (e.g., a dry environment). In some embodiments, the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15% after 24 hours testing in a wet environment at 37° C. In some embodiments, the polymeric material has an elongation at yield of 4% to 10% or 5% to 15% after 24 hours testing in a wet environment at 37° C. In some embodiments, the polymeric material has an elongation at yield greater than 4%, greater than 5%, greater than 6%, greater than 7%, greater than 8%, greater than 9%, greater than 10%, greater than 11%, greater than 12%, greater than 13%, greater than 14%, or greater than 15% both in dry environment, and after 24 hours testing in a wet environment at 37° C. In some embodiments, the polymeric material has an elongation at yield of 4% to 10% or 5% to 15% both in a dry environment, and after 24 hours testing in a wet environment at 37° C.

In some embodiments, the polymeric material has at least one glass transition temperature ($T_g$) from 0° C. to 150° C. In preferred embodiments, the polymeric material has at least one glass transition temperature greater than 60° C. In more preferred embodiments, the polymeric material has at least one glass transition temperature greater than 75° C. In some embodiments, the at least one glass transition temperature is from 0° C. to 200° C., from 0° C. to 140° C., from 0° C. to 20° C., from 20° C. to 40° C., from 40° C. to 60° C., from 60° C. to 80° C., from 80° C. to 100° C., from 100° C. to 120° C., from 120° C. to 140° C., from 140° C. to 160° C., from 160° C. to 180° C., from 180° C. to 200° C., from 0° C. to 35° C., from 35° C. to 65° C., from 65° C. to 100° C., from 0° C. to 50° C., or from 50° C. to 100° C. In some embodiments, the polymeric material has at least one glass transition temperature from 0° C. to 10° C., from 10° C. to 20° C., from 20° C. to 30° C., from 30° C. to 40° C., from 40° C. to 50° C., from 50° C. to 60° C., from 60° C. to 70° C., from 70° C. to 80° C., or from 80° C. to 90° C. In some embodiments, the polymeric material has at least one glass transition temperature from −100° C. to 40° C., from −80° C. to 10° C., from −70° C. to 0° C., from −70° C. to −10° C., from −70° C. to −20° C., from −70° C. to −30° C., from −70° C. to −40° C., from −70° C. to −50° C., or from −80° C. to −40° C. In some embodiments, the polymeric material has at least two glass transition temperatures. In some embodiments, the polymeric material has a first $T_g$ less than 40° C. and a second $T_g$ greater than 60° C., a first $T_g$ less than 0° C. and a second $T_g$ greater than 60° C., a first $T_g$ less than 0° C. and a second $T_g$ greater than 75° C., or a first $T_g$ less than −20° C. and a second $T_g$ greater than 80° C.

In some embodiments, the polymeric material is clear, substantially clear, mostly clear, or opaque. In certain embodiments, the polymeric material is clear. In certain embodiments, the polymeric material is substantially clear. In certain embodiments, the polymeric material is mostly clear. In some embodiments, greater than 70% of visible light passes through the polymeric material. In certain embodiments, greater than 80% of visible light passes through the polymeric material. In certain embodiments, greater than 90% of visible light passes through the polymeric material. In certain embodiments, greater than 95% of visible light passes through the polymeric material. In certain embodiments, greater than 99% of visible light passes through the polymeric material. Transparency can be measured using a UV-Vis spectrophotometer. In some embodiments, the transparency is measured by measuring the passage of a wavelength of transparency. In some embodiments, greater than 70%, greater than 80%, greater than 90%, greater than 95%, or greater than 99% of the wavelength of transparency can pass through the polymeric material. In some embodiments, the wavelength of transparency is in the visible light range (i.e., from 400 nm to 800 nm), is in the infrared light range, or is in the ultraviolet light range. In some embodiments, the polymeric material does not have color. In other embodiments, the polymeric material appears white, off-white, or mostly transparent with white coloring, as detected by the human eye.

In some embodiments, greater than 20%, greater than 30%, greater than 40%, greater than 50%, greater than 60%, greater than 70%, greater than 80%, greater than 90%, or greater than 95% of visible light passes through the polymeric material after 24 hours in a wet environment at 37° C. In preferred embodiments, greater than 70% of visible light passes through the polymeric material after 24 hours in a wet environment at 37° C.

In some embodiments, the polymeric material is biocompatible, bioinert, or a combination thereof.

In some embodiments, the polymeric material is formed using 3D printing (i.e., by additive manufacturing) using photopolymerization. In certain embodiments, the polymeric material is formed using conventional 3D printers. In some embodiments, the polymeric material can be used in coatings, molds, injection molding machines, or other manufacturing methods that use or could use light during the curing process. In some embodiments, the polymeric material is well suited for applications that require, e.g., solvent resistance, humidity resistance, water resistance, creep resistance, or heat deflection resistance.

D. Printable Resin

The polymeric materials disclosed herein can be formed from printable resins. In some embodiments, weak crosslinks, strong crosslinks, polymer chains and ring monomers can be used alone or in combination, or with any of the disclosures described herein to form printable resins.

i. Weak Covalent Crosslinks

Polymeric materials disclosed herein can be formed from printable resins. In some embodiments, this disclosure provides a printable resin for forming a polymeric material comprising a weak crosslinking covalent bond and/or a weak crosslinking unit comprising a weak covalent bond. In some embodiments, the printable resin comprises a weak crosslinking unit comprising a plurality of weak covalent bonds. In some embodiments, this disclosure provides a printable resin comprising: a plurality of monomers; a weak crosslinking unit comprising a first end and a second end, the weak crosslinking unit comprising a weak crosslinking bond positioned between the first end and the second end; and an initiator. In some embodiments, the weak crosslinking bond has a weak bond dissociation energy from 50 kJ/mol to 325 kJ/mol. In some embodiments, the plurality of monomers are comprised in an oligomer. In some embodiments, the plurality of monomers comprise an oligomer. In certain embodiments, the oligomer has an average chain length from 1 kDa to 20 kDa.

In some embodiments, this disclosure provides a printable resin comprising: a plurality of monomers; an activatable unit; and an initiator. In some embodiments, the activatable unit converts to a weak crosslinking unit when activated by a catalyst, the weak crosslinking unit comprising a weak crosslinking bond positioned between a first end of the weak crosslinking unit and a second end of the weak crosslinking unit. In some embodiments, the weak crosslinking bond has a bond dissociation energy from 50 kJ/mol to 325 kJ/mol. In some embodiments, the plurality of monomers are comprised in an oligomer. In some embodiments, the plurality of monomers comprise an oligomer. In certain embodiments, the oligomer has an average chain length from 1 kDa to 20 kDa. In some embodiments, the printable resin further comprises the catalyst. In some embodiments, the resin forms an activatable unit in-situ.

Figure 10A:
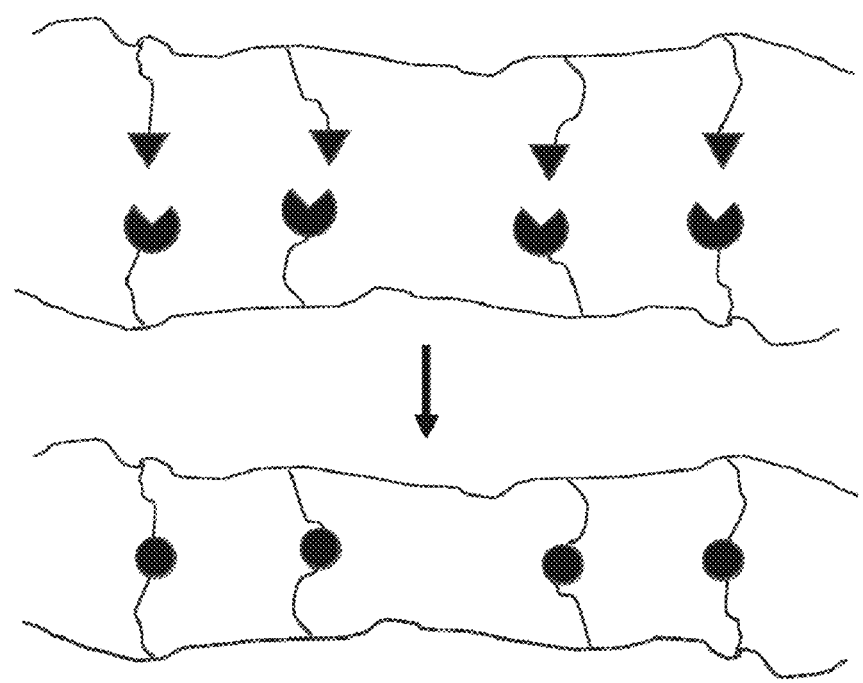
FIG. 10A illustrates an example of a resin comprising a first monomer comprising a first weak bond forming unit and a second monomer comprising a strong weak bond forming unit, and their combination to form weak crosslinking bonds.

In some embodiments, this disclosure provides a printable resin comprising: a plurality of monomers, the plurality of monomers comprising a first monomer comprising a first weak bond forming unit and a second monomer comprising a second weak bond forming unit; and an initiator. In some embodiments, the first weak bond forming unit and the second weak bond forming unit combine thereby forming a weak crosslinking unit comprising a first end and a second end, and a weak crosslinking bond positioned between the first monomer and the second monomer. FIG. 10A illustrates an example plurality of monomers comprising a first monomer comprising a first weak bond forming unit and a second monomer comprising a second weak bond forming unit, wherein the first and second monomers combine thereby forming a weak bond positioned between the first monomer and the second monomer. In some embodiments, the weak crosslinking bond has a weak bond dissociation energy from 50 kJ/mol to 325 kJ/mol. In certain embodiments, at least some of the plurality of monomers are comprised in an oligomer. In some embodiments, the plurality of monomers comprise an oligomer. In certain embodiments, the oligomer has an average chain length from 1 kDa to 20 kDa.

In some embodiments, the weak crosslinking unit is a weak crosslinking bond (i.e., a covalent bond). In some embodiments, the weak crosslinking unit has a chain length from 30 Da to 5,000 Da.

In some embodiments, the first end of the weak crosslinking unit comprises a first end reactive functional group. In preferred embodiments, the first end reactive functional group is selected from the group consisting of an acrylate, a methacrylate, a vinyl ester, a maleate, a fumarate, a thiol, an epoxide, an allyl ether, an ene, an yne, a hydroxyl, an amine, an isocyanate, an aldehyde (and/or ketone), a derivative thereof, and a combination thereof.

In some embodiments, the second end of the weak crosslinking unit comprises a second end reactive functional group. In preferred embodiments, the second end reactive functional group is selected from the group consisting of an acrylate, a methacrylate, a vinyl ester, a maleate, a fumarate, a thiol, an epoxide, an allyl ether, an ene, an yne, a hydroxyl, an amine, an isocyanate, an aldehyde (and/or ketone), a derivative thereof, and a combination thereof.

Figure 7A:
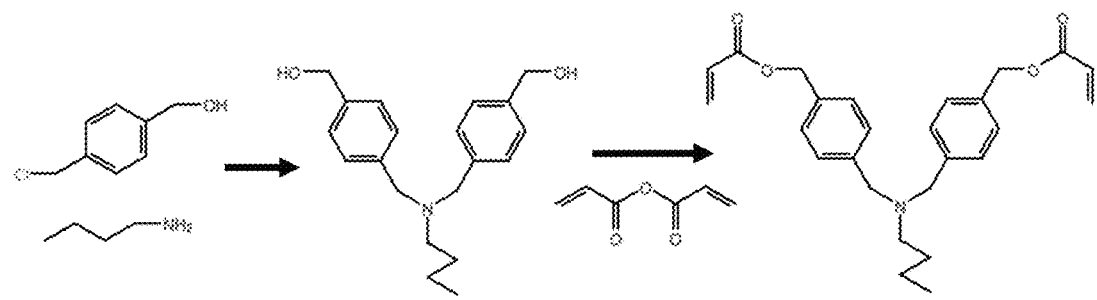
FIG. 7A illustrates an example synthesis of a nitrogen-based weak crosslinking unit monomer.
Figure 7B:
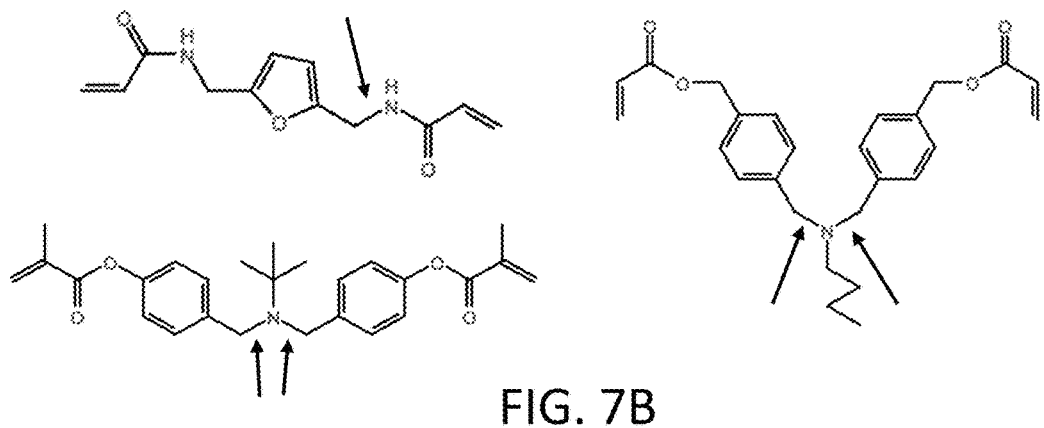
FIG. 7B illustrates example nitrogen-based weak crosslinking units.
Figure 7C:
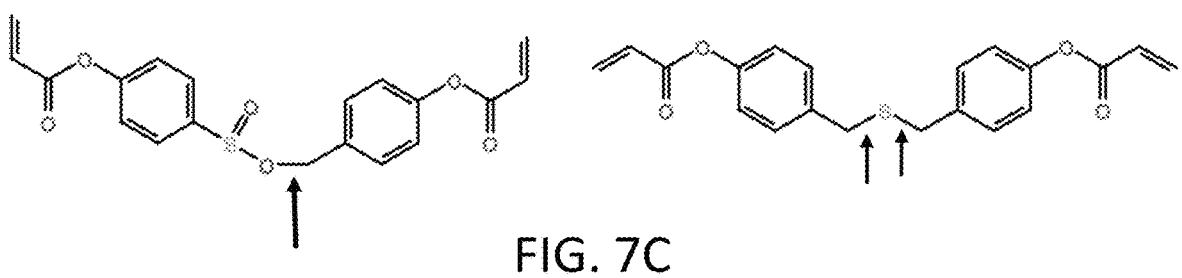
FIG. 7C illustrates example sulfur-based weak crosslinking units.
Figure 7D:
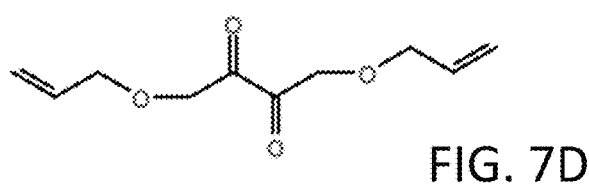
FIG. 7D shows an example diketone-based weak crosslinking unit.

In some embodiments, the weak crosslinking bond is a peroxide (O—O bond), a disulfide (S—S bond), a C—P bond, a C—O bond, a C—S bond, a N—N bond, a N—P bond, a N—O bond, a N—C bond, a O—S bond, a Si—Si bond, a Si—S bond, a P—Si bond, a P—P bond, a Se—C bond, a Se—S bond, a Se—Se bond, a Bi—C bond, a benzyl group connected to a carbon or heteroatom, or a C(O)—C(O) bond. FIG. 7A illustrates an example synthesis of a nitrogen-based crosslinking unit. FIG. 7B illustrates example nitrogen-based crosslinking units, with weak covalent bonds shown with arrows. FIG. 7C illustrates example sulfur-based crosslinking units, with weak covalent bonds shown with arrows. FIG. 7D illustrates an example diketone-based crosslinking unit.

In some embodiments, the weak crosslinking unit has the chemical structure of Formula I-a, or a derivative thereof:

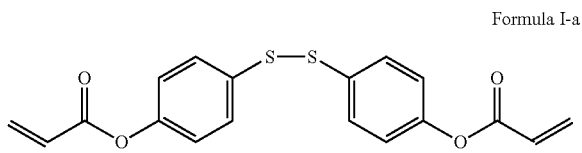 [SMILES: C=CC(=O)Oc1ccc(SSc2ccc(OC(=O)C=C)cc2)cc1]

Formula I-a

In some embodiments, the weak crosslinking unit has the chemical structure of Formula II-a, or a derivative thereof:

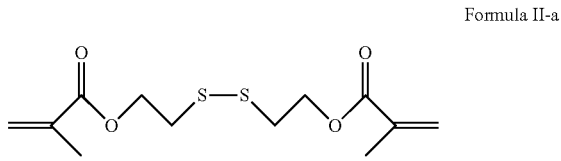 [SMILES: C=C(C)C(=O)OCCSSCCOC(=O)C(=C)C]

Formula II-a

In some embodiments, the weak crosslinking unit has the chemical structure of Formula III-a, or a derivative thereof:

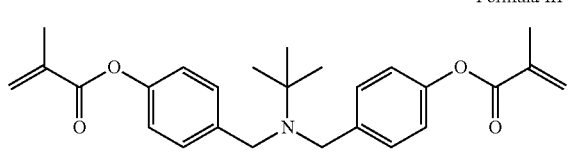

Formula III-a

In some embodiments, the bond dissociation energy of the weak crosslinking bond is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some embodiments, the weak crosslinking bond has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene.

In some embodiments, the oligomer comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak crosslinking bond.

In some embodiments, the printable resin comprises a ratio of the longest length of the weak crosslinking unit to the longest length of the oligomer, wherein the ratio is less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500. In some embodiments, the printable resin comprises a ratio of the longest length of the weak crosslinking unit to the longest length of the oligomer, wherein the ratio is from 1:5 to 1:200, from 1:10 to 1:200, from 1:20 to 1:200, from 1:30 to 1:200, from 1:40 to 1:200, from 1:50 to 1:200, from 1:75 to 1:200, from 1:100 to 1:200, from 1:5 to 1:100, from 1:10 to 1:100, from 1:20 to 1:100, from 1:30 to 1:100, from 1:40 to 1:100, from 1:50 to 1:100, from 1:75 to 1:100, from 1:100 to 1:500, from 1:200 to 1:500, from 1:300 to 1:500, from 1:400 to 1:500, or less than or equal to 1:500.

In some embodiments, the printable resin further comprises a strong crosslinking unit, wherein the strong crosslinking unit comprises a first end and a second end, and the strong crosslinking unit comprises one or more bonds forming a chain connecting to the first end and the second end. A printable resin comprising a strong crosslinking unit is typically photocured having a statistically higher molecular weight product, thereby increasing toughness. In some embodiments, the addition of the strong crosslinking unit increases early stage average kinetic chain length during polymerization, but the product does not form a thermoset or gel. In some embodiments, each of the one or more bonds in the strong crosslinking unit has a bond dissociation energy greater than or equal to 280 kJ/mol or greater than or equal to 300 kJ/mol. In some embodiments, each of the one or more bonds in the strong crosslinking unit has a bond dissociation energy at least 20 kJ/mol, at least 40 kJ/mol, at least 80 kJ/mol, at least 120 kJ/mol, at least 150 kJ/mol, or at least 200 kJ/mol greater than the bond dissociation energy of the weak crosslinking bond.

Figure 10B:
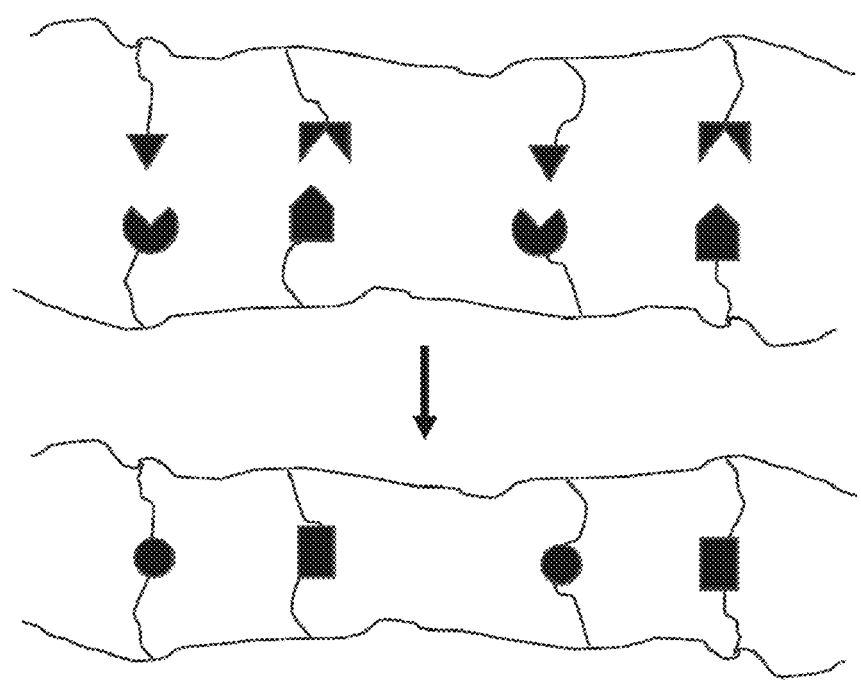
FIG. 10B illustrates a resin further comprising a third monomer comprising a first strong bond forming unit and a fourth monomer comprising a second strong bond forming unit, and their combination to form strong crosslinking bonds.

In some embodiments, the printable resin further comprises a third monomer comprising a first strong bond forming unit; and a fourth monomer comprising a second strong bond forming unit, wherein the first strong bond forming unit and the second strong bond forming unit combine thereby forming a strong crosslinking unit positioned between the third monomer and the fourth monomer. FIG. 10B illustrates an example of a printable resin comprising a first monomer comprising a first weak bond forming unit, a second monomer comprising a strong weak bond forming unit, a third monomer comprising a first strong bond forming unit, and a fourth monomer comprising a second strong bond forming unit, wherein the first weak bond forming unit and the second weak bond forming unit combine thereby forming a weak crosslinking bond, and the first strong bond forming unit and the second strong bond forming unit combine thereby forming a strong crosslinking bond. In some embodiments, the strong crosslinking unit comprises one or more bonds. In some embodiments, the one or more bonds each having a bond dissociation energy greater than or equal to 280 kJ/mol, or greater than or equal to 300 kJ/mol. In some embodiments, the one or more bonds each has a bond dissociation energy at least 20 kJ/mol, at least 40 kJ/mol, at least 80 kJ/mol, at least 100 kJ/mol, at least 120 kJ/mol, at least 150 kJ/mol, or at least 200 kJ/mol greater than the bond dissociation energy of the weak crosslinking bond. In some embodiments, the strong crosslinking unit is formed in-situ from the resin comprising the components.

In some embodiments, the first end of the strong crosslinking unit comprises a first end reactive functional group, the second end of the strong crosslinking unit comprises a second end reactive functional group, or a combination thereof.

In some embodiments, the printable resin comprises from 0.1 wt % to 50 wt %, from 1 wt % to 30 wt %, from 2 wt % to 10 wt %, less than 10 wt %, less than 5 wt %, less than 1 wt %, less than 0.5 wt %, or less than 0.1 wt % of the weak crosslinking unit.

In some embodiments, the weak crosslinking bond is selected from the group consisting of a peroxide (O—O bond), a disulfide (S—S bond), a C—P bond, a C—O bond, a C—S bond, a N—N bond, a N—P bond, a N—O bond, a N—C bond, a O—S bond, a Si—Si bond, a Si—S bond, a P—Si bond, a P—P bond, a Se—C bond, a Se—S bond, a Se—Se bond, a Bi—C bond, a benzyl group connected to a carbon or heteroatom, or a C(O)—C(O) bond, and a combination thereof. In some embodiments, the weak crosslinking bond is a nonpolar covalent bond or a polar covalent bond. A skilled artisan understands the molecular structure surrounding a bond can play a role on bond dissociation energy. As a non-limiting example, a disulfide bond can have a bond dissociation energy greater than 300 kJ/mol in certain molecular arrangements, but less than 300 kJ/mol in other molecular arrangements. In certain embodiments, molecular modeling is used to predict molecular structures that lead to low bond dissociation energies.

Figure 8A:
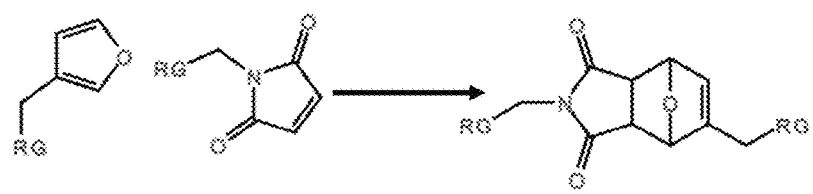
FIG. 8A illustrates an example synthesis of a Diels-Alder adduct as a weak crosslinking unit.
Figure 8B:
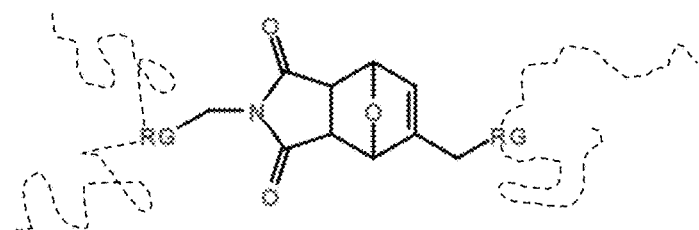
FIG. 8B illustrates the exemplary adduct incorporated into a polymer network.
Figure 8C:
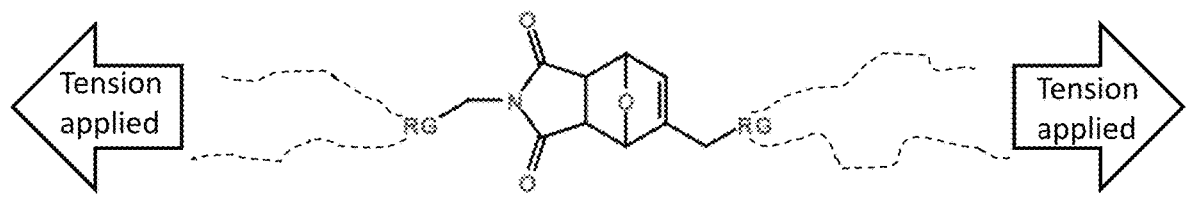
FIG. 8C illustrates tension applied to the polymer network comprising a weak crosslinking unit.
Figure 8D:
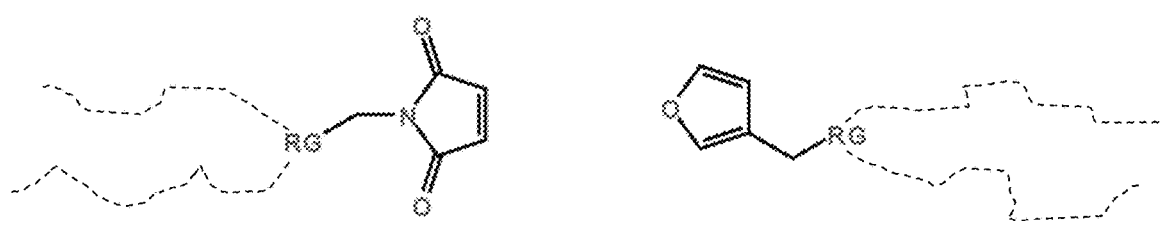
FIG. 8D illustrates the dissociation of the weak crosslinking unit following application of tension.
Figure 8E:
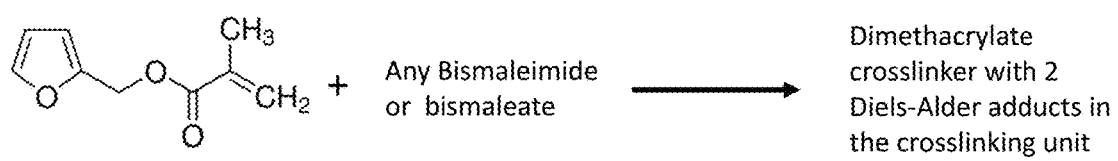
FIG. 8E and FIG. 8F each illustrate the synthesis of exemplary Diels-Alder adducts.
Figure 8F:
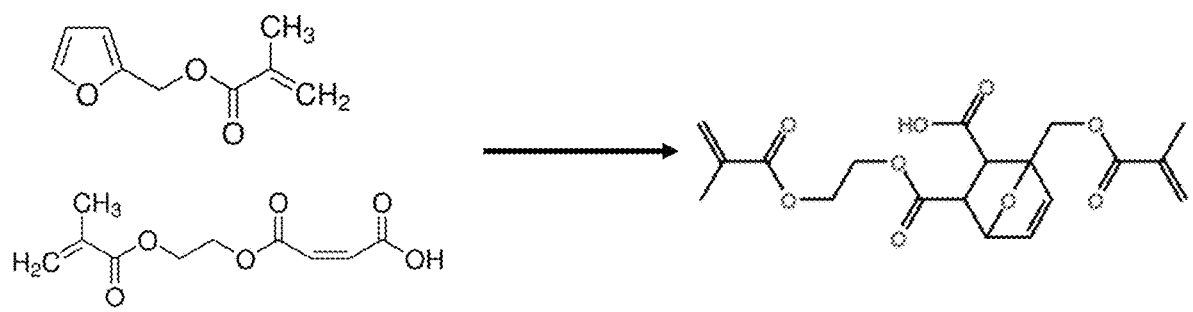

In some embodiments, the weak crosslink comprises a Diels-Alder bond. An exemplary Diels-Alder adduct and synthesis thereof is shown in FIG. 8A. Under stress, the Diels-Alder adduct can dissociate. In some embodiments, bonds to coordinations or ligands are also weak crosslinking bonds. As shown in FIG. 8A, the adduct can comprise reactive groups ("RG"), for example, an epoxide, an acrylate, or a thiol. FIG. 8B shows the reactive groups of the Diels-Alder adduct are polymerized into the polymer network (dashed lines). FIG. 8C shows a tension applied to the Diels-Alder adduct as the polymer network is strained, causing stress to be applied across the crosslink. FIG. 8D shows the dissociation of the Diels-Alder adduct, relieving some stress in the polymer network. New adducts can form, possibly with new configurations. If the double bond in the Diels-Alder adduct is reacted (e.g., that disclosed in the adduct of FIG. 8B), it locks the adduct such that it cannot dissociate as readily as the non-reacted moiety. FIG. 8E shows the synthesis of exemplary Diels-Alder adducts as described herein. The Diels-Alder crosslinking unit can be polymerized into a material to form a weak crosslinking unit. Optionally, excess furfuryl methacrylate can be present in the formulation to allow for easy reformation of the Diels-Alder bond after an initial dissociation of the Diels-Alder adduct. FIG. 8F shows another synthesis of an exemplary Diels-Alder adduct. The Diels-Alder crosslinking unit can optionally be esterified at the carboxylic acid. Depending on the reaction conditions and reactants used, some of the Diels-Alder adducts can copolymerize via the ene in the adduct, in which case the crosslinking unit becomes a strong crosslink since the dissociation of the adduct is no longer possible.

Figure 9A:
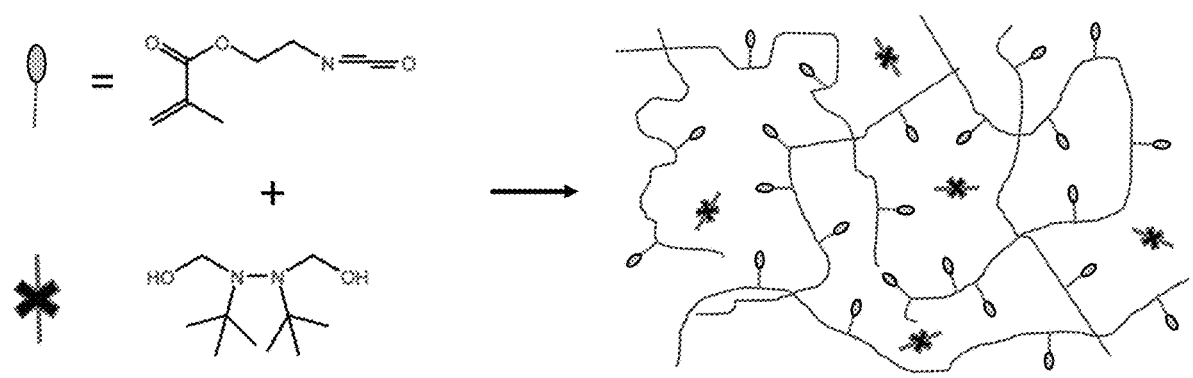
FIG. 9A illustrates the polymerization of an exemplary polymer network comprising reactive functional groups.
Figure 9B:
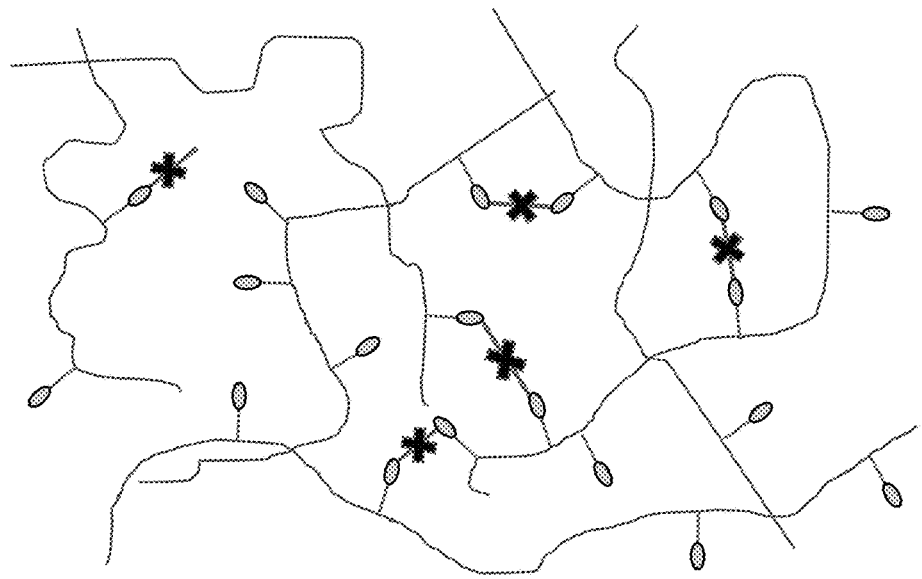
FIG. 9B illustrates weak crosslinking units attaching to the polymer network following an initial cure.

In some embodiments, the resin comprises an oligomer and/or a polymer that contains a weak covalent crosslinking bond in a pendant group to the oligomer and/or polymer. In some embodiments, the pendant group comprises a reactive functional group to facilitate incorporation into a final cured crosslinked network. FIG. 9A illustrates the polymerization of methacrylate into a polymer matrix with other monomers wherein the weak crosslinking moiety (comprising hydroxyl reactive groups) freely diffuses and is not reacted. FIG. 9B shows that, following a post-cure heating step, the hydroxyls react with the isocyanate, forming weak crosslinking units interpenetrated throughout the network. In some embodiments, the weak covalent bond is in a crosslinking unit between two oligomers and/or polymers that have reactive end groups. In some embodiments, the weak covalent crosslinking bond is contained in a star, hyperbranched, or dendritic oligomer or polymer, or combinations thereof, that contain reactive functional groups as end groups.

In some embodiments, the printable resin comprises a plurality of oligomers having an oligomer average chain length; and a plurality of weak crosslinking units having a weak crosslinking unit average chain length, wherein the weak crosslinking unit average chain length is less than the oligomer average chain length. In some embodiments, the resin has a ratio of the weak crosslinking unit average chain length to the oligomer average chain length, and wherein the ratio is from 1:1.1 to 1:100, from 1:2 to 1:100, from 1:5 to 1:100, from 1:10 to 1:100, from 1:20 to 1:100, from 1:30 to 1:100, from 1:40 to 1:100, from 1:50 to 1:100, from 1:10 to 1:200, from 1:20 to 1:200, from 1:30 to 1:200, from 1:40 to 1:200, from 1:50 to 1:200, from 1:100 to 1:200, less than or equal to 1:2, less than or equal to 1:3, less than or equal to 1:4, less than or equal to 1:5, less than or equal to 1:6, less than or equal to 1:7, less than or equal to 1:8, less than or equal to 1:9, less than or equal to 1:10, less than or equal to 1:20, less than or equal to 1:30, less than or equal to 1:40, less than or equal to 1:50, less than or equal to 1:75, less than or equal to 1:100, less than or equal to 1:200, less than or equal to 1:300, less than or equal to 1:400, or less than or equal to 1:500.

In some embodiments, the weak crosslinking unit comprises a polymerizable group. In some embodiments, the polymerizable group is selected from the group consisting of a vinyl group, an allyl group, an allyl ether, an acrylate group, a methacrylate group, an acrylamide group, an epoxy group, an oxetanyl group, a thiol group, a hydroxyl, an amine, an aldehyde, a ketone, a derivative thereof, and a combination thereof.

In some embodiments, the oligomer comprises a polymerizable group. In some embodiments, the polymerizable group of the oligomer is selected from the group consisting of a vinyl group, an allyl group, an allyl ether, an acrylate group, a methacrylate group, an acrylamide group, an epoxy group, an oxetanyl group, a thiol group, a hydroxyl, an amine, an aldehyde, a ketone, a derivative thereof, and a combination thereof.

ii. Inchain Loops

Polymeric materials disclosed herein can be formed from printable resins. In some embodiments, this disclosure provides a printable resin for forming a polymer chain and/or polymeric material comprising a ring monomer. In some embodiments, the printable resin comprises a ring monomer comprising a ring comprising three or more ring members, a first bond positioned between a first set of two ring members and having a bond dissociation energy less than 325 kJ/mol, and a second bond positioned between a second set of two ring members and having a bond dissociation energy greater than the bond dissociation energy of the weak bond. In some embodiments, the second bond has a bond dissociation energy greater than 325 kJ/mol. In some embodiments, the ring monomer further comprises a first connector attached to the ring comprising a first reactive group and a second connector attached to the ring comprising a second reactive group. FIG. 7 shows a non-limiting example of such a ring monomer. In some embodiments, the printable resin comprises a plurality of monomers. In some embodiments, the printable resin comprises a plurality of ring monomers. In some embodiments, the plurality of monomers are comprised in an oligomer having an average chain length from 1 kDa to 30 kDa.

In some embodiments, the printable resin comprises: a plurality of monomers, optionally wherein the plurality of monomers are comprised in an oligomer having an average chain length from 1 kDa to 30 kDa; and a ring monomer comprising: three or more ring members; a first bond positioned between a first set of two ring members and having a bond dissociation energy less than 325 kJ/mol; a second bond positioned between a second set of two ring members and having a bond dissociation energy greater than the first bond; a first connector attached to the ring comprising a first reactive group; and a second connector attached to the ring comprising a second reactive group. In some embodiments, the second bond has a bond dissociation energy greater than 325 kJ/mol.

In some embodiments, the printable resin comprises: a plurality of monomers, optionally wherein the plurality of monomers are comprised in an oligomer having an average chain length from 1 kDa to 30 kDa; and a ring monomer comprising: three or more ring members; a first bond positioned between a first set of two ring members, wherein upon catalyst activation, the first bond is convertible to a bond having a bond dissociation energy less than 325 kJ/mol (i.e., the first bond is an activatable unit); a second bond positioned between a second set of two ring members and having a bond dissociation energy greater than the first bond; a first connector attached to the ring comprising a first reactive group; and a second connector attached to the ring comprising a second reactive group. In some embodiments, the second bond has a bond dissociation energy greater than 325 kJ/mol. In some embodiments, the resin further comprises the catalyst.

In some embodiments, the first connector is covalently attached to the ring. In some embodiments, the second connector is covalently attached to the ring. In some embodiments, the first connector, the second connector, or a combination thereof, are each positioned external to the ring (e.g., do not comprise bonds within the three or more members of the ring).

In some embodiments, the first connector comprises a first reactive functional group. In some embodiments, the first reactive functional group is selected from the group consisting of an acrylate, a methacrylate, a vinyl ester, a maleate, a fumarate, a thiol, an epoxide, an allyl ether, an ene, an yne, a hydroxyl, an amine, an isocyanate, an aldehyde (and/or ketone), a derivative thereof, and a combination thereof.

In some embodiments, the second end connector comprises a second reactive functional group. In some embodiments, the second reactive functional group is selected from the group consisting of an acrylate, a methacrylate, a vinyl ester, a maleate, a fumarate, a thiol, an epoxide, an allyl ether, an ene, an yne, a hydroxyl, an amine, an isocyanate, an aldehyde (and/or ketone), a derivative thereof, and a combination thereof.

In some embodiments, the weak bond is a peroxide (O—O bond), a disulfide (S—S bond), a C—P bond, a C—O bond, a C—S bond, a N—N bond, a N—P bond, a N—O bond, a N—C bond, a O—S bond, a Si—Si bond, a Si—S bond, a P—Si bond, a P—P bond, a Se—C bond, a Se—S bond, a Se—Se bond, a Bi—C bond, a benzyl group connected to a carbon or heteroatom, or a C(O)—C(O) bond.

In some embodiments, the ring monomer has the chemical structure of Formula I-b, or a derivative thereof:

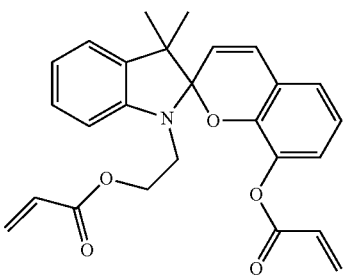

Formula I-b

In some embodiments, the ring monomer has the chemical structure of Formula II-b, or a derivative thereof:

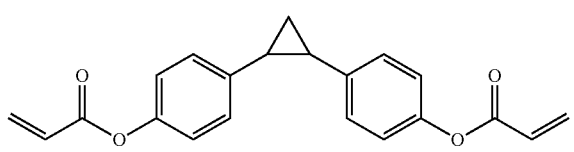

Formula II-b

In some embodiments, the ring monomer has the chemical structure of Formula III-b, or a derivative thereof:

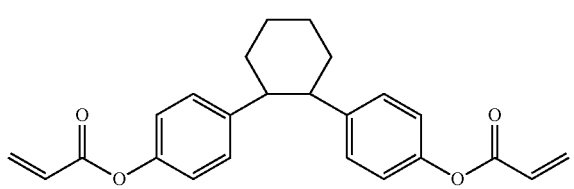

Formula III-b

In some embodiments, the ring monomer has the chemical structure of Formula IV-b, or a derivative thereof:

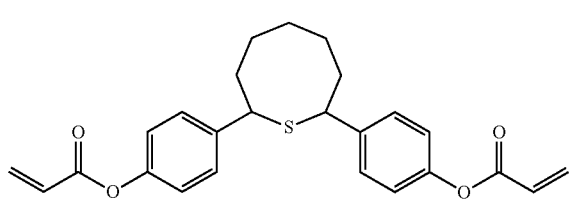

Formula IV-b

In some embodiments, the ring monomer has the chemical structure of Formula V-b, or a derivative thereof:

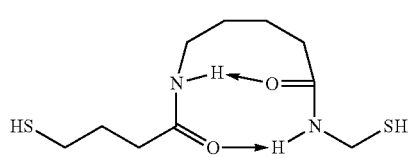

Formula V-b

In some embodiments, the ring monomer has the chemical structure of Formula VI-b, or a derivative thereof:

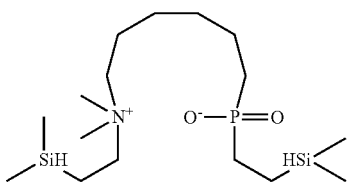

Formula VI-b

In some embodiments, the ring monomer comprises at least one reactive functional group. In some embodiments, the ring monomer comprises at least two reactive functional groups (e.g., at a first connector and at a second connector). Non-limiting examples of reactive functional groups include free radically polymerizable functionalities, photoactive groups, groups facilitating step growth polymerization, thermally reactive groups, and/or groups that facilitate bond formation (e.g., covalent bond formation). In some embodiments, the reactive functional groups are polymerizable groups. In some embodiments, the reactive functional groups can be initiated with a photocatalyst and/or photoinitiator. In some embodiments, the reactive functional groups comprise a polymerizable unsaturated bond and/or a ring opening group. In some embodiments, the reactive functional groups comprise an acrylate, a methacrylate, an acrylamide, a vinyl group, a vinyl ether, a thiol, an alcohol, an allyl ether, a norbornene, a vinyl acetate, a maleate, a fumarate, a maleimide, an epoxide, a vinyl ester, a styrene, a butadiene, an ene, a ring-strained cyclic ether, a ring-strained thioether, a cyclic ester, a cyclic carbonate, a cyclic silane, a cyclic siloxane, a hydroxyl, an amine, an isocyanate, an aldehyde, a ketone, a blocked isocyanate, an acid chloride, an activated ester, a Diels-Alder reactive group, a furan, a cyclopentadiene, an anhydride, a group favorable toward photodimerization (e.g., an anthracene, an acenaphthalene, and/or a coumarin), a group that photodegrades into a reactive species (e.g., Norrish Type 1 and 2 materials), an azide, a nitrene-generating group, a carbene-generating group, a derivative thereof, or a combination thereof. In some embodiments, the reactivity of the reactive functional groups is controllable thermally and/or photochemically.

In some embodiments, the first reactive functional group and the second reactive functional group are the same. In other embodiments, the first reactive functional group and the second reactive functional group are different functional groups.

In some embodiments, the bond dissociation energy of the first bond (i.e., the weak bond) is less than or equal to 300 kJ/mol, less than or equal to 275 kJ/mol, less than or equal to 250 kJ/mol, less than or equal to 225 kJ/mol, less than or equal to 200 kJ/mol, less than or equal to 175 kJ/mol, less than or equal to 150 kJ/mol, from 50 kJ/mol to 300 kJ/mol, from 55 kJ/mol to 250 kJ/mol, or from 60 kJ/mol to 200 kJ/mol. In some embodiments, the first bond (i.e., the weak bond) has less than 85%, less than 80%, less than 75%, less than 70%, less than 65%, less than 60%, less than 55%, less than 50%, less than 45%, less than 40%, less than 35%, less than 30%, less than 25%, or less than 20% the strength of the average carbon-carbon bond in polyethylene.

In some embodiments, the oligomer comprises a backbone wherein all covalent bonds in the backbone have a bond dissociation energy at least 20 kJ/mol, at least 30 kJ/mol, at least 40 kJ/mol, at least 50 kJ/mol, at least 60 kJ/mol, at least 70 kJ/mol, at least 80 kJ/mol, at least 90 kJ/mol, at least 100 kJ/mol, at least 125 kJ/mol, at least 150 kJ/mol, at least 175 kJ/mol, or at least 200 kJ/mol greater than the bond dissociation energy of the weak bond.

In some embodiments, the printable resin further comprises a crosslinking unit, wherein the crosslinking unit comprises a first end and a second end, and the crosslinking unit comprises one or more bonds forming a chain connecting to the first end and the second end. A printable resin comprising a crosslinking unit is typically photocured having a statistically higher molecular weight product, thereby increasing toughness. In some embodiments, the addition of the crosslinking unit increases early stage average kinetic chain length during polymerization, but the product does not form a thermoset or gel. In some embodiments, each of the one or more bonds in the crosslinking unit has a bond dissociation energy greater than or equal to 280 kJ/mol or greater than or equal to 300 kJ/mol. In some embodiments, each of the one or more bonds in the crosslinking unit has a bond dissociation energy at least 20 kJ/mol, at least 40 kJ/mol, at least 80 kJ/mol, at least 120 kJ/mol, at least 150 kJ/mol, or at least 200 kJ/mol greater than the bond dissociation energy of the weak bond.

In some embodiments, the printable resin comprises from 0.1 wt % to 50 wt %, from 1 wt % to 30 wt %, from 2 wt % to 10 wt %, less than 10 wt %, less than 5 wt %, less than 1 wt %, less than 0.5 wt %, or less than 0.1 wt % of the ring monomer.

In some embodiments, the weak bond is selected from the group consisting of a peroxide (O—O bond), a disulfide (S—S bond), a C—P bond, a C—O bond, a C—S bond, a N—N bond, a N—P bond, a N—O bond, a N—C bond, a O—S bond, a Si—Si bond, a Si—S bond, a P—Si bond, a P—P bond, a Se—C bond, a Se—S bond, a Se—Se bond, a Bi—C bond, a benzyl group connected to a carbon or heteroatom, or a C(O)—C(O) bond, and a combination thereof. In some embodiments, the weak bond is a nonpolar covalent bond or a polar covalent bond. A skilled artisan understands the molecular structure surrounding a bond can play a role on bond dissociation energy. As a non-limiting example, a disulfide bond can have a bond dissociation energy greater than 300 kJ/mol in certain molecular arrangements, but less than 300 kJ/mol in other molecular arrangements. In certain embodiments, molecular modeling is used to predict molecular structures that lead to low bond dissociation energies.

In some embodiments, the ring and/or weak bridge comprises a Diels-Alder unit. Under stress, the Diels-Alder adduct can dissociate. In some embodiments, bonds to coordinations or ligands are also weak bonds. Depending on the reaction conditions and reactants used, some of the Diels-Alder adducts can copolymerize via the ene in the adduct, in which case the weak bond (e.g., the Diels-Alder adduct) becomes a strong bond since the dissociation of the adduct is no longer possible. In some embodiments, the polymer comprising loop units comprise Diels-Alder adducts as the weak bridge. In some embodiments, a percentage of the Diels-Alder adducts are reacted (i.e., deactivated towards reverse Diels-Alder reactions) and thus are no longer weak bridges in the loop. In some embodiments, less than 5%, less than 10%, less than 20%, less than 30%, less than 40%, less than 50%, less than 60%, less than 70%, less than 80%, or less than 90% of the Diels-Alder adducts are deactivated. In some embodiments, less than 30%, of the Diels-Alder adducts are deactivated. In some embodiments, less than 10% of the Diels-Alder adducts are deactivated.

In some embodiments, the ring monomer comprises a polymerizable group. In some embodiments, the polymerizable group is selected from the group consisting of a vinyl group, an allyl group, an allyl ether, an acrylate group, a methacrylate group, an acrylamide group, an epoxy group, an oxetanyl group, a thiol group, a hydroxyl, an amine, an aldehyde, a ketone, an isocyanate, an acid halide, an anhydride, a low molecular weight ester (i.e., less than 200 g/mol), a carboxylic acid, a silanol, a silane, a chlorosilane, a cyclic siloxane, an alkoxy silane, a derivative thereof, and a combination thereof. In some embodiments, the ring monomer comprises at least two polymerizable groups.

In some embodiments, the oligomer comprises a polymerizable group. In some embodiments, the polymerizable group of the oligomer is selected from the group consisting of a vinyl group, an allyl group, an allyl ether, an acrylate group, a methacrylate group, an acrylamide group, an epoxy group, an oxetanyl group, a thiol group, a hydroxyl, an amine, an aldehyde, a ketone, an isocyanate, an acid halide, an anhydride, a low molecular weight ester (i.e., less than 200 g/mol), a carboxylic acid, a silanol, a silane, a chlorosilane, a cyclic siloxane, an alkoxy silane, a derivative thereof, and a combination thereof.

In some embodiments, a plurality of loops are incorporated into the material. In certain embodiments, the plurality of loops comprise more than one size of loop (e.g., more than one ring size). As a non-limiting example, a material comprising a plurality of loops can comprise 10% of the loops having 10 ring members, 80% of the loops having 8 ring members, and 10% of the loops having 20 ring members.

Figure 15A:
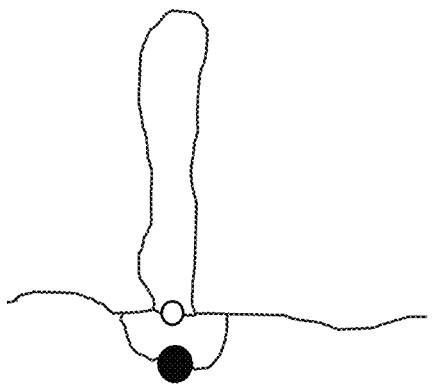
FIGS. 15A-C show exemplary ring monomers comprising multiple weak bonds and/or multiple rings.
Figure 15B:
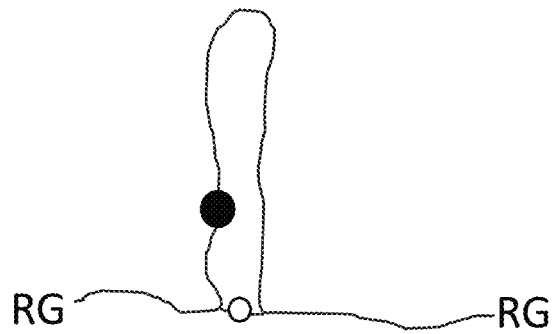
Figure 15C:
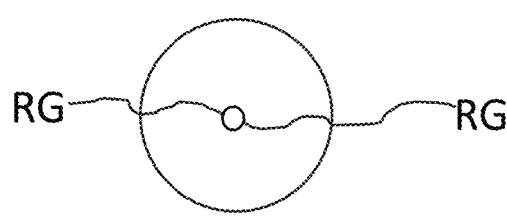

In some embodiments, at least some of the looped units contain more than one loop in the loop monomer. In certain embodiments, each of the more than one loop comprise a weak bond. As a non-limiting example, FIG. 15A illustrates a loop monomer wherein the ring comprises a plurality of rings, including a ring having a short-length chain comprising a first weak bond and a medium-length chain having a second weak bond. In some embodiments, the loop monomer comprises a single ring, said single ring comprising a plurality of weak bonds. As a non-limiting example, FIG. 15B illustrates a loop monomer wherein the ring comprises a first weak bond positioned along a short chain and a second weak bond positioned along a long chain. In some embodiments, the loop monomer comprises a plurality of rings sharing a weak bond. As a non-limiting example, FIG. 15C illustrates a loop monomer comprising two rings (e.g., a first ring comprising the top semicircular polymer chain and a second ring comprising the bottom semicircular polymer chain), said two rings sharing a weak bond. In some embodiments, the first weak bond has a higher bond dissociation energy than the second weak bond. In some embodiments, the second weak bond has a higher bond dissociation energy than the first weak bond. In some embodiments, the second weak bond and the first weak bond have the same bond dissociation energy. In some embodiments, the reactive groups represented in FIG. 15A-C represent a connection to a polymer network.

iii. Additional Printable Resin Properties

In some embodiments, the printable resin comprises the oligomer having an average chain length from 1 kDa to 20 kDa, and the oligomer comprises at least some of the plurality of monomers. In some embodiments, the resin comprises a plurality of unreacted monomers and at least one oligomer having a chain length from 1 kDa to 20 kDa. In some embodiments, the oligomer has an average chain length greater than 20 kDa. In some embodiments, the plurality of monomers comprise oligomers or polymers. In certain embodiments, the plurality of monomers consist essentially of only oligomers or polymers. In some embodiments, the plurality of monomers consist of only oligomers or polymers.

In some embodiments, the printable resin comprises the oligomer having an average chain length from 1 kDa to 30 kDa, and the oligomer comprises at least some of the plurality of monomers. In some embodiments, the resin comprises a plurality of unreacted monomers and at least one oligomer having a chain length from 1 kDa to 30 kDa. In some embodiments, the oligomer has an average chain length greater than 30 kDa. In some embodiments, the plurality of monomers comprise oligomers or polymers. In certain embodiments, the plurality of monomers consist essentially of only oligomers or polymers. In some embodiments, the plurality of monomers consist of only oligomers or polymers. In some embodiments, the plurality of monomers consist of only monomers comprising rings disclosed herein.

In some embodiments, the printable resins comprise an initiator that is a photoinitiator. Photoinitiators may be useful for various purposes, including for curing of polymers, including those that can be activated with light and initiate polymerization of the polymerizable components of the formulation. In embodiments, the photoinitiator is a radical photoinitiator and/or a cationic initiator. In some embodiments, the photoinitiator is a Type I photoinitiator which undergoes a unimolecular bond cleavage to generate free radicals. In an additional embodiment the photoinitiator is a Type II photoinitiator which undergoes a bimolecular reaction to generate free radicals. Common Type I photoinitiators include, but are not limited to benzoin ethers, benzil ketals, α-dialkoxy-acetophenones, α-hydroxy-alkyl phenones and acyl-phosphine oxides. Common Type II photoinitiators include benzophenones/amines and thioxanthones/amines. Cationic initiators include aryldiazonium, diaryliodonium, and triarylsulfonium salts. In preferred embodiments, the photoinitiator comprises diphenyl (2,4,6-trimethylbenzoyl)-phosphine oxide, ethyl (2,4,6-trimethylbenzoyl) phenyl phosphinate, or a combination thereof. In certain preferred embodiments, the photoinitiator comprises a radical photoinitiator, a cationic initiator, and/or a photobase generator. In some preferred embodiments, the photoinitiator is a Type I photoinitiator which undergoes a unimolecular bond cleavage to generate free radicals, or a Type II photoinitiator which undergoes a bimolecular reaction to generate free radicals. In some preferred embodiments, the Type I photoinitiator is a benzoin ether, a benzil ketal, an α-dialkoxy-acetophenone, an α-hydroxy-alkyl phenome, or an acyl-phosphine oxide. In some preferred embodiments, the Type II photoinitiator is a benzophenone/amine, camphorquinone/amine, or a thioxanthone/amine. In some embodiments using a Type II photoinitiator, a donor other than amine is used (e.g., a borate salt). In some preferred embodiments, the cationic initiators is an aryldiazonium, a diaryliodonium, or a triarylsulfonium salt. In certain embodiments, the photoinitiator undergoes Type I, Type II, electron transfer, and/or hydrogen abstraction.

In some embodiments, the photoinitiator initiates photopolymerization using light energy. In certain embodiments, the photoinitiator initiates photopolymerization with exposure to light energy from 800 nm to 250 nm, from 800 nm to 350 nm, from 800 nm to 450 nm, from 800 nm to 550 nm, from 800 nm to 650 nm, from 600 nm to 250 nm, from 600 nm to 350 nm, from 600 nm to 450 nm, or from 400 nm to 250 nm. In some embodiments, the photoinitiator initiates photopolymerization following absorption of two photons, which can use longer wavelengths of light to initiate the photopolymerization. In some embodiments, more than one photoinitiator is used, and each is activated at a different wavelength and or at a different time. As a non-limiting example, one photoinitiator can be activated during a print stage and a second photoinitiator can be activated during a post cure stage. In some embodiments wherein more than one initiator is used, they are activated at different wavelengths or they are activated using different energy sources (e.g. thermal, ultrasonic, infrared, radio-frequency heating); the activation of each initiator can occur simultaneously (e.g., both thermal and infrared activation at the same time) or at different times.

In some embodiments, the resin comprises more than one initiator (e.g., 2, 3, 4, 5, or more than 5 initiators). In some embodiments, the initiator is a thermal initiator. In certain embodiments, the thermal initiator comprises an organic peroxide. In some embodiments, the thermal initiator comprises an azo compound, an inorganic peroxide, an organic peroxide, or any combination thereof. In some embodiments, the thermal initiator is selected from the group consisting of tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy 2,5-dimethylhexane, 2,5-bis(tert-butylperoxy)-2,5-dimethyl-3-hexyne, bis(1-(tert-butylperoxy)-3,3,5-trimethylcyclohexane, tert-butyl hydroxyperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, a derivative thereof, and a combination thereof. In preferred embodiments, the thermal initiator comprises azobisisobutyronitrile, 2,2'-azodi(2-methylbutyronitrile), benzoyl peroxide, or a combination thereof.

In some embodiments, the printable resin comprises 0.01-10 wt %, 0.02-5 wt %, 0.05-4 wt %, 0.1-3 wt %, 0.1-2 wt %, or 0.1-1 wt % of the initiator. In preferred embodiments, the printable resin comprises 0.1-2 wt % of the initiator. In some embodiments, the printable resin comprises 0.01-10 wt %, 0.02-5 wt %, 0.05-4 wt %, 0.1-3 wt %, 0.1-2 wt %, or 0.1-1 wt % of the photoinitiator. In preferred embodiments, the printable resin comprises 0.1-2 wt % of the photoinitiator. In some embodiments, the printable resin comprises from 0 to 10 wt %, from 0 to 9 wt %, from 0 to 8 wt %, from 0 to 7 wt %, from 0 to 6 wt %, from 0 to 5 wt %, from 0 to 4 wt %, from 0 to 3 wt %, from 0 to 2 wt %, from 0 to 1 wt %, or from 0 to 0.5 wt % of the thermal initiator. In preferred embodiments, the printable resin comprises from 0 to 0.5 wt % of the thermal initiator.

Non-limiting examples of reactive functional groups include free radically polymerizable functionalities, photoactive groups, groups facilitating step growth polymerization, thermally reactive groups, and/or groups that facilitate bond formation (e.g., covalent bond formation). In some embodiments, the functional groups comprise an acrylate, a methacrylate, an acrylamide, a vinyl group, a vinyl ether, a thiol, an allyl ether, a norbornene, a vinyl acetate, a maleate, a fumarate, a maleimide, an epoxide, a ring-strained cyclic ether, a ring-strained thioether, a cyclic ester, a cyclic carbonate, a cyclic silane, a cyclic siloxane, a hydroxyl, an amine, an isocyanate, an aldehyde, a ketone, a blocked isocyanate, an acid chloride, an activated ester, a Diels-Alder reactive group, a furan, a cyclopentadiene, an anhydride, a group favorable toward photodimerization (e.g., an anthracene, an acenaphthalene, or a coumarin), a group that photodegrades into a reactive species (e.g., Norrish Type 1 and 2 materials), an azide, a derivative thereof, or a combination thereof.

In some embodiments, the first end reactive functional group and the second end reactive functional group are the same. In other embodiments, the first end reactive functional group and the second end reactive functional group are different functional groups.

In some embodiments, printable resins disclosed herein comprise less than 10 wt %, less than 9 wt %, less than 8 wt %, less than 7 wt %, less than 6 wt %, less than 5 wt %, less than 4 wt %, less than 3 wt %, less than 2 wt %, or less than 1 wt % hydrogen bonding units. In preferred embodiments, the printable resin comprises less than 5 wt % hydrogen bonding units. In more preferred embodiments, the printable resin comprises less than 2 wt % hydrogen bonding units.

In some embodiments, the oligomer comprises a plurality of monomers, each joined with a backbone covalent bond having a bond dissociation energy greater than or equal to 280 kJ/mol or greater than or equal to 300 kJ/mol. In some embodiments, the oligomer comprises a plurality of monomers, each joined with a backbone covalent bond at least 20 kJ/mol, at least 40 kJ/mol, at least 80 kJ/mol, at least 100 kJ/mol, at least 120 kJ/mol, at least 150 kJ/mol, or at least 200 kJ/mol greater than the weak covalent bond.

In some embodiments, the printable resin further comprises a reactive diluent, a crosslinking modifier, a light blocker, a solvent, a glass transition temperature modifier, a thermal initiator, a catalyst for activating the activatable unit, or a combination thereof. In some embodiments, the resin further comprises at least one of a polymerization catalyst, an inhibitor, a plasticizer, a surface energy modifier, a pigment, a dye, a filler, a binder, a crystallization seed, a crystallization catalyst, a biological agent, a catalyst for selectively breaking bonds, or any combination thereof.

In some embodiments, the printable resin has a viscosity less than 60 PaS, less than 50 PaS, less than 40 PaS, less than 30 PaS, less than 20 PaS, less than 10 PaS, less than 9 PaS, less than 8 PaS, less than 7 PaS, less than 6 PaS, less than 5 PaS, less than 4 PaS, less than 3 PaS, less than 2 PaS, or less than 1 PaS at a printable temperature. In some embodiments, the printable temperature is at, above, or below room temperature. In some embodiments, the printable temperature is from 0° C. to 25° C., from 25° C. to 40° C., from 40° C. to 100° C., or from 25° C. to 150° C. In preferred embodiments, the resin has a viscosity from 0.5 PaS to 20 PaS at a printable temperature. In preferred embodiments, the printable temperature is from 70° C. to 110° C. In some embodiments, the printable temperature is 90° C. In certain preferred embodiments, the printable resin has a viscosity from 0.5 PaS to 20 PaS at 90° C. In some preferred embodiments, the printable resin has a viscosity from 20 PaS to 60 PaS at 90° C.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is m²/s. Devices for measuring viscosity include viscometers and rheometers. The viscosity of a composition described herein may be measured at 110° C. using a rheometer. For example, an MCR 301 rheometer from Anton Paar may be used for rheological measurement in rotation mode (PP-25, 50 s-1, 50-115° C., 3° C./min).

In some embodiments, the printable resins are capable of being 3D printed (i.e., can be used in additive manufacturing).

In some embodiments, the printable resin comprises a polymerization catalyst. In some embodiments, the polymerization catalyst comprises a tin catalyst, a platinum catalyst, a rhodium catalyst, a titanium catalyst, a silicon catalyst, a palladium catalyst, a metal triflate catalyst, a boron catalyst, a bismuth catalyst, or any combination thereof. Non-limiting examples of a titanium catalyst include di-n-butylbutoxychlorotin, di-n-butyldiacetoxytin, di-n-butyldilauryltin, dimethyldineodecanoatetin, dioctyldilauryltin, tetramethyltin, and dioctylbis(2-ethylhexylmaleate)tin. Non-limiting examples of a platinum catalyst include platinum-divinyltetramethyl-disiloxane complex, platinum-cyclovinylmethyl-siloxane complex, platinum-octanal complex, and platinum carbonyl cyclovinylmethylsiloxane complex. A non-limiting example of a rhodium catalyst includes tris(dibutylsulfide)rhodium trichloride. Non-limiting examples of a titanium catalyst includes titanium isopropoxide, titanium 2-ethyl-hexoxide, titanium chloride triisopropoxide, titanium ethoxide, and titanium diisopropoxide bis(ethylacetoacetate). Non-limiting examples of a silicon catalyst include tetramethylammonium siloxanolate and tetramethylsilylmethyl-trifluoromethanesulfonate. A non-limiting example of a palladium catalyst includes tetrakis(triphenylphosphine)palladium(0). Non-limiting examples of a metal triflate catalyst include scandium trifluoromethanesulfonate, lanthanum trifluoromethanesulfonate, and ytterbium trifluoromethanesulfonate. A non-limiting example of a boron catalyst includes tris(pentafluorophenyl)boron. Non-limiting examples of a bismuth catalyst include bismuth-zinc neodecanoate, bismuth 2-ethylhexanoate, a metal carboxylate of bismuth and zinc, and a metal carboxylate of bismuth and zirconium.

In some embodiments, the printable resin comprises a polymerization inhibitor in order to stabilize the composition and prevent premature polymerization. In some embodiments, the polymerization inhibitor is a photopolymerization inhibitor (e.g., oxygen). In some embodiments, the polymerization inhibitor is a phenolic compound (e.g., BHT). In some embodiments, the polymerization inhibitor is a stable radical (e.g., 2,2,4,4-tetramethylpiperidinyl-1-oxy radical, 2,2-diphenyl-1-picrylhydrazyl radical, galvinoxyl radical, or triphenylmethyl radical). In some embodiments, more than one polymerization inhibitor is present in the resin. In some embodiments, the polymerization inhibitor acts as a radical scavenger. In certain embodiments, the polymerization inhibitor is an antioxidant, a hindered amine light stabilizer (HAL), a hindered phenol, or a deactivated radical (e.g., a peroxy compound). In some embodiments, the polymerization inhibitor is selected from the group consisting of 4-tert-butylpyrocatechol, tert-butylhydroquinone, 1,4-benzoquinone, 6-tert-butyl-2,4-xylenol, 2-tert-butyl-1,4-benzoquinone, 2,6-di-tert-butyl-p-cresol, 2,6-di-tert-butylphenol, 1,1-diphenyl-2-picrylhydrazyl free radical, hydroquinone, 4-methoxyphenol, phenothiazine, any derivative thereof, and any combination thereof.

In some embodiments, the printable resin comprises a light blocker in order to dissipate UV radiation. In some embodiments, the light blocker absorbs a specific UV energy value and/or range. In some embodiments, the light blocker is a UV light absorber, a pigment, a color concentrate, or an IR light absorber. In some embodiments, the light blocker comprises a benzotriazole (e.g., 2-(2'-hydroxy-phenyl benzotriazole), a hydroxyphenyltriazine, an oxanilide, a benzophenone, or a combination thereof.

In some embodiments, the printable resin comprises a filler. In some embodiments, the filler comprises calcium carbonate (i.e., chalk), kaolin, metakolinite, a kaolinite derivative, magnesium hydroxide (i.e., talc), calcium silicate (i.e., wollastonite), a glass filler (e.g., glass beads, short glass fibers, or long glass fibers), a nanofiller (e.g., nanoplates, nanofibers, or nanoparticles), a silica filler (e.g., a mica, silica gel, fumed silica, or precipitated silica), carbon black, dolomite, barium sulfate, ATH Al(OH)$_3$, MDH Mg(OH)$_2$, diatomaceous earth, magnetite, halloysite, zinc oxide, titanium dioxide, cellulose, lignin, a carbon filler (e.g., chopped carbon fiber or carbon fiber), a derivative thereof, or a combination thereof.

In some embodiments, the printable resin comprises a pigment, a dye, or a combination thereof. A pigment is typically a suspended solid that may be insoluble in the resin. A dye is typically dissolved in the printable resin. In some embodiments, the pigment comprises an inorganic pigment. In some embodiments, the inorganic pigment comprises an iron oxide, barium sulfide, zinc oxide, antimony trioxide, a yellow iron oxide, a red iron oxide, ferric ammonium ferrocyanide, chrome yellow, carbon black, or aluminum flake. In some embodiments, the pigment comprises an organic pigment. In some embodiments, the organic pigment comprises an azo pigment, an anthraquinone pigment, a copper phthalocyanine (CPC) pigment (e.g., phthalo blue or phthalo green) or a combination thereof. In some embodiments, the dye comprises an azo dye (e.g., a diarylide or Sudan stain), an anthraquinone (e.g., Oil Blue A or Disperse Red 11), or a combination thereof.

In some embodiments, the printable resin comprises a surface energy modifier. In some embodiments, the surface energy modifier can aid the process of releasing a polymer from a mold. In some embodiments, the surface energy modifier can act as an antifoaming agent. In some embodiments, the surface energy modifier comprises a defoaming agent, a deairation agent, a hydrophobization agent, a leveling agent, a wetting agent, or an agent to adjust the flow properties of the printable resin. In some embodiments, the surface energy modifier comprises an aloxylated surfactant, a silicone surfactant, a sulfosuccinate, a fluorinated polyacrylate, a fluoropolymer, a silicone, a star-shaped polymer, an organomodified silicone, or any combination thereof.

In some embodiments, the printable resin comprises a plasticizer. A plasticizer can be a nonvolatile material that can reduce interactions between polymer chains, which can decrease glass transition temperature, melt viscosity, and elastic modulus. In some embodiments, the plasticizer comprises a dicarboxylic ester plasticizer, a tricarboxylic ester plasticizer, a trimellitate, an adipate, a sebacate, a maleate, or a bio-based plasticizer. In some embodiments, the plasticizer comprises a dicarboxylic ester or a tricarboxylic ester comprising a dibasic ester, a phthalate, bis(2-ethylhexyl) phthalate (DEHP), bis(2-propylheptyl) phthalate (DPHP), diisononyl phthalate (DINP), di-n-butyl phthalate (DBP), butyl benzyl phthalate (BBzP), diisodecyl phthalate (DIDP), dioctyl phthalate (DOP), diisooctyl phthalate (DIOP), diethyl phthalate (DEP), diisobutyl phthalate (DIBP), di-n-hexyl phthalate, a derivative thereof, or a combination thereof. In some embodiments, the plasticizer comprises a trimellitate comprising trimethyl trimellitate (TMTM), tri-(2-ethylhexyl) trimellitate (TEHTM), tri-(n-octyl,n-decyl) trimellitate (ATM), tri-(heptyl,nonyl) trimellitate (LTM), n-octyl trimellitate (OTM), trioctyl trimellitate, a derivative thereof, or a combination thereof. In some embodiments, the plasticizer comprises an adipate comprising bis(2-ethylhexyl)adipate (DEHA), dimethyl adipate (DMAD), monomethyl adipate (MMAD), dioctyl adipate (DOA), Bis[2-(2-butoxyethoxy)ethyl] adipate, dibutyl adipate, diisobutyl adipate, diisodecyl adipate, a derivative thereof, or a combination thereof. In some embodiments, the plasticizer comprises a sebacate comprising dibutyl sebacate (DBS), Bis(2-ethylhexyl) sebacate, diethyl sebacate, dimethyl sebacate, a derivative thereof, or a combination thereof. In some embodiments, the plasticizer comprises a maleate comprising Bis(2-ethylhexyl) maleate, dibutyl maleate, diisobutyl maleate, a derivative thereof, or a combination thereof. In some embodiments, the plasticizer comprises a bio-based plasticizer comprising an acetylated monoglyceride, an alkyl citrate, a methyl ricinoleate, or a green plasticizer. In some embodiments, the alkyl citrate is selected from the group consisting of triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, a derivative thereof, or a combination thereof. In some embodiments, the green plasticizer is selected from the group consisting of epoxidized soybean oil, epoxidized vegetable oil, epoxidized esters of soybean oil, a derivative thereof, or a combination thereof. In some embodiments, the plasticizer comprises an azelate, a benzoate (e.g., sucrose benzoate), a terephthalate (e.g., dioctyl terephthalate), 1,2-cyclohexane dicarboxylic acid diisononyl ester, alkyl sulphonic acid phenyl ester, a sulfonamide (e.g., N-ethyl toluene sulfonamide, N-(2-hydroxypropyl) benzene sulfonamide, N-(n-butyl) benzene sulfonamaide), an organophosphate (e.g., tricresyl phosphate or tributyl phosphate), a glycol (e.g., triethylene glycol dihexanoate or tetraethylene glycol diheptanoate), a polyether, a polymeric plasticizer, polybutene, a derivative thereof, or a combination thereof.

In some embodiments, the printable resin comprises a solvent. In some embodiments, the solvent comprises a nonpolar solvent. In certain embodiments, the nonpolar solvent comprises pentane, cyclopentane, hexane, cyclohexane, benzene, toluene, 1,4-dioxane, chloroform, diethyl ether, dichloromethane, a derivative thereof, or a combination thereof. In some embodiments, the solvent comprises a polar aprotic solvent. In certain embodiments, the polar aprotic solvent comprises tetrahydrofuran, ethyl acetate, acetone, dimethylformamide, acetonitrile, DMSO, propylene carbonate, a derivative thereof, or a combination thereof. In some embodiments, the solvent comprises a polar protic solvent. In certain embodiments, the polar protic solvent comprises formic acid, n-butanol, isopropyl alcohol, n-propanol, t-butanol, ethanol, methanol, acetic acid, water, a derivative thereof, or a combination thereof.

In some embodiments, the printable resin comprises a biologically significant chemical. In some embodiments, the biologically significant chemical comprises a hormone, an enzyme, an active pharmaceutical ingredient, an antibody, a protein, a drug, or any combination thereof. In some embodiments, the biologically significant chemical comprises a pharmaceutical composition, a chemical, a gene, a polypeptide, an enzyme, a biomarker, a dye, a compliance indicator, an antibiotic, an analgesic, a medical grade drug, a chemical agent, a bioactive agent, an antibacterial, an antibiotic, an anti-inflammatory agent, an immune-suppressive agent, an immune-stimulatory agent, a dentinal desensitizer, an odor masking agent, an immune reagent, an anesthetic, a nutritional agent, an antioxidant, a lipopolysaccharide complexing agent or a peroxide.

In some embodiments, the added component (i.e., a thermal initiator, a polymerization catalyst, a polymerization inhibitor, a light blocker, a plasticizer, a solvent, a surface energy modifier, a pigment, a dye, a filler, or a biologically significant chemical) is functionalized so that it can be incorporated into the polymer network so that it cannot readily be extracted from the final cured material. In certain embodiments, the thermal initiator, polymerization catalyst, polymerization inhibitor, light blocker, plasticizer, surface energy modifier, pigment, dye, and/or filler are functionalized to facilitate their incorporation into the cured polymeric material. A polymer network, as used herein, can refer to a polymer composition comprising a plurality of polymer chains wherein a large portion (e.g., >80%) and optionally all the polymer chains are interconnected, for example via weak bond covalent crosslinking, to form a single polymer composition. In an embodiment, there is provided a radiopaque polymer in the form of a crosslinked network in which at least some of the crosslinks of the network structure are formed by covalent bonds.

In some embodiments, the polymeric materials formed from the resin have low levels of extractable materials (e.g., unreacted monomers from said photo-curable resin). The amount of extractable materials can be determined by weight loss of the polymeric material after soaking in water for 1 week, after soaking in ethanol for 48 hours, or after soaking in hexane for 48 hours. A general experiment for determining the amount of extractable material includes the steps of (i) weighing a dried sample of the polymeric material; (ii) soaking the sample in a solvent at a given temperature (e.g., 25° C.) for a period of time; (iii) refreshing the solvent until extraction is completed; (iv) drying the sample in an oven; (v) weighing the extracted sample; and (vi) calculating the weight loss. In some embodiments, the polymeric materials formed from the resin have less than 5 wt %, less than 4 wt %, less than 3 wt %, less than 2 wt %, less than 1 wt %, less than 0.75 wt %, less than 0.5 wt %, or less than 0.25 wt % extractable materials In some embodiments, a plurality of weak covalent bonds are used such that they cover a range of different bond disassociation energies. As a non-limiting example, in a single material of the present invention, some of the weak covalent bonds have a bond disassociation energy of 280 kJ/mol, some have a bond disassociation energy of 250 kJ/mol, some have a bond disassociation energy of 200 kJ/mol, and some have a bond disassociation energy of 80 kJ/mol. A material having a plurality of different weak covalent bond disassociation energies provides a material that has multiple different yield strengths within the material depending on the concentration of the different weak covalent bonds.

The printable resins disclosed herein can be formed from polymeric materials comprising weak crosslinks, strong crosslinks, polymer chains or ring monomers that can be used alone or in combination. In some embodiments, the printable resin compositions comprising weak crosslinks, strong crosslinks, polymer chains or ring monomers, alone or in combination, further comprise the printable resin properties as disclosed herein.

E. Methods of Making Polymeric Materials

In some embodiments, the present disclosure provides a method of producing polymeric materials described herein generated from printable resins as described further herein. In some embodiments, the method comprises the steps of:

providing a printable resin, as disclosed further herein; and curing the printable resin, the curing comprising exposure to light, thereby forming a cured polymeric material.

In some embodiments, the method further comprises the step of fabricating a device using an additive manufacturing device, wherein said additive manufacturing device facilitates the curing. In some embodiments, the curing of the printable resin produces the polymeric material. In certain embodiments, the printable resin is cured using an additive manufacturing device to produce the polymeric material. In some embodiments, the method further comprises the step of cleaning the polymeric material. In certain embodiments, the cleaning of the polymeric material includes washing and/or rinsing the polymeric material with a solvent, which can remove monomers and undesired impurities from the polymeric material.

In some embodiments, the printable resin are curable and have melting points <120° C. in order to be liquid and, thus, processable at the temperatures usually employed in currently available additive manufacturing techniques. Said printable resins comprise at least one photopolymerization initiator (i.e., a photoinitiator) and may be heated to a predefined elevated process temperature ranging from 50° C. to 120° C., such as from 90° C. to 120° C., before becoming irradiated with light of a suitable wavelength to be absorbed by said photoinitiator, thereby causing activation of the photoinitiator to induce polymerization of the printable resins to obtain a weak covalent bond crosslinked polymeric material.

In some embodiments, the methods disclosed herein are part of a high temperature lithography-based photopolymerization process, wherein a curable composition (i.e., the printable resin) comprises at least one photopolymerization initiator and is heated, which makes high temperature lithography-based photopolymerization process more preferably is an additive manufacturing process, most preferably a 3D printing process. The method according to the present disclosure offers the possibility of quickly and facilely producing devices, such as orthodontic appliances, by additive manufacturing such as 3D printing using printable resins as disclosed herein.

Photopolymerization occurs when suitable formulations (e.g., the printable resins disclosed herein) are exposed to radiation (e.g., UV or visible light) of sufficient power and of a wavelength capable of initiating polymerization. The wavelengths and/or power of radiation useful to initiate polymerization may depend on the photoinitiator used. "Light" as used herein includes any wavelength and power capable of initiating polymerization. Some wavelengths of light include ultraviolet (UV), visible, or infrared. UV light sources include UVA (wavelength about 400 nanometers (nm) to about 320 nm), UVB (about 320 nm to about 290 nm) or UVC (about 290 nm to about 100 nm). Any suitable source may be used, including laser sources. The source may be broadband or narrowband, or a combination thereof. The light source may provide continuous light, pulsed light, or both continuous and pulsed light during the process. Both the length of time the system is exposed to light and the intensity of the light can be varied to determine the ideal reaction conditions.

In some embodiments, the methods disclosed herein use additive manufacturing to produce a device comprising the polymeric material. In certain embodiments, the methods disclosed herein use additive manufacturing to produce a device consisting essentially of the polymeric material. Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate the appliances herein. In many embodiments, 3D printing involves jetting or extruding one or more materials (e.g., the resins disclosed herein) onto a build surface in order to form successive layers of the object geometry. In some embodiments, the resins described herein can be used in inkjet or coating applications. polymeric material may also be fabricated by "vat" processes in which light is used to selectively cure a vat or reservoir of the curable resin (e.g., the resins disclosed herein). Each layer of curable resin may be selectively exposed to light in a single exposure or by scanning a beam of light across the layer. Specific techniques include sterolithography (SLA), Digital Light Processing (DLP), holographic projection, and two photon-induced photopolymerization (TPIP).

In some embodiments, the methods disclosed herein use continuous direct fabrication to produce a device comprising the polymeric material. In certain embodiments, the methods disclosed herein use continuous direct fabrication to produce a device consisting essentially of the polymeric material. A non-limiting exemplary direct fabrication process can achieve continuous build-up of an object geometry by continuous movement of a build platform (e.g., along the vertical or Z-direction) during an irradiation phase, such that the hardening depth of the irradiated photopolymer (e.g., the irradiated resin, hardening during the formation of the polymeric material) is controlled by the movement speed. Accordingly, continuous polymerization of material (e.g., polymerization of the resin into the polymeric material) on the build surface can be achieved. Such methods are described in U.S. Pat. Nos. 7,892,474 and 10,162,264, the disclosures of which are incorporated herein by reference in their entireties. In yet another example, a continuous direct fabrication method utilizes a "heliolithography" approach in which the liquid resin (e.g., the printable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352) hereby incorporated by reference in its entirety for description of the process. Another example of continuous direct fabrication method can involve extruding a material composed of a polymeric material surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein use high temperature lithography to produce a device comprising the polymeric material. In certain embodiments, the methods disclosed herein use high temperature lithography to produce a device consisting essentially of the polymeric material. "High temperature lithography," as used herein, may refer to any lithography-based photopolymerization processes that involve heating photopolymerizable material(s) (e.g., curable resins disclosed herein). The heating may lower the viscosity of the photopolymerizable material(s) before and/or during curing. Non-limiting examples of high-temperature lithography processes include those processes described in WO 2015/075094, WO 2016/078838 and WO 2018/032022. In some implementations, high-temperature lithography may involve applying heat to material to temperatures between 50° C.-120° C., such as 90° C.-120° C., 100° C.-120° C., 105° C.-115° C., 108° C.-110° C., etc. The material may be heated to temperatures greater than 120° C. It is noted that other ranges may be used without departing from the scope and substance of the inventive concepts described herein.

In another embodiment, the methods disclosed herein comprise a continuous direct fabrication step. The continuous direct fabrication step can involve extruding a material composed of a curable liquid material (e.g., the printable resin) surrounding a solid strand. The liquid material can be extruded along a continuous three-dimensional path in order to form an object or device. Such methods are described in U.S. Patent Publication No. 2014/0061974, the disclosure of which is incorporated herein by reference in its entirety.

In some preferred embodiments, the methods disclosed herein further comprises fabricating an object with the polymeric material. In certain embodiments, fabricating the object comprises additive manufacturing. In some embodiments, fabricating the object with the polymeric material comprises printing with a 3D printer. In some embodiments, fabricating the object with the polymeric material comprises digital light projection. In certain embodiments, fabricating the object with the polymeric material comprises using hot lithography.

In some embodiments, the object is an orthodontic appliance. In some embodiments, the orthodontic appliance is an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration. In some embodiments, the orthodontic appliance is one of a plurality of orthodontic appliances configured to reposition the teeth from an initial configuration toward a target configuration according to a treatment plan.

F. Devices Using Polymeric Materials

In some embodiments, the present disclosure provides devices comprising the polymeric materials generated from the printable resins as described further herein. In some embodiments, the polymeric material is used to create a device intended to be placed in the intraoral cavity of a human. Such devices can be, for example, aligners that help to move teeth to new positions. In some embodiments, the devices can be retainers that help to keep teeth from moving to a new position. In some embodiments, the device can be used to expand the palate, move the location of the jaw, or prevent snoring of a human.

In some embodiments, the present disclosure provides methods for producing the devices described herein, said devices comprising a polymeric material. In some embodiments, the method comprises a step of shaping a printable resin into a desirable shape prior to a step of curing the printable resin, thereby generating the polymeric material having said desirable shape. In some embodiments, the method comprises a step of shaping a printable resin into a desirable shape during a step of curing the printable resin, thereby generating the polymeric material having said desirable shape. In some embodiments, the method comprises a step of curing the printable resin, thereby forming the polymeric material, then shaping the polymeric material into a desirable shape. In some embodiments, the desirable shape is an orthodontic appliance. In some embodiments, the desirable shape is a device and/or object as disclosed herein. In some embodiments, the shaping step comprises extrusion, production of a sheet, production of a film, melt spinning, coating, injection molding, compression and transfer molding, blow molding, rotational blow molding, thermoforming, casting, or a combination thereof.

Exemplary embodiments of devices that can be cured using the materials disclosed herein include dental appliances for use in humans. In some embodiments, such devices can be used as treatment systems for providing an orthodontic treatment.

In certain aspects, the present disclosure provides a method of making an orthodontic appliance comprising a polymeric material as described herein, the method comprising providing a printable resin as further described herein; and fabricating the polymeric material by a direct or additive fabrication process. The printable resin may be exposed to light in said direct or additive fabrication process. The process may further comprise an additional curing step following fabrication of the polymeric material.

In certain aspects, the present disclosure provides an orthodontic appliance comprising a polymeric material as further described herein. The orthodontic appliance may be an aligner, expander or spacer. In some embodiments, the orthodontic appliance comprises a plurality of tooth receiving cavities configured to reposition teeth from a first configuration toward a second configuration. In some embodiments, the orthodontic appliance is one of a plurality of orthodontic appliances configured to reposition the teeth from an initial configuration toward a target configuration, optionally according to a treatment plan. As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

The curable resins and cured polymeric materials according to the present disclosure exhibit favorable thermomechanical properties for use as orthodontic appliances, for example, for moving one or more teeth.

The embodiments disclosed herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. In some cases, the reinforced composites can comprise a polymer matrix reinforced with ceramic or metallic particles, for example. The appliance can be shaped in many ways, such as with thermoforming or direct fabrication as described herein, for example. Alternatively or in combination, the appliance can be fabricated with machining such as an appliance fabricated from a block of material with computer numeric control machining. Preferably, the appliance is fabricated using a curable resin according to the present disclosure.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw, and comprises the cured polymeric material disclosed herein. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
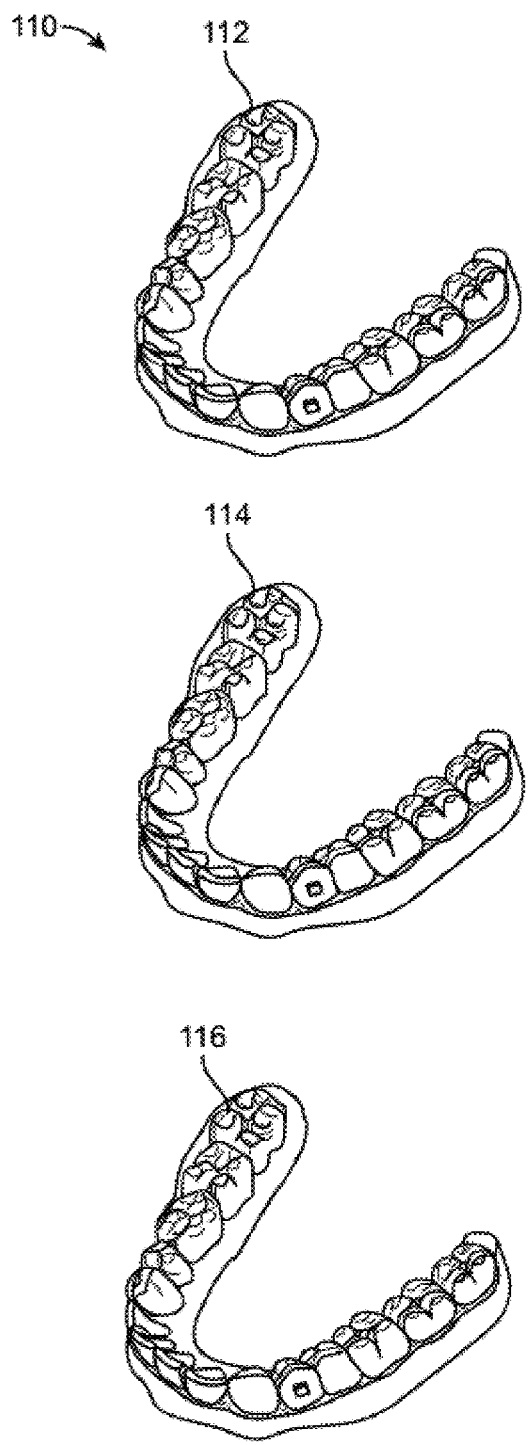
FIG. 1B illustrates a tooth repositioning system, in accordance with embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
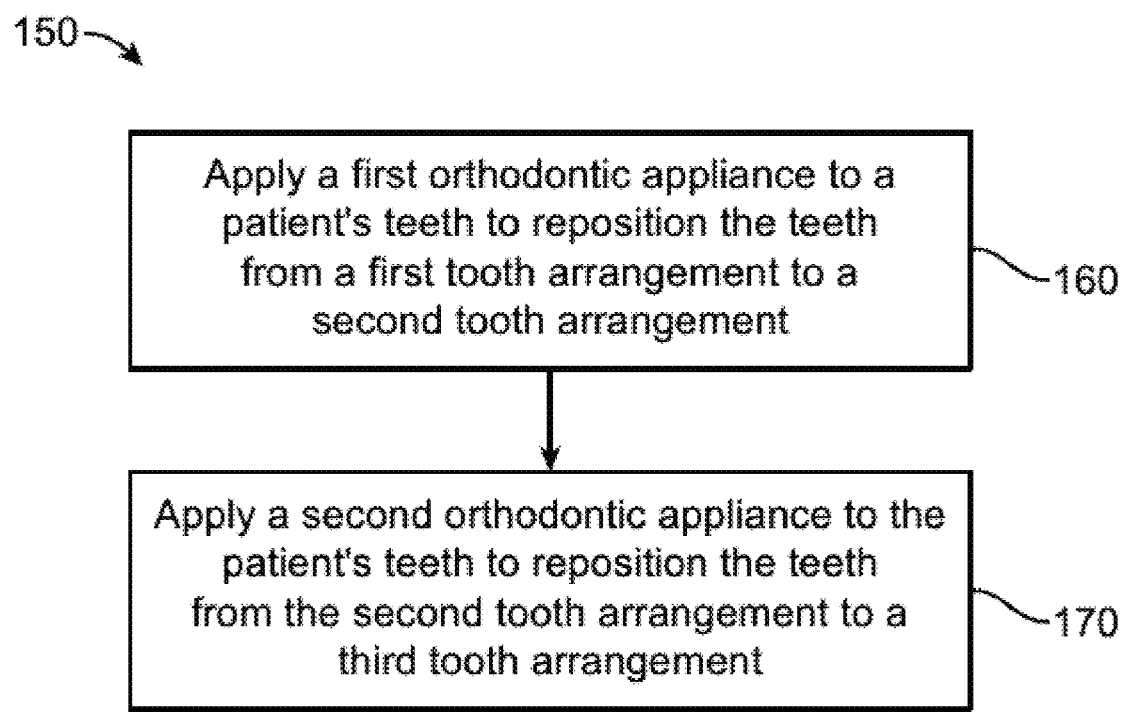
FIG. 1C illustrates a method of orthodontic treatment using a plurality of appliances, in accordance with embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. In some embodiments, the direct fabrication techniques described herein can be used to produce appliances with substantially anisotropic material properties (e.g., having substantially different strengths along all directions). In some embodiments, the direct fabrication techniques described herein can produce an orthodontic appliance having a strength that varies by more than 10%, more than 15%, more than 20%, or more than 25% along all directions, but in a controlled manner. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
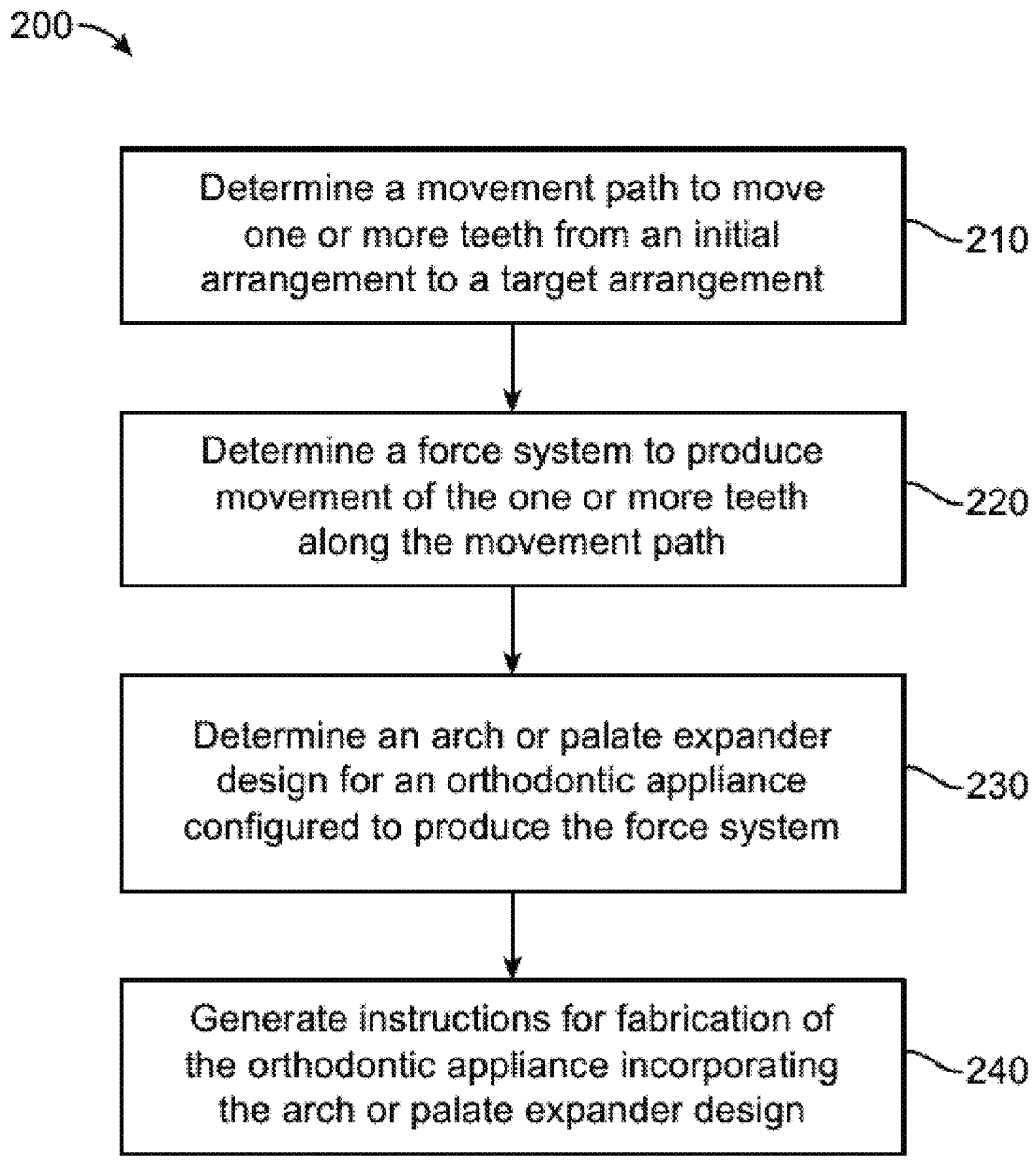
FIG. 2 illustrates a method for designing an orthodontic appliance, in accordance with embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients will typically require lower forces to expand the suture than older patients, as the suture has not yet fully formed.

In step 230, an arch or palate expander design for an orthodontic appliance configured to produce the force system is determined. Determination of the arch or palate expander design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA Optionally, one or more arch or palate expander designs can be selected for testing or force modeling. As noted above, a desired tooth movement, as well as a force system required or desired for eliciting the desired tooth movement, can be identified. Using the simulation environment, a candidate arch or palate expander design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the arch or palate expander design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) The upper arch and palate of the patient is scanned intraorally to generate three-dimensional data of the palate and upper arch; 2) The three-dimensional shape profile of the appliance is determined to provide a gap and teeth engagement structures as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
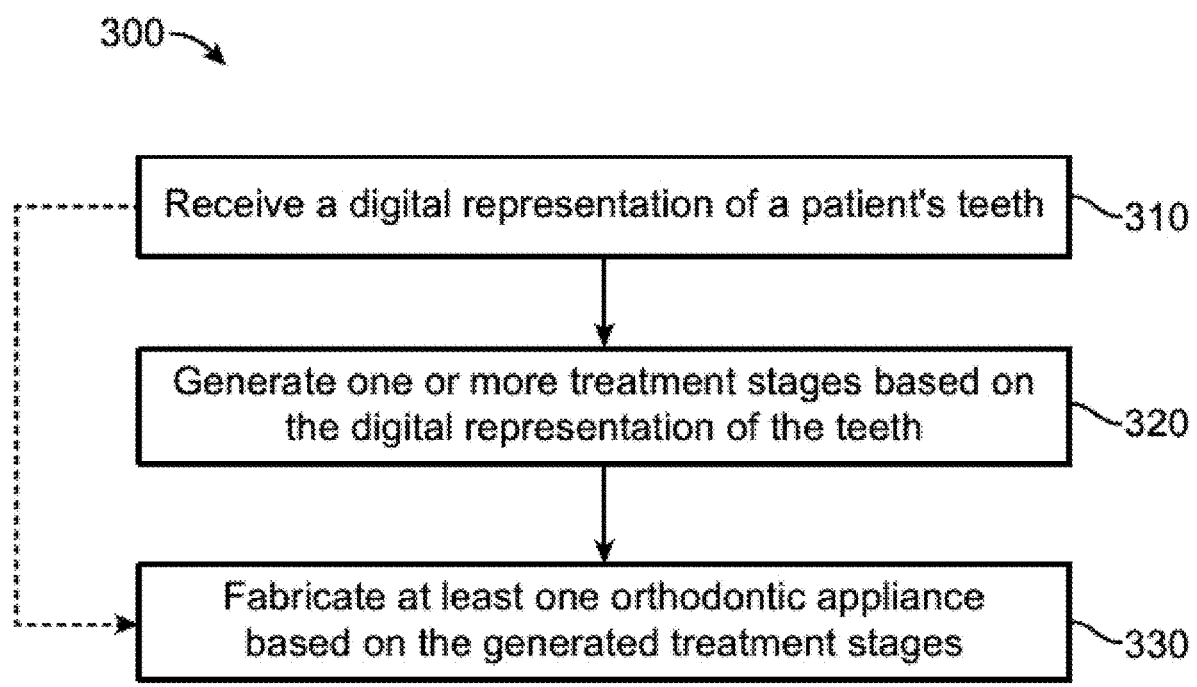
FIG. 3 illustrates a method for digitally planning an orthodontic treatment, in accordance with embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

G. On-Track Treatment

In some embodiments, this disclosure provides a method for repositioning a patient's teeth, the method comprising applying an orthodontic appliance disclosed herein to at least one of a patient's teeth, and moving at least one of the patient's teeth toward an intermediate arrangement or a final tooth arrangement.

In some embodiments, this disclosure provides a method of repositioning a patient's teeth, the method comprising:
generating a treatment plan for a patient, the plan comprising a plurality of intermediate tooth arrangements for moving teeth along a treatment path from an initial arrangement toward a final arrangement;
producing a 3D printed orthodontic appliance comprising a plurality of weak crosslinking units comprising a weak crosslinking bond; and
moving on-track, with the orthodontic appliance, at least one of the patient's teeth toward an intermediate arrangement or a final tooth arrangement. In preferred embodiments, the weak crosslinking bond has a bond dissociation energy from 50 kJ/mol to 325 kJ/mol. In some embodiments, the weak crosslinking unit is a weak crosslinking bond.

Figure 4:
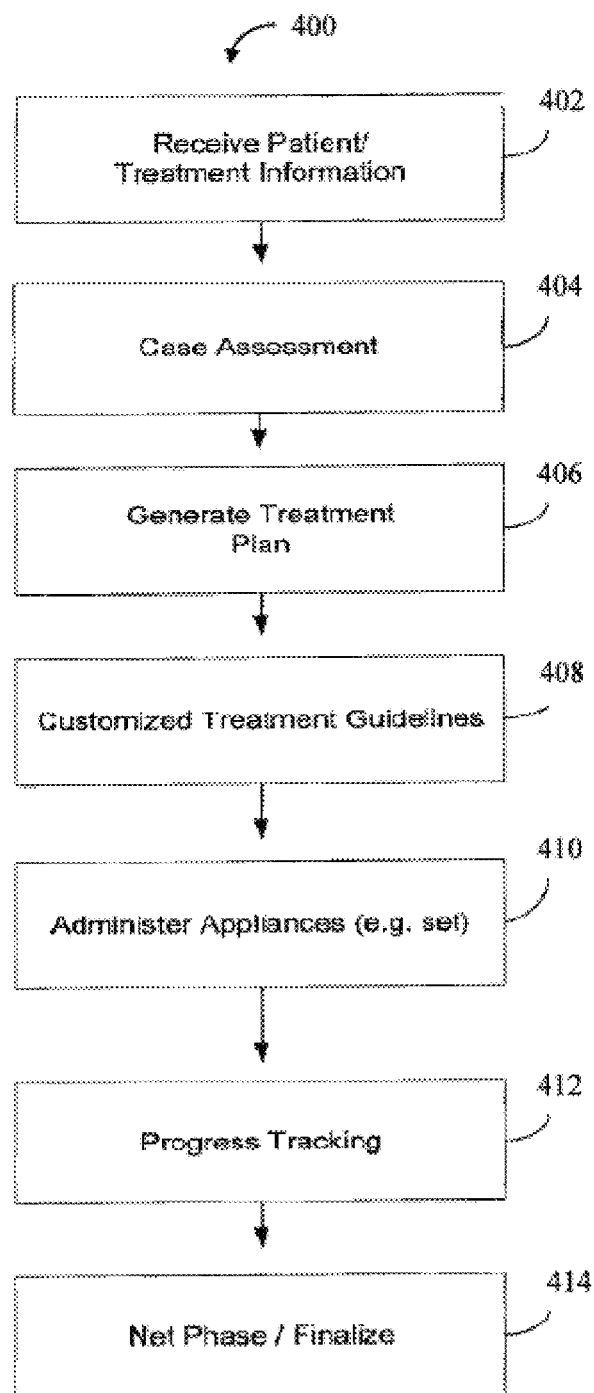
FIG. 4 shows generating and administering treatment according to an embodiment of the present invention.

Referring to FIG. 4, a process 400 according to the present invention is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information will include obtaining data comprising an initial arrangement of the patient's teeth, which typically includes obtaining an impression or scan of the patient's teeth prior to the onset of treatment and can further include identification of one or more treatment goals selected by the practitioner and/or patient. A case assessment can be generated (404) so as to assess the complexity or difficulty of moving the particular patient's teeth in general or specifically corresponding to identified treatment goals, and may further include practitioner experience and/or comfort level in administering the desired orthodontic treatment. In some cases, however, the assessment can include simply identifying particular treatment options (e.g., appointment planning, progress tracking, etc.) that are of interest to the patient and/or practitioner. The information and/or corresponding treatment plan will include identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan typically includes multiple phases of treatment, with a customized set of treatment guidelines generated that correspond to a phase of the treatment plan. The guidelines will include detailed information on timing and/or content (e.g., specific tasks) to be completed during a given phase of treatment, and will be of sufficient detail to guide a practitioner, including a less experienced practitioner or practitioner relatively new to the particular orthodontic treatment process, through the phase of treatment. Since the guidelines are designed to specifically correspond to the treatment plan and provide guidelines on activities specifically identified in the treatment information and/or generated treatment plan, the guidelines are said to be customized. The customized treatment guidelines are then provided to the practitioner so as to help instruct the practitioner as how to deliver a given phase of treatment. As set forth above, appliances can be generated based on the planned arrangements and will be provided to the practitioner and ultimately administered to the patient (410). The appliances are typically provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in Table 1. If a patient's teeth have progressed at or within the threshold values, the progress is considered to be on-track. If a patient's teeth have progressed beyond the threshold values, the progress is considered to be off-track.

TABLE 1

| Type Movement | Difference Actual/Planned |
|---|---|
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |
| Extrusion | |
| Anterior | 0.75 mm |
| Posterior | 0.75 mm |
| Intrusion | |
| Anterior | 0.75 mm |

TABLE 1-continued

| Type Movement | Difference Actual/Planned |
|---|---|
| Posterior Angulation | 0.75 mm |
| Anterior Inclination | 5.5 degrees |
| Posterior Inclination | 3.7 degrees |
| Anterior Translation | 5.5 degrees |
| Posterior Translation | 3.7 degrees |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

The patient's teeth are determined to be on track by comparison of the teeth in their current positions with teeth in their expected or planned positions, and by confirming the teeth are within the parameter variance disclosed in Table 1. If the patient's teeth are determined to be on track, then treatment can progress according to the existing or original treatment plan. For example, a patient determined to be progressing on track can be administered one or more subsequent appliances according to the treatment plan, such as the next set of appliances. Treatment can progress to the final stages and/or can reach a point in the treatment plan where bite matching is repeated for a determination of whether a patient's teeth are progressing as planned or if the teeth are off track.

In some embodiments, as further disclosed herein, this disclosure provides methods of treating a patient using a 3D printed orthodontic appliance. In certain embodiments, the method of repositioning a patient's teeth (or, in some embodiments, a singular tooth) comprises: generating a treatment plan for the patient, the plan comprising tooth arrangements for moving teeth along a treatment path from an initial arrangement toward a final arrangement; producing a 3D printed orthodontic appliance; and moving on-track, with the orthodontic appliance, at least one of the patient's teeth toward an intermediate arrangement or a final tooth arrangement. In some embodiments, producing the 3D printed orthodontic appliance uses the printable resins disclosed further herein. On-track performance can be determined, e.g., from Table 1, above.

In some embodiments, the method further comprises tracking the progression of the patient's teeth along the treatment path after administration of the orthodontic appliance. In certain embodiments, the tracking comprises comparing a current arrangement of the patient's teeth to a planned arrangement of the teeth. As a non-limiting example, following the initial administration of the orthodontic appliance, a period of time passes (e.g., two weeks), a comparison of the now-current arrangement of the patient's teeth (i.e., at two weeks of treatment) can be compared with the teeth arrangement of the treatment plan. In some embodiments, the progression can also be tracked by comparing the current arrangement of the patient's teeth with the initial configuration of the patient's teeth. The period of time can be, for example, greater than 3 days, greater than 4 days, greater than 5 days, greater than 6 days, greater than 7 days, greater than 8 days, greater than 9 days, greater than 10 days, greater than 11 days, greater than 12 days, greater than 13 days, greater than 2 weeks, greater than 3 weeks, greater than 4 weeks, or greater than 2 months. In some embodiments, the period of time can be from at least 3 days to at most 4 weeks, from at least 3 days to at most 3 weeks, from at least 3 days to at most 2 weeks, from at least 4 days to at most 4 weeks, from at least 4 days to at most 3 weeks, or from at least 4 days to at most 2 weeks. In certain embodiments, the period of time can restart following the administration of a new orthodontic appliance.

In some embodiments, greater than 50%, greater than 55%, greater than 60%, greater than 65%, greater than 70%, greater than 75%, greater than 80%, greater than 85%, greater than 90%, greater than 91%, greater than 92%, greater than 93%, greater than 94%, greater than 95%, greater than 96%, greater than 97%, greater than 98%, or greater than 99% of the patient's teeth are on track with the treatment plan after a period of time of using an orthodontic appliance as disclosed further herein. In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

H. Properties after Use

In some embodiments of the method disclosed above, the 3D printed orthodontic appliance has a retained repositioning force (i.e., the repositioning force after the orthodontic appliance has been applied to or worn by the patient over a period of time), and the retained repositioning force to at least one of the patient's teeth after the period of time is at least 10%, at least 20%, at least 30%, at least 40%, at least 50%, at least 55%, at least 60%, at least 65%, at least 70%, at least 75%, at least 80%, at least 85%, at least 90%, at least 95%, at least 96%, at least 97%, at least 98%, or at least 99% of the repositioning force initially provided to the at least one of the patient's teeth (i.e., with initial application of the orthodontic appliance). In some embodiments, the period of time is 3 days, 4 days, 5 days, 6 days, 7 days, 8 days, 9 days, 10 days, 11 days, 12 days, 13 days, 2 weeks, 3 weeks, 4 weeks, or greater than 4 weeks.

In preferred embodiments, the orthodontic appliances disclosed herein can provide on-track movement of at least one of the patient's teeth. On-track movement has been described further herein, e.g., at Table 1. In some embodiments, the orthodontic appliances disclosed herein can be used to achieve on-track movement of at least one of the patient's teeth to an intermediate tooth arrangement. In some embodiments, the orthodontic appliances disclosed herein can be used to achieve on-track movement of at least one of the patient's teeth to a final tooth arrangement.

In some embodiments, prior to moving on-track, with the orthodontic appliance, at least one of the patient's teeth toward the intermediate arrangement or the final tooth arrangement, the orthodontic appliance comprises a first flexural stress; and after achieving on-track the movement of the at least one of the patient's teeth to the intermediate arrangement or the final tooth arrangement, the orthodontic appliance comprises a second flexural stress. In some embodiments, the second flexural stress is from 80 MPa to 0.5 MPa, from 70 MPa to 0.5 MPa, from 60 MPa to 1 MPa, from 50 MPa to 1 MPa, from 40 MPa to 1 MPa, from 30 MPa to 2 MPa, from 25 MPa to 2 MPa, from 20 MPa to 2 MPa, from 15 MPa to 2 MPa, or from 15 MPa to 0.01 MPa. In some embodiments, the time period between an initial placement of the orthodontic appliance to the patient's teeth and achieving on-track the movement is 3 days, 4 days, 5 days, 6 days, 7 days, 8 days, 9 days, 10 days, 11 days, 12 days, 13 days, two weeks, or less than two weeks.

In some embodiments, prior to moving, with the orthodontic appliance, at least one of the patient's teeth toward an intermediate arrangement or a final tooth arrangement, the orthodontic appliance has characteristics which are retained following the use of the orthodontic appliance.

As provided herein, the methods disclosed can use the orthodontic appliances further disclosed herein. Said orthodontic appliances can be directly fabricated using, e.g., the resins disclosed herein. In certain embodiments, the direct fabrication comprises cross-linking the resin.

The appliances formed from the resins disclosed herein provide improved durability, strength, and flexibility, which in turn improve the rate of on-track progression in treatment plans. In some embodiments, greater than 60%, greater than 70%, greater than 80%, greater than 90%, or greater than 95% of patients treated with the orthodontic appliances disclosed herein (e.g., an aligner) are classified as on-track in a given treatment stage. In certain embodiments, greater than 60%, greater than 70%, greater than 80%, greater than 90%, or greater than 95% of patients treated with the orthodontic appliances disclosed herein (e.g., an aligner) have greater than 50%, greater than 55%, greater than 60%, greater than 65%, greater than 70%, greater than 75%, greater than 80%, greater than 85%, greater than 90%, or greater than 95% of their tooth movements classified as on-track.

EXAMPLES

The specific compositions, synthesis, formulations, and descriptions of any of the materials, devices, systems, and components thereof, of the present disclosure can be readily varied depending upon the intended application, as will be apparent to those of skill in the art in view of the disclosure herein. Moreover, it is understood that the examples and aspects described herein are for illustrative purposes only and that various modifications or changes in light thereof can be suggested to persons skilled in the art and are included within the spirit and purview of this application and scope of the appended claims. Numerous different combinations of aspects described herein are possible, and such combinations are considered part of the present disclosure. In addition, all features discussed in connection with any one aspect herein can be readily adapted for use in other aspects herein. The use of different terms or reference numerals for similar features in different aspects does not necessarily imply differences other than those expressly set forth. Accordingly, the present disclosure is intended to be described solely by reference to the appended claims, and not limited to the aspects disclosed herein.

Example 1

Evaluation of Weak Crosslinking Units and Ring Monomers

This example compares polymeric materials formed comprising weak crosslinking units, and also provides for comparison a polymeric material that does not comprise weak crosslinking units. Also described are material characteristics of the polymeric materials.

A base formulation was created by combining 83.0 wt % t-butyl acrylate, 16.6 wt % isodecyl acrylate, and 0.4 wt % TPO-L (the photoinitiator). The base formulation was mixed well until homogenous. Resins 1-4 (as provided in Table 2, below) were formed by combining 90.5 wt % of the base mixture with 9.5 wt % of the crosslinking unit and stirring until a homogenous composition was formed.

TABLE 2

| Resin | Crosslinking Unit |
|---|---|
| Base Formulation | — |
| 1 | Formula I-a |
| 2 | Formula II-a |
| 3 | 1,6-hexanediol dimethacrylate |
| 4 | Formula I-b |

The prepared resins were weighed into silicone molds having the desired geometry. Each mold was allowed to sit on a flat surface until the resin was evenly distributed in the mold. Each mold was then placed in a Dymax Flood Lamp (Model 2000) and cured for 90 seconds at room temperature. Resins 1-4 were cured to form polymeric materials 1-4, respectively. For comparison, the base formulation was cured without addition of a crosslinking unit to form base polymeric material. Samples were characterized by storage modulus, elongation at break, and glass transition temperatures were measured (see: Table 3, below).

TABLE 3

| Polymeric Material | Storage Modulus (MPa) | Elongation at Break (%) | Glass transition temperature (° C.) |
|---|---|---|---|
| Base Polymeric Material | 235 | 450 | 39 |
| 1 | 264 | 110 | 41 |
| 2 | 322 | 95 | 44 |
| 3 | 390 | 62 | 45 |
| 4 | 73 | 168 | 45 |

The base polymeric material (having no added crosslinking units) had the highest elongation at break (450%) and the lowest storage modulus (235 MPa). Thus the base polymeric material is relatively soft and flexible. In contrast, polymeric material 3—comprising 1,6-hexanediol dimethacrylate as the crosslinking unit, which does not have a weak covalent bond—had the lowest elongation at break (62%) and the highest storage modulus (390 MPa). Thus the control polymeric material 3 is relatively tough, but also relatively brittle. This is due to the material lacking a weak covalent crosslinking bond.

Polymeric material 2 comprises an alkyl disulfide weak covalent unit, and showed increased storage modulus in comparison to the base polymeric material (322 MPa) as well as increased elongation at break in comparison to control polymeric material 3 (95%). Polymeric material 2 is a relatively tough material having some flexibility.

Polymeric material 1 comprises an aromatic disulfide weak covalent unit, which is a weaker covalent bond in comparison to the alkyl disulfide of polymeric material 2. Polymeric material 2 had favorable properties, including storage modulus of 264 MPa and elongation at break of 110%. Thus polymeric material 1 (comprising the weakest crosslinking covalent bond) has relatively high elongation (i.e., is not brittle) and is relatively tough.

This example shows the introduction of weak crosslinking covalent bonds and/or weak crosslinking units comprising a weak covalent bond can confer favorable and advantageous properties to polymeric materials. The use of such weak crosslinking units can improve toughness while avoiding brittleness.

Polymeric material 4 comprises a ring comprising a weak bond (i.e., the carbon-oxygen at the bridge closing the loop of the spiropyran molecule), and showed low storage modulus as well as increased elongation at break in comparison to strongly crosslinked polymer 3 (95%). Polymeric material 2 is a relatively tough material having some flexibility. Under sufficient strain, the bridge dissociated and an ionic form of the opened ring formed. A color change was observed which signaled the ring opening. A higher concentration of the ring monomer would increase storage modulus. This example shows the introduction of rings comprising weak bonds can confer favorable and advantageous properties to polymeric materials. The use of such rings can improve toughness while avoiding brittleness.

Example 2

Comparison of Weak Crosslinking Unit Polymers to Polyurethanes

This example compares polymeric materials formed comprising weak crosslinking units, and also provides for comparison a polyurethane material that does not comprise weak crosslinking units. Also described are material characteristics of the polymeric materials.

Sample A was created by combining 59 wt % oligomer containing a urethane backbone and methacrylate end groups (approximate Mn of 10 k) with 10 wt % isobornyl methacrylate, and 1 wt % TPO photoinitiator. Samples B-C were created by combining 50 wt % oligomer containing a urethane backbone and methacrylate end groups (approximate Mn of 10 k) with 10 wt % isobornyl methacrylate, 1 wt % TPO photoinitiator, and 9% of crosslinking unit (as provided in Table 4, below). The formulations were mixed well until homogenous.

TABLE 4

| Sample | Crosslinking Unit |
|---|---|
| A | — |
| B | (structure shown) |
| C | (structure shown) Formula III-a |

The prepared resins were weighed into silicone molds having the desired geometry. Each mold was allowed to sit on a flat surface until the resin was evenly distributed in the mold. Each mold was then placed in a Dymax Flood Lamp (Model 2000) and cured for 90 seconds at room temperature. Sample A had greater than 40% stress remaining when tested in dry stress relaxation test. However, Sample A had zero stress remaining when tested after 24 hours at 37° C. in a wet environment. Sample A had an elongation to break in dry conditions of 100%. Sample B had greater than 50% stress remaining when tested in dry stress relaxation test, and 10% stress remaining when tested after 24 hours at 37° C. in a wet environment. Sample B had an elongation to break in dry conditions of 50%. Sample C had greater than 50% stress remaining when tested in dry stress relaxation test, and 10% stress remaining when tested after 24 hours at 37° C. in a wet environment. Sample C had an elongation to break in dry conditions of 80%. Sample C (comprising the weak crosslinker) thus performed as well as the sample comprising strong crosslinker (Sample B) for stress relaxation, but outperformed the strong crosslinking material on the elongation to break test. The presence of urethane did not help with stress relaxation, and only the crosslinker provided improvement in this data set.

This example shows the introduction of weak crosslinking covalent bonds and/or weak crosslinking units comprising a weak covalent bond can confer favorable and advantageous properties to polymeric materials. The weak crosslinking has improved characteristics, including following exposure to wet environment.

Example 3

Treatment Using an Orthodontic Appliance

This example describes the use of a directly 3D printed orthodontic appliance to move a patient's teeth according to a treatment plan. This example also describes the characteristics that the orthodontic appliance can have following its use, in contrast to its characteristics prior to use.

A patient in need of, or desirous of, a therapeutic treatment to rearrange at least one tooth has their teeth arrangement assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using the printable resins and methods disclosed further herein, to provide orthodontic appliances having weak crosslinking covalent bonds and/or weak crosslinking units comprising weak covalent bonds. In some embodiments, a plurality of orthodontic appliances are used, each of which can be fabricated using the printable resins and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. The threshold difference values of a planned position of teeth to actual positions selected as indicating that a patient's teeth have progressed on-track are provided above in Table 1. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), remaining flexural stress, relative flexural modulus, and relative elongation at break can be determined.

What is claimed is:

1. A polymeric material, comprising:
    a polymer chain comprising:
        a ring comprising three or more ring members and an activatable unit,
        wherein the three or more ring members comprise a first set of two ring members, and
        wherein the activatable unit is positioned between the first set of two ring members, and upon activation, is converted to a first bond that is positioned between the first set of two ring members, the first bond having a bond dissociation energy less than 325 kJ/mol.

2. The polymeric material of claim 1, wherein the first bond has a bond dissociation energy from 50 kJ/mol to 325 kJ/mol.

3. The polymeric material of claim 1, wherein the bond dissociation energy of the first bond is measured as a bond breaking energy.

4. The polymeric material of claim 1, wherein the first bond is a covalent bond or an ionic bridge.

5. The polymeric material of claim 1, wherein the first bond is a double hydrogen bond or a plurality of hydrogen bonds.

6. The polymeric material of claim 1, wherein the first bond is a sulfur-sulfur bond, an oxygen-oxygen bond, a nitrogen-nitrogen bond, a silicone-sulfur bond, a silicon-silicon bond, a phosphorus-phosphorus bond, an oxygen-sulfur bond, a nitrogen-phosphorus bond, a carbon-phosphorus bond, a phosphorus-silicone bond, a carbon-sulfur bond, a nitrogen-oxygen bond, or a combination thereof.

7. The polymeric material of claim 1, wherein the first bond has less than 75% the strength of the average carbon-carbon bond in polyethylene.

8. The polymeric material of claim 1, wherein the ring comprises a plurality of bonds between sets of two ring members other than the first set of two ring members, each bond having a bond dissociation energy at least 80 kJ/mol greater than the bond dissociation energy of the first bond.

9. The polymeric material of claim 1, wherein the ring comprises a substituted or unsubstituted cycloalkane, a substituted or unsubstituted heterocyclic ring, a substituted or unsubstituted inorganic ring, a derivative thereof, or a combination thereof.

10. The polymeric material of claim 1, wherein the ring comprises a weak bridge, the weak bridge comprising the first bond.

11. The polymeric material of claim 1, wherein the ring comprises 6 or greater than 6 ring members.

12. The polymeric material of claim 11, wherein the ring comprises greater than 10 ring members.

13. The polymeric material of claim 1, wherein the polymer chain comprises a first portion and a second portion, the first portion of the polymer chain is attached to the ring via a first connector, and the second portion of the polymer chain is attached to the ring via a second connector.

14. The polymeric material of claim 1, wherein the ring further comprises a second bond positioned between a second set of two ring members, the second bond having a bond dissociation energy greater than 325 kJ/mol.

15. The polymeric material of claim 13, wherein:
    the polymer chain further comprises a second bond positioned between a second set of two ring members, the second bond having a bond dissociation energy greater than 325 kJ/mol; and
    the first bond is positioned between the first connector and the second connector, and wherein the second bond is positioned between the first connector and the second connector.

16. The polymeric material of claim 1, wherein the polymer chain comprises a backbone wherein all covalent bonds in the backbone have a bond dissociation energy at least 80 kJ/mol greater than the bond dissociation energy of the first bond.

17. The polymeric material of claim 1, wherein the polymer chain comprises from 0.1 wt % to 50 wt % of the ring.

18. The polymeric material of claim 1, wherein the polymer chain comprises a ratio of a total number of bonds of the ring to a total number of bonds of the polymer chain, and the ratio is from 1:750 to 1:1.

19. The polymeric material of claim 1, wherein the polymer chain is hydrophobic.

20. An orthodontic appliance comprising a polymeric material, the polymeric material comprising:
    a polymer chain comprising: a plurality of rings, each of the plurality of rings comprising:
        three or more ring members; and
        a first bond positioned between a first set of two ring members and having a bond dissociation energy less than 325 kJ/mol; and
        a second bond positioned between a second set of two ring members and having a bond dissociation energy greater than 325 kJ/mol.

21. A polymerizable resin comprising:
    an initiator that, when exposed to radiation, causes a polymerization process to occur to the polymerizable resin; and
    a ring monomer comprising a ring, the ring comprising:
        three or more ring members, wherein the three or more ring members comprise a first set of two ring members; and an activatable unit between the first set of two ring members, wherein the activatable unit, upon activation, is converted to a first bond positioned between the first set of two ring members, the first bond having a bond dissociation energy less than 325 kJ/mol.

22. The polymerizable resin of claim 21, wherein the ring monomer is an oligomer having an average chain length from 1 kDa to 30 kDa.

23. The polymerizable resin of claim 21, wherein the ring monomer comprises a first connector attached to the ring, the first connector comprising a first reactive group.

24. The polymerizable resin of claim 23, wherein the first reactive group is selected from the group consisting of an acrylate, a methacrylate, a thiol, an epoxide, an allyl ether, a hydroxyl, an amine, a derivative thereof, and a combination thereof.

25. The polymerizable resin of claim 23, wherein the ring monomer further comprises a second connector attached to the ring, the second connector comprising a second reactive group.

26. The polymerizable resin of claim 25, wherein the second reactive group is selected from the group consisting of an acrylate, a methacrylate, a thiol, an epoxide, an allyl ether, a hydroxyl, an amine, a derivative thereof, and a combination thereof.

27. The polymerizable resin of claim 25, wherein the first connector and the second connector are positioned external to the ring.

28. The polymerizable resin of claim 25, wherein the first connector and the second connector are each covalently attached to the ring.

29. The polymerizable resin of claim 21, wherein the initiator is a photoinitiator, a thermal initiator, or a combination thereof.

30. The polymerizable resin of claim 22, wherein:
the oligomer comprises a polymerizable group; and
the polymerizable group is selected from the group consisting of a vinyl group, an allyl group, an allyl ether, an acrylate group, a methacrylate group, an acrylamide group, an epoxy group, an oxetanyl group, a thiol group, a hydroxyl, an amine, a derivative thereof, and a combination thereof.

31. The polymerizable resin of claim 21, wherein the polymerization process comprises thermal polymerization, photopolymerization or a combination thereof.

32. The polymerizable resin of claim 21, wherein the polymerization process is part of an additive manufacturing process.

33. The polymeric material of claim 1, wherein the polymer chain modifies a toughness of the polymeric material.

* * * * *

UNITED STATES PATENT AND TRADEMARK OFFICE
CERTIFICATE OF CORRECTION

PATENT NO. : 11,845,868 B2  
APPLICATION NO. : 17/200617  
DATED : December 19, 2023  
INVENTOR(S) : Michael Christopher Cole It is certified that error appears in the above-identified patent and that said Letters Patent is hereby corrected as shown below:

In the Claims

<u>Column 90, Claim 20, Line 51:</u>  
"comprising: a" should read: --comprising a--.

<u>Column 90, Claim 20, Line 53:</u>  
"members; and" should read: --members;--.

Signed and Sealed this  
Tenth Day of June, 2025

Coke Morgan Stewart  
*Acting Director of the United States Patent and Trademark Office*